(12) United States Patent
Iwasaki

(10) Patent No.: US 7,630,088 B2
(45) Date of Patent: Dec. 8, 2009

(54) APPARATUS FOR MEASUREMENT OF 3-D SHAPE OF SUBJECT USING TRANSFORMABLE HOLDER WITH STABLE AND REPEATABLE POSITIONING OF THE SAME SUBJECT

(75) Inventor: Takeo Iwasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 154 days.

(21) Appl. No.: 11/872,379

(22) Filed: Oct. 15, 2007

(65) Prior Publication Data
US 2008/0043249 A1  Feb. 21, 2008

Related U.S. Application Data

(63) Continuation-in-part of application No. PCT/JP2006/307600, filed on Apr. 11, 2006.

(30) Foreign Application Priority Data

Apr. 15, 2005  (JP) .............................. 2005-118121

(51) Int. Cl.
*G01B 11/24* (2006.01)
(52) U.S. Cl. ...................... 356/601; 356/614
(58) Field of Classification Search ......... 356/600–608, 356/612, 614–615, 620–629, 639–640, 2–3.01, 356/3.09, 244; 382/154, 286; 250/559.19, 250/559.21, 559.23, 237 G, 334, 341.6; 433/29, 433/72, 215, 223
See application file for complete search history.

(56) References Cited

U.S. PATENT DOCUMENTS

2003/0058456 A1  3/2003  Bodenmiller et al.

2003/0107747 A1  6/2003  Iwasaki (Continued)

FOREIGN PATENT DOCUMENTS

DE  10344922 A1  5/2005

(Continued)

OTHER PUBLICATIONS

International Bureau of WIPO, Relalted Patent Application No. PCT/JP2006/307600 mailed Jun. 13, 2006.

*Primary Examiner*—Gregory J Toatley, Jr.
*Assistant Examiner*—Tri T Ton
(74) *Attorney, Agent, or Firm*—Baker Botts, LLP

(57) ABSTRACT

An apparatus is disclosed for measuring a three-dimensional shape of a subject, which includes: a turntable unit configured to include a turntable, and a support frame adapted to rotatably support the turntable; a measurement head configured to photograph the subject on the turntable and to measure the three-dimensional shape of the subject based on at least one resultant photograph of the subject; and a transformable holder being attached to the measurement head and holding the turntable unit. The holder is configured to be selectively placed in an unfolded position in which the turntable unit is unfolded with respect to the measurement head, and a folded position in which the turntable unit is folded with respect to the measurement head, as a result of transformation of the holder, and further configured to allow, when in the unfolded position, the subject to be located on the turntable unit and to be photographed.

10 Claims, 25 Drawing Sheets

U.S. PATENT DOCUMENTS

2004/0202364 A1\* 10/2004 Otani et al. .................. 382/154
2004/0212811 A1    10/2004 Iwasaki
2005/0068544 A1     3/2005 Doemens et al.

FOREIGN PATENT DOCUMENTS

| EP | 1298411 A2 | 4/2003 |
| EP | 1519141 A2 | 3/2005 |
| JP | 20025624 A | 1/2002 |
| JP | 2003172610 A | 6/2003 |
| JP | 2003185422 A | 7/2003 |
| JP | 2003322515 A | 11/2003 |
| JP | 200599022 A | 4/2005 |
| JP | 2005293075 A | 10/2005 |
| JP | 200698252 A | 4/2006 |
| WO | 2005095886 A1 | 10/2005 |

\* cited by examiner (a)

(b)

APPARATUS FOR MEASUREMENT OF 3-D SHAPE OF SUBJECT USING TRANSFORMABLE HOLDER WITH STABLE AND REPEATABLE POSITIONING OF THE SAME SUBJECT

CROSS-REFERENCE TO RELATED APPLICATIONS

The present application is based on and claims the benefit of priority from Japanese Patent Application No. 2005-118121 filed Apr. 15, 2005, and International Application No. PCT/JP2006/307600 filed Apr. 11, 2006, the contents of which are incorporated herein by reference in their entirety.

This application is a continuation application of International Application No. PCT/JP2006/307600 filed Apr. 11, 2006, now pending, which was published in Japanese under PCT Article 21(2).

BACKGROUND OF THE INVENTION

1. Field of the Invention

The invention relates generally to apparatuses for measurement of a three-dimensional shape of a subject by photographing the subject on a turntable, and more particularly to structural improvements of such apparatuses.

2. Description of the Related Art

Without limiting the scope of the invention, its background is described in connection with three-dimensional measurement apparatuses, as an example.

There are known techniques of optically measuring a three-dimensional shape of a subject. Such techniques allow a subject to be photographed and allow a three-dimensional shape of the subject, optionally with surface colors of the subject, to be measured, based on at least one resultant photograph of the subject.

As one type of apparatuses which are configured to implement such techniques, there are known apparatuses for measuring a three-dimensional shape of a subject by photographing the subject on a turntable.

This type of apparatuses, typically, is configured to include (a) a turntable on which a subject is to be placed for allowing the subject to be rotated at a fixed position; and (b) a measurement head configured to photograph the subject on the turntable and to measure the three-dimensional shape of the subject based on at least one resultant photograph of the subject. Japanese Patent Application Publication No. 2003-322515 discloses an example of a conventional version of such apparatuses.

BRIEF SUMMARY OF THE INVENTION

In general, the invention is directed towards the measurement of a three-dimensional shape of a subject by photographing the subject on a turntable.

According to some aspects of the invention, there is provided, for example, an apparatus for use in measuring a three-dimensional shape of a subject. The apparatus may include:

a turntable unit configured to include a turntable, and a support frame adapted to rotatably support the turntable, a measurement head configured to photograph the subject on the turntable and to measure the three-dimensional shape of the subject based on at lest one resultant photograph of the subject; and a transformable holder being attached to the measurement head and holding the turntable unit.

In this apparatus, the holder may be configured to be selectively placed in an unfolded position in which the turntable unit is unfolded with respect to the measurement head, and a folded position in which the turntable unit is folded with respect to the measurement head, as a result of transformation of the holder. The holder may be further configured to allow, when in the unfolded position, the subject to be located on the turntable unit and to be photographed by the measurement head.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Illustrative Embodiments

Figure 1:
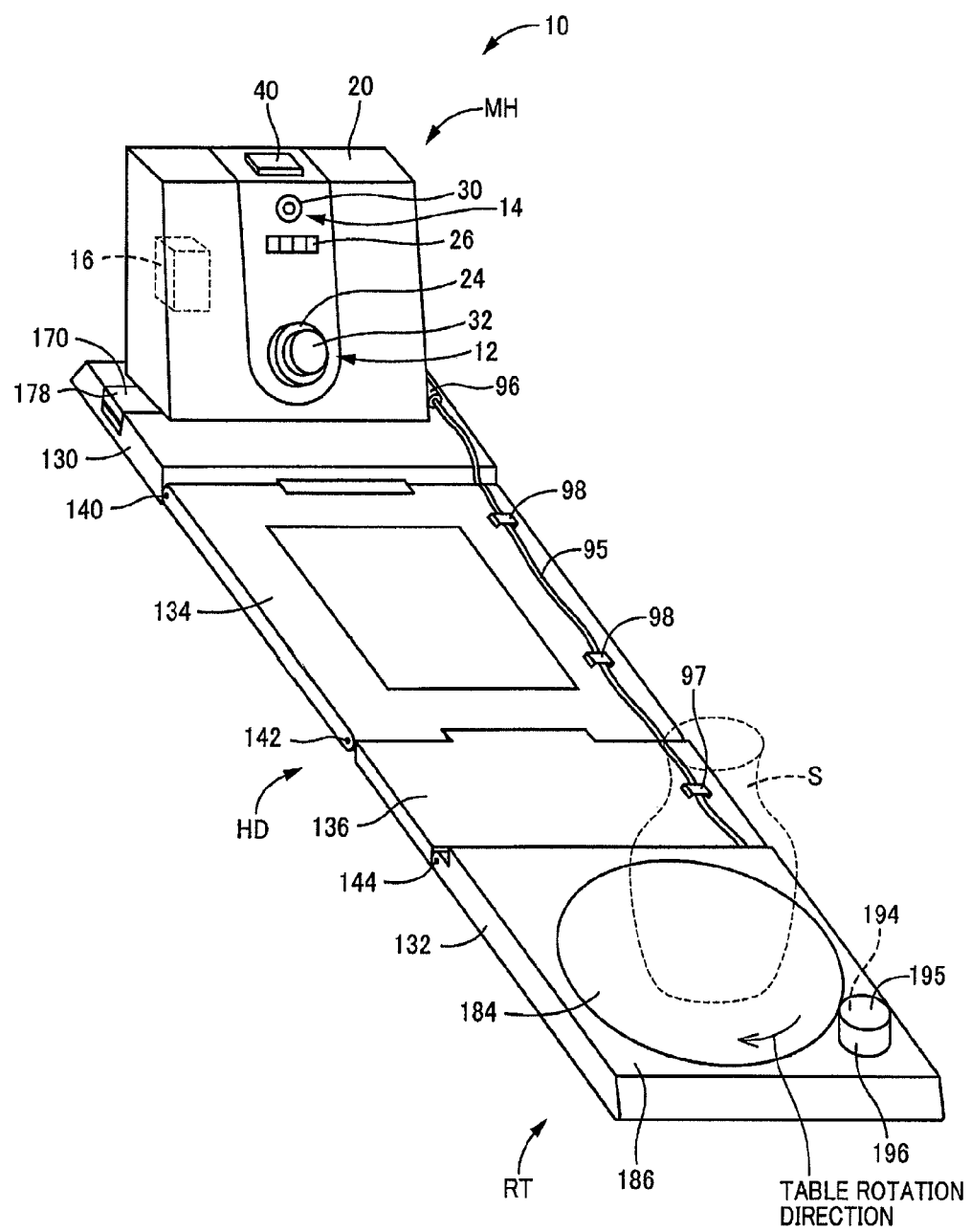
FIG. 1 is a perspective view illustrating the exterior of a three-dimensional (3-D) input device 10, in an unfolded position, which is constructed according to a first illustrative embodiment of the present invention.

According to the invention, the following modes are provided as illustrative embodiments of the invention.

According to a first mode of the invention, there is provided an apparatus for use in measuring a three-dimensional shape of a subject, comprising:

a turntable unit configured to include a turntable, and a support frame adapted to rotatably support the turntable;

a measurement head configured to photograph the subject on the turntable and to measure the three-dimensional shape of the subject based on at least one resultant photograph of the subject; and a transformable holder being attached to the measurement head and holding the turntable unit, wherein the holder is configured to be selectively placed in an unfolded position in which the turntable unit is unfolded with respect to the measurement head, and a folded position in which the turntable unit is folded with respect to the measurement head, as a result of transformation of the holder, and further configured to allow, when in the unfolded position, the subject to be located on the turntable unit and to be photographed by the measurement head.

For the above-described exemplified version of conventional apparatuses disclosed in the aforementioned Japanese Patent Application Publication No. 2003-322515, there are a turntable and a measurement head physically independent of each other. The independency enables the position of the turntable, that is to say, the position of a subject to be photographed, to vary relative to the position of the measurement head, over a wider spatial range, while offering the advantage of higher spatial flexibility in selecting the ultimate position of the subject to be photographed.

In contrast, the above-described conventional technique requires the measurement head to photograph all the space in which the subject can be located and to perform calculation for a photographing operation, resulting in an increase in an image capture area within which the measurement head can photograph, while suffering from the disadvantage of a greater tendency of the burden on the measurement head to become heavier.

Additionally, this conventional technique fails to allow the measurement head, when not in use, and the turntable, to be closely arranged in space for easier transformation into a compacted assemblage. This may require the user to do laborious handling of those two components, and may require extra storage space for these two components, when there is a need for the user to carry and move these two components altogether, and store them at a suitable location.

Under the circumstances stated above, the apparatus according to the first mode described above has been created, so as to be more advantageous in reducing the required burden on the measurement head by reducing the image capture area within which the measurement head can photograph, and so as to improve ease-to-use of this apparatus.

More specifically, in this apparatus according to the first mode described above, the turntable unit having the turntable on which a subject to be photographed is to be placed, and the measurement head performing the photographing of the subject on the turntable and measurement are interconnected via the holder. This provides a physical link between the turntable unit and the measurement head.

Further, in this apparatus, the holder is configured to be transformable, which allows the turntable unit to be selectively placed in an unfolded position in which the turntable unit is unfolded with respect to the measurement head, and a folded position in which the turntable unit is folded with respect to the measurement head. In the unfolded position, the subject is placed on the turntable and is then photographed by the measurement head.

As stated above, in this apparatus, the holder provides a physical link between the turntable unit and the measurement head, which makes it easier to design the holder which takes a stable and repeatable shape when in an unfolded position, each time the user unfolds the holder for transformation from a folded position into an unfolded position.

In other words, this apparatus makes it easier to design the holder so that the relative positional relation between the measurement head and the turntable can be shown as a stable and repeatable relation, when the holder is in an unfolded position, per each user action to unfold the holder. Better repeatability of the shape or geometry of the holder shown in the unfolded position achieves better repeatability of the relative position of the turntable to the measurement head.

This apparatus, therefore, produces a reduction in size of a range within which the relative position of a subject to the measurement head is variable, when the subject is placed on the turntable, resulting in a reduction in size of an image capture area within which the measurement head is required to be able to photograph, wherein the image capture area is dimensioned so as to accommodate the size of the range mentioned above.

This apparatus, as a result, makes it easier to reduce the burden on the measurement head for image capturing and measurement of a subject, than when the subject can be located with higher flexibility in selection of the ultimate location of the subject to be photographed.

Further, in this apparatus, as stated above, the holder offers the physical link between the turntable unit and the measurement head. This apparatus, therefore, makes it easier to design the holder, the turntable unit and the measurement head, such that the transformation of the holder allows the turntable unit to be retracted into the measurement head. Additionally, this makes it easier to design the holder, the turntable unit and the measurement head, so that the turntable unit can be retracted into the measurement head in a compact fashion.

This apparatus, therefore, can simplify a user action for retraction of the turntable unit, for example, by allowing the user to retract the turntable unit into the measurement head as a result of a user action to transform the holder in a suitable fashion. This apparatus also allow the user to retract the turntable unit into the measurement head in a compact fashion without requiring the user to pay special attention.

The "holder" set forth in the above mode may be made up of a unitary member, or an assembly of a plurality of members which are operatively joined together.

Where the "holder" is made up of a unitary member, the transformation of the "holder" can be achieved by physical deformation of the member as such.

In contrast, where the "holder" is made up of an assembly of a plurality of members which are operatively joined together, the dependency on physical deformation of each member is inessential for the "holder" to be transformable.

More specifically, where the "holder" is made up of, for example, an assembly of a plurality of non-deformable members which are pivotably joined together, the folding of those members (relative pivotal movement) can provide the transformation of the "holder."

In addition, where the "holder" is made up of an assembly of a plurality of non-deformable members which are telescopically joined together, the telescopic movement between those members can provide the transformation of the "holder."

Alternatively, the transformation of the "holder" may be achieved owing to other types of relative movement between the plurality of members operatively joined together, which types exclude both the above-mentioned folding movement and telescopic movement, and may be achieved owing to combined movement of selected ones of a plurality of various types of relative movement including both the above-mentioned folding movement and telescopic movement.

The "turntable" set forth in the above mode may be, for example, of a type allowing the turntable to automatically rotate by electrical power, or a type allowing the turntable to rotate by a user hand.

According to a second mode of the invention, an example of a modified version of the apparatus according to the first mode is provided, in which the holder is configured to hold the turntable unit so as to allow, upon transformation of the holder from the folded position into the unfolded position, the turntable unit to be located at a stable and repeatable position relative to the measurement head.

In the apparatus according to the second mode, each time a user unfolds the holder, the turntable is located at a stable and repeatable position relative to the measurement head. Better repeatability of the location of the holder taken in the unfolded position achieves better repeatability of the relative position of the turntable to the measurement head.

This apparatus, therefore, produces a reduction in size of a range within which the relative position of a subject to the measurement head is variable, when the subject is placed on the turntable, resulting in a reduction in size of an image capture area within which the measurement head is required to be able to photograph, wherein the image capture area is dimensioned so as to accommodate the size of the range mentioned above.

This apparatus, as a result, makes it easier to reduce the burden on the measurement head for image capturing and measurement of a subject, than when the subject can be located with higher flexibility in selection of the ultimate location of the subject to be photographed.

According to a third mode of the invention, an example of a modified version of the apparatus according to the first or second mode is provided, in which the holder, when in the folded position, takes an exterior shape generally in the form of a rectangular solid, in combination with a shape of the measurement head.

In the apparatus according to the third mode, the holder and the measurement head together form a generally-rectangular-solid exterior shape, when the holder is in the folded position, that is to say, when the holder is retracted in the measurement head. On the other hand, a rectangular solid is a solid having a shape suitable for transportation, storage, etc.

This apparatus, therefore, makes it easier to improve ease-to-use of the holder and the measurement head when the holder is retracted in the measurement head.

According to a fourth mode of the invention, an example of a modified version of the apparatus according to any one of the first through third modes is provided, in which the holder is detachably attached to the measurement head.

The apparatus according to any one of the first through three modes described earlier may be practiced in an exemplary arrangement in which the measurement head is non-detachably attached to the holder.

In contrast, the apparatus according to the fourth mode described above is practiced such that the measurement head is detachably attached to the holder. This apparatus allows the measurement head and the turntable to be unfolded at a flexible relative location, opposed to the apparatus according to the above-mentioned exemplary arrangement in which the measurement head and the turntable are unfolded at a fixed relative location, while placing limitations on the geometrical setting of camera (e.g., camera position and angle) under which the measurement head can photograph a subject.

The apparatus according to the fourth mode, therefore, allows the user to separate the measurement head from the holder in order to locate the measurement head at a desired location, when there is a need for achieving a different geometrical setting of camera from that which can be achieved by the measurement head with the holder being attached to the measurement head.

This apparatus, as a result, enhances the spatial flexibility in selecting the location of the measurement head, to thereby improve ease-to-use of this apparatus.

According to a fifth mode of the invention, an example of a modified version of the apparatus according to any one of the first through fourth modes is provided, in which the holder is configured to include a first section attached to the measurement head, a second section for use in holding the turntable unit, and an intervening section intervening between the first and second sections for interconnection.

This apparatus according to the fifth mode enables the user to change the relative position between the first and second sections with greater flexibility than when those first and second sections are alternatively interconnected directly with each other, wherein the first section is attached to the measurement head, while the second section holds the turntable.

This apparatus, as a result, makes it easier to optimize the shape of the holder taken when the holder is being retracted in the measurement head so as to meet the purpose of use.

According to a sixth mode of the invention, an example of a modified version of the apparatus according to the fifth mode is provided, in which the intervening section is flexibly joined to at least one of the first and second sections, to thereby allow the holder to be folded for transformation from the unfolded position into the folded position.

This apparatus according to the sixth mode allows the holder to be retracted in the measurement head by at least partly folding the holder.

According to a seventh mode of the invention, an example of a modified version of the apparatus according to the sixth mode is provided, in which the holder is entirely shaped generally as a plate, and the intervening section is configured to include at least two plate-like members which are flexibly joined together.

This apparatus according to the seventh mode enables the user to change the relative position between the first and second sections with greater flexibility than when the intervening section is made up of a unitary member, wherein the first section is attached to the measurement head, while the second section holds the turntable.

This apparatus, as a result, makes it much easier to optimize the shape of the holder taken when the holder is being retracted in the measurement head so as to meet the purpose of use.

In addition, in this apparatus, the intervening section is made up of a plurality of plate-shaped members.

On the other hand, those members are each shaped in two-dimension, and therefore, when the intervening section is in the form of a foldable continuum constructed by joining plate-like members, it is easier to maintain the parallelism between those members, irrespective of whether the intervening section is in a folded and retracted position or a planar and unfolded position.

This apparatus, as a result, achieves much ensured better repeatability of the relative position of the turntable to the measurement head each time the user unfolds the intervening section.

This apparatus makes it easier to design the intervening section so as to employ the structure allowing much ensured better repeatability of the relative position of the turntable to the measurement head to be achieved, owing to the fact that a plurality of members together forming the intervening section are each plate-shaped.

According to an eighth mode of the invention, an example of a modified version of the apparatus according to any one of the fifth through seventh modes is provided, in which the holder is entirely shaped generally as a plate, the intervening section is configured to be telescopic in a direction allowing a distance between the measurement head and the turntable unit, when in the unfolded position, to alter.

This apparatus according to the eighth mode allows the holder to be retracted in the measurement head by at least partly contracting the holder.

According to a ninth mode of the invention, an example of a modified version of the apparatus according to any one of the first through eighth modes is provided, in which the turntable unit is configured to include a position guide which is mounted on the support frame, the position guide being operable when the subject is placed on the turntable with the subject having a portion lying outside an image capture area within which the measurement head can photograph, so as to abut the portion of the subject as a result of rotational movement of the subject together with the turntable, to thereby guide a position of the subject that can be taken on the turntable.

The apparatus according to any one of the first through eighth modes of the invention, as a result of the establishment of the physical relation between the measurement head and the turntable unit, allows the relative position of the turntable to the measurement head to be controlled.

One of kinds of positions which has a more direct impact on the photographing or image capture of a subject using the measurement head is the relative position of the subject to the measurement head, which depends on not only the relative position of the turntable to the measurement head, but also the relative position of the subject to the turntable.

Accordingly, making the relative position of the subject to the turntable more stable is also effective for reducing the image capture area within which the measurement can photograph the subject, ultimately for elimination of the burden on the measurement head to be met.

On the other hand, the turntable unit, in general, is formed to include not only the turntable as a rotating part but also a stationary part. In this general configuration, during rotation of the turntable, relative rotation occurs between a subject placed on the turntable and the stationary part. The utilization of the relative rotation allows the overall surface of the subject when in rotation, to be scanned in a direction of rotation of the subject.

Therefore, if there is provided to the stationary part of the turntable, a tool that, when a subject has been located on the turntable at such an inappropriate location that the subject has a portion lying outside an image capture area for the measurement head, can abut the portion as a result of rotation of the subject together with the turntable, then the tool can guide the position of the subject on the turntable that can be taken.

In the regard, the phrase "guide the position of the subject on the turntable that can be taken" may be interpreted to mean, for example, to indicate to the user at least auditorily that the current position of the subject on the turntable is inappropriate. The user, once indicated at least auditorily that the current position of the subject on the turntable is inappropriate, can perceive that there is a need for the user to correct the position of the subject.

Also, the phrase "guide the position of the subject on the turntable that can be taken" may be alternatively interpreted to mean not only the indication of inappropriateness of the current position of the subject but also the implementation of self-correction or limiting of the position of the subject that has been placed at an inappropriate location. The tool, when constructed so as to meet the alternative interpretation stated above, can fully eliminate a user action for manually correcting the position of the subject, or otherwise partly reduce the burden on the user to be met, although such a user action is partly required.

Based on the findings described above, in the apparatus according to the ninth mode, such a position guide is provided to the support frame which is a stationary part of the turntable, that guides the position of a subject placed on the turntable by abutting the subject. The position guide, once the subject on the turntable has been rotated together with the turntable, with the subject having a portion lying outside an image capture area within which the measurement head can photograph, abuts the portion of the subject, to thereby guide the position of the subject on the turntable.

This apparatus, therefore, allows the relative position of the subject to the turntable to be guided or directly or indirectly controlled, to thereby allow the relative position of the subject to the turntable to be at least ultimately stabilized. As a result, this apparatus makes it easier to reduce in size the image capture area within which the measurement head is required to photograph, to thereby reduce the burden on the measurement head to be met, and makes it easier to ensure the measurement head to take an appropriate position in which the measurement head photographs the subject at its appropriate location any time, to thereby improve ease-to-use of this apparatus.

According to a tenth mode of the invention, an example of a modified version of the apparatus according to the ninth mode is provided, in which the turntable unit is configured to include a driving device for use in driving the turntable, the driving device being mounted on the support frame, and being configured to include a portion which also functions as the position guide.

In the apparatus according to the tenth mode, the driving device provides the function of guiding or controlling the position of a subject placed on the turntable, in addition to the function of driving or actuating the turntable. This apparatus, therefore, does not require addition to this apparatus of an extra component for exclusive use in providing the function of guiding or controlling the position of a subject placed on the turntable, resulting in the capability of guiding or controlling the position of the subject placed on the turntable, while avoiding an increase in the total number of components required in this apparatus.

Several presently preferred embodiments of the invention will be described in more detail by reference to the drawings in which like numerals are used to indicate like elements throughout.

First Illustrative Embodiment

FIG. 1 illustrates in a perspective view the exterior of a three-dimensional (3-D) input device 10 constructed in accordance with a first illustrative embodiment of the present invention. This 3-D input device 10 is designed to project striped patterned light to a subject S (object), photograph the subject S, and, based on at least one resultant photograph of the subject S, perform signal processing for obtaining 3-D shape information and surface-color information of the subject S using a computer.

This 3-D input device 10 is designed to photograph the subject S so that the 3-D shape information and the surface-color information can be obtained so as to correctly match each other per pixel location, irrespective of unexpected relative displacement between the 3-D input device 10 and the subject S.

FIGS. 1-5 illustrate the exterior structure of the 3-D input device 10, while FIGS. 6-12 illustrate the interior structure of the 3-D input device 10. The exterior structure will be described below first, and then the interior structure.

As illustrated in FIG. 1, the 3-D input device 10 is configured to include a measurement head MH, a turntable unit RT and a holder HD.

The measurement head MH is provided for use in optically photographing the subject S, and measuring the 3-D shape and the surface-color of the subject S, based on at least one resultant photograph of the subject S.

The turntable unit RT is provided to allow the indexing rotation of the subject S with respect to the measurement head MH, which enables the measurement head MH to photograph the subject S per each indexing rotation of the subject S, to thereby allow the subject S to be photographed in a manner that the overall area of an exterior surface of the subject S is divided into a plurality of sub-areas.

The subject S is repeatedly photographed per each sub-area, resulting in the generation of a plurality of sub-images of the subject S. The thus-generated plurality of sub-images are combined into a single stitched image. The surface-color information that has been obtained for the identical subject S is mapped onto the stitched image, to thereby generate a stitched texture for the subject S.

As illustrated in FIG. 1, the holder HD is provided such that the holder HD is attached to the measurement head MH, while the holder HD holds the turntable unit RT. The holder HD is self-transformable.

More specifically, in the present embodiment, the holder HD is designed to be transformed by the folding motion. The holder HD is configured to be selectively transformed, by the self-transformation, into an unfolded position in which the turntable unit RT is unfolded with respect to the measurement head MH, and into a folded position in which the turntable unit RT is folded with respect to the measurement head MH. Further, in the present embodiment, the holder HD is detachably attached to the measurement head MH.

FIG. 1 is a perspective view illustrating the holder HD in an unfolded position, FIG. 2(a) is a side view partly illustrating the measurement head MH and the holder HD, both in an unfolded position, respectively, and FIG. 2(b) is a rear view illustrating the measurement head MH.

Figure 3:
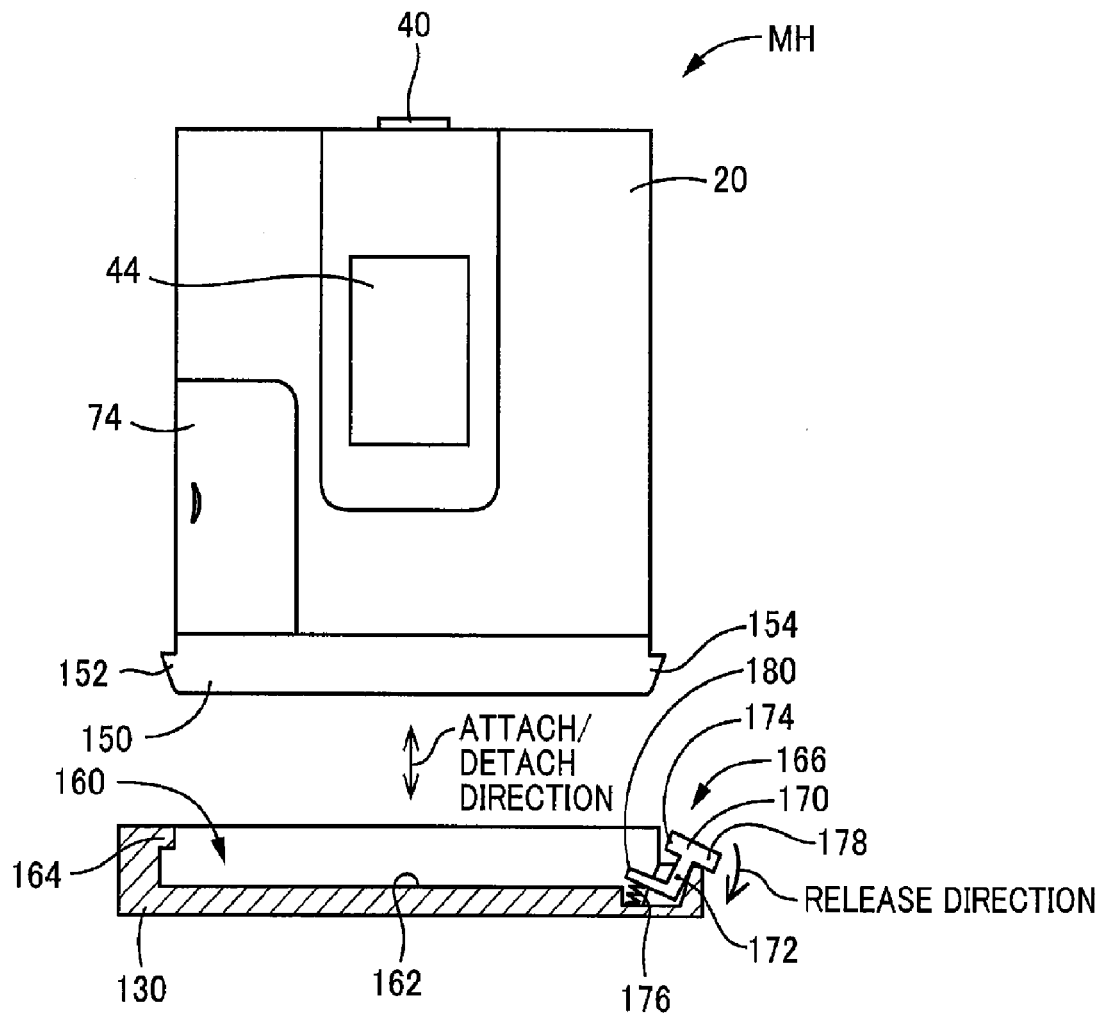
FIG. 3 is a rear view illustrating an attachment mechanism of a measurement head MH and a head base 130 both depicted in FIG. 1, partly in section.
Figure 4:
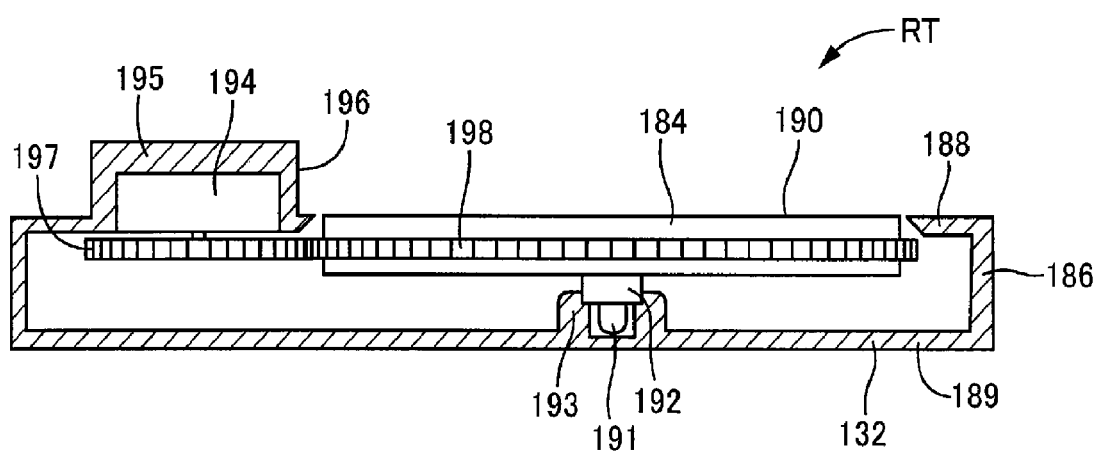
FIG. 4 is a sectional rear view illustrating a turntable unit RT depicted in FIG. 1.

FIG. 3 is a rear view illustrating the measurement head MH in a detached position in which the measurement head MH is detached from the holder HD. FIG. 4 is a rear view illustrating the turntable RT in section.

FIG. 5(a) is a perspective view illustrating the holder HD in a retracted position (i.e., in the folded position), together with the measurement head MH and the turntable unit RT. FIG. 5(b) is a perspective view illustrating how the holder HD in the folded position is retracted into an outer case OC acting as a carrying case, together with the measurement head MH and the turntable unit RT. The 3-D input device 10, when in the retracted position illustrated in FIG. 5(b), is easier for the user to carry or move.

As illustrated in FIG. 1, the measurement head MH is configured to include a projecting section 12 adapted to project the patterned light onto the subject S, an image-capturing section 14 adapted to photograph the subject S, and a processing section 16 adapted to perform the signal processing for obtaining the 3-D information and the surface color information of the subject S. The projecting section 12, the image-capturing section 14 and the processing section 16 are all attached to a casing 20 of the measurement head MH, the casing 20 being generally in the form of a rectangular solid.

As illustrated in FIG. 1, on the casing 20, there are mounted a lens barrel 24 and a flash light 26 in a position allowing each one of the lens barrel 24 and the flash light 26 to be exposed partly at the front face of the casing 20. On this casing 20, an image-capture optical system 30 is also mounted which constitutes part of the image-capturing section 14, in a position allowing a portion of its lenses to be exposed at the front face of the casing 20. The image-capture optical system 30 receives, at its exposed portion, imaging light indicative of the subject S.

Figure 6:
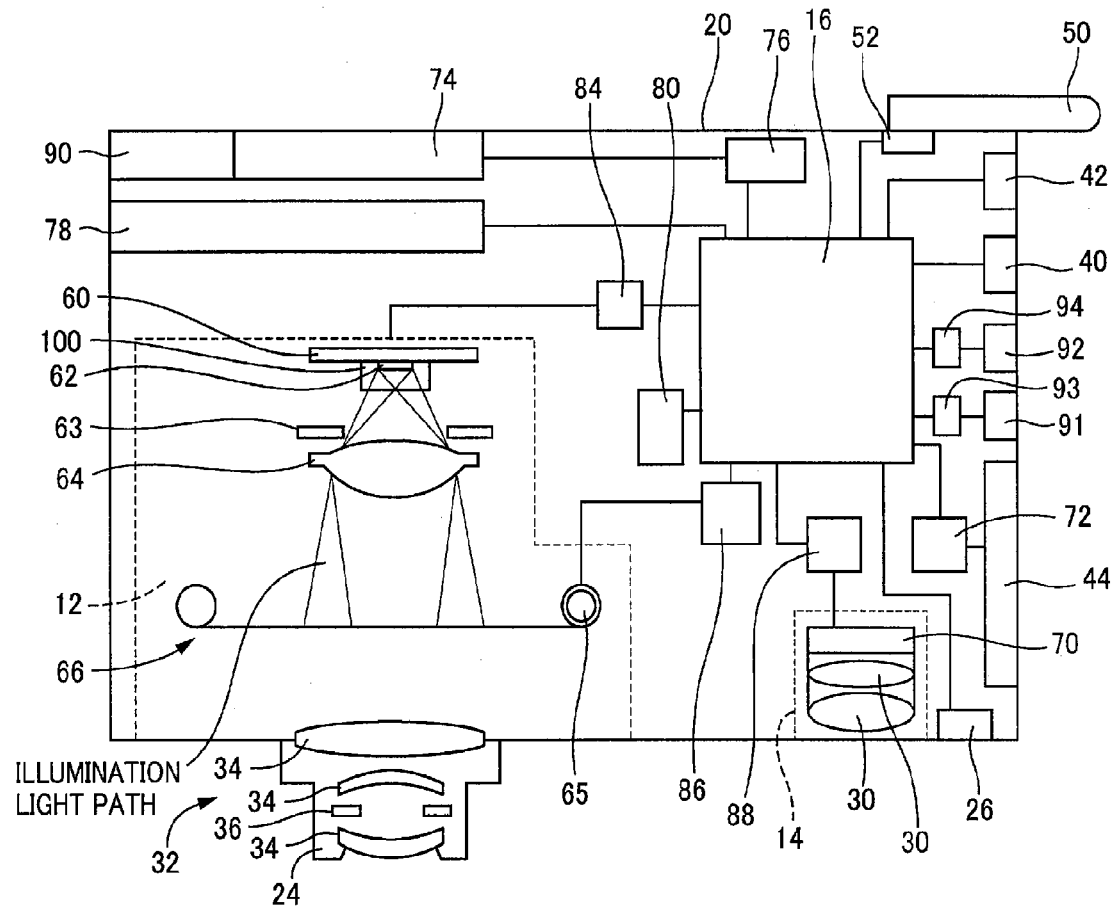
FIG. 6 is a sectional plan view illustrating the interior structure of the measurement head MH depicted in FIG. 1.

The lens barrel 24, as illustrated in FIG. 1, is protruded from the front face of the casing 20, while including therein, as illustrated in FIG. 6, a projection optical system 32 which constitutes part of the projecting section 12. The projection optical system 32 is configured to include a plurality of projection lenses 34 and an aperture stop 36.

This lens barrel 24 holds the projection optical system 32 entirely movably for focus adjustment, and additionally protects the projection optical system 32 from being damaged.

There is exposed at an exposed end face of the lens barrel 24, an outermost one of the plurality of projection lenses 34.

The projection optical system 32 projects the patterned light from the outermost one of projection lens 34 toward the subject S.

The flash light 26, which acts as a light source to emit light to compensate for the shortage of light, is constructed with a discharge tube filled with Xe gas, for example. Thus, this flash light 26 can be reused due to repeated electric discharges of a capacitor (not shown) built in the casing 20.

As illustrated in FIG. 1, a release button 40 is mounted on the casing 20 at its upper face. As illustrated in FIG. 2(b), there are also mounted on the casing 20 at its rear face, a mode selection switch 42 (which are comprised of three buttons in an example illustrated in FIG. 2(b)), a four-directional input key (i.e., cursor control key) 43 and a monitor LCD (Liquid Crystal Display) 44. The mode selection switch 42 and the four-directional input key 43 each constitute an example of a function button.

The release button 40 is manipulated by a user to activate the 3-D input device 10. This release button 40 is of a two-phase pushbutton type allowing this release button 40 to issue different commands between when the operational state of the user (i.e., depressed state of the user) is in a "half-depressed state" and when in a "fully-depressed state."

The operational state of the release button 40 is monitored by the processing section 16. Upon detection of the "half-depressed state" of the release button 40 by the processing section 16, well-known features of auto-focus (AF) and auto-exposure (AE) start to automatically adjust the lens focus, the aperture and the shutter speed.

In contrast, upon detection of the "fully-depressed state" of the release button 40 by the processing section 16, operations such as a photographing operation start.

The mode selection switches 42 are manipulated by a user to set a current operational mode of the 3-D input device 10 as one of various kinds of operational modes including a SLOW mode (denoted as "S" in FIG. 2(b)), a FAST mode (denoted as "F" in FIG. 2(b)) and an OFF mode (denoted as "OFF" in FIG. 2(b)), all of which will be described later on.

The operational state of the mode selection switches 42 is monitored by the processing section 16, and, upon detection of a current operational state of the mode selection switches 42 by the processing section 16, desired processing is performed in the 3-D input device 10 in an operational mode corresponding to the detected state of the mode selection switches 42.

The monitoring LCD 44, which is configured with a Liquid Crystal Display (LCD) being employed, displays desired images to a user in response to reception of an image signal from the processing section 16. This monitoring LCD 44 displays images indicative of the detected result of the 3-D shape of the subject S (i.e., stereoscopic-image), etc., for example.

Figure 2:
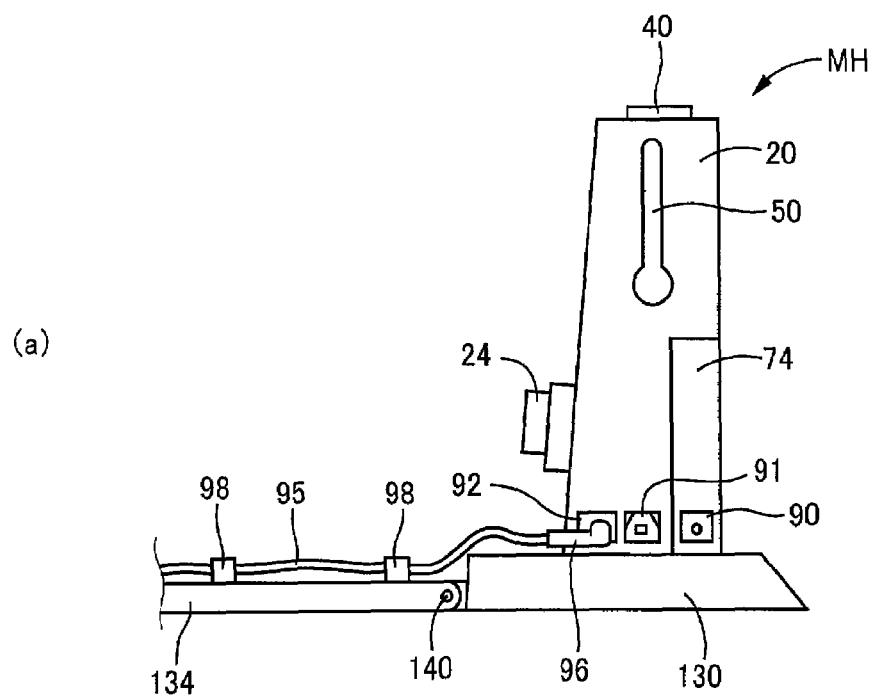
FIGS. 2(*a*) and 2(*b*) are a side view and a rear view both partly illustrating the 3-D input device 10 depicted in FIG. 10, both in an unfolded position, respectively.
Figure 2:
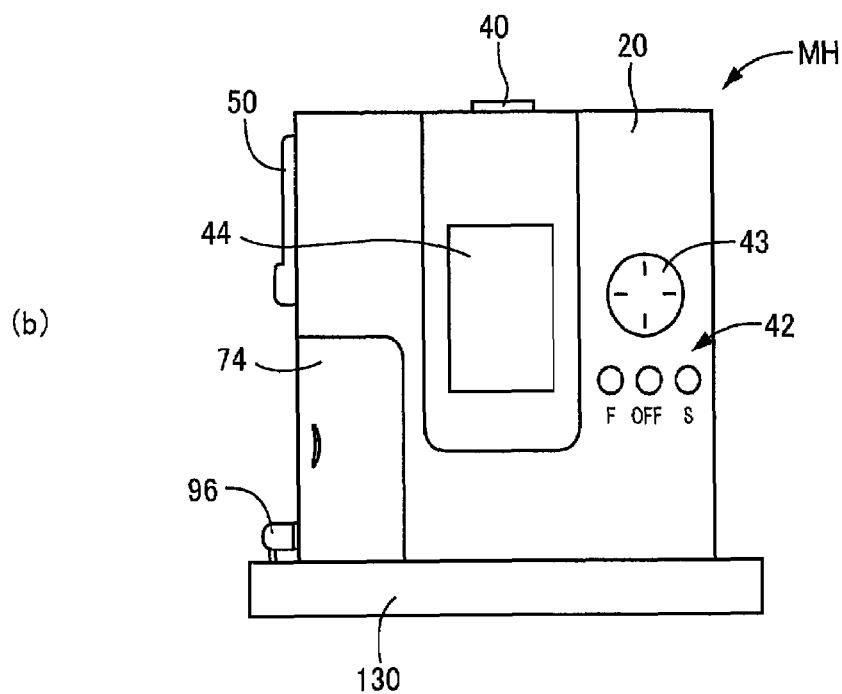

As illustrated in FIG. 2, there is also mounted on the casing 20 an antenna 50 acting as an RF (Radio-Frequency) interface. The antenna 50 is, as illustrated in FIG. 6, connected to an RF driver 52. This antenna 50 transmits data, etc. indicative of the subject S in the form of a stereoscopic image to an external interface, (not shown), via the RF driver 25 by wireless.

Then, a structure employed for the holder HD will be described in more detail by referring to FIG. 1.

The holder HD is constructed by disposing a plurality of plate-like members in a linear array and by foldably coupling them together. That is to say, this holder HD is constructed by hingedly coupling the plurality of plate-like members together such that the plurality of plate-like members form a linear array.

More specifically, the holder HD includes a plate-like head base 130 on which the measurement head MH is detachably mounted, a plate-like table base 132 mounted on the turntable unit RT, and first and second intervening bases 134 and 136 both of which take plate-like shapes and are interposed between the head base 130 and the table base 132. The head base 130, the table base 132, and the first and second intervening bases 134 and 136 together act as a plurality of plate-like members foldably coupled to each other.

As illustrated in FIG. 1, the measurement head MH takes the shape generally in the form of a rectangular solid elongated vertically, and, for relative dimensions of the measurement head MH between its upper and lower faces, and its front and rear faces, in comparison, all these faces are generally common in lateral dimension, while the front and rear faces are each longer in vertical dimension than the upper and lower faces.

On the other hand, when the holder HD is in the retracted position, although will be described in more detail later on by referring to FIG. 5, the head base 130 is attached to the lower face of the measurement head MH, the first intervening base 134 covers the front face of the measurement head MH, the second intervening base 136 covers the upper face of the measurement head MH, and the table base 132 covers the rear face of the measurement head MH. Therefore, the first intervening base 134 and the table base 132 are each longer in vertical dimension than the head base 130 and the second intervening base 136.

One of opposite faces of the first intervening base 134, which opposes the front face of the measurement head MH when the holder HD is in the retracted position, that is to say, which is exposed when the holder HD is in the unfolded position, is assigned an instruction-indicating face indicating instructions on how to operate the 3-D input device 10, etc.

As illustrated in FIG. 1, the head base 130 and the first intervening base 134 are pivotably coupled together via a joint 140 having a common axis. The first and second intervening bases 134 and 136 are pivotably coupled together via a joint 142 having a common axis. The second intervening base 136 and the table base 132 are pivotably coupled together via a joint 144 having a common axis.

Then, a structure employed for allowing the measurement head MH to be detachably mounted on the head base 130 will be described by referring to FIGS. 1-3.

The measurement head MH is mounted on the head base 130 due to mechanical engagement with its upper face. As illustrated in FIG. 3, for achieving the mechanical engagement, a head-seated portion 150 is formed at the lower end portion of the measurement head MH at which the measurement head MH is engaged with the head base 130. This head-seated portion 150 has first and second engagement claws 152 and 154 acting as a pair of male engagement portions.

As illustrated in FIG. 3, these first and second engagement claws 152 and 154 are formed at a pair of positions, respectively, which are spaced apart from each other in the lateral direction of the measurement head MH, that is to say, the lateral direction of the head base 130, such that the first and second engagement claws 152 and 154 each extend in a back-and-forth direction of the measurement head MH, that is to say, the longitudinal direction of the head base 130.

In the present embodiment, positions of these first and second engagement claws 152 and 154 have been each selected so as to maximize the distance therebetween for maximizing the firmness with which the measurement head MH is fixedly attached to the head base 130.

As illustrated in FIG. 3, there is formed at the head base 130 a head receiving portion 160 which fixedly receives the head-seated portion 150 because of the mechanical engagement of the head receiving portion 160 with the head-seated portion 150. The head receiving portion 160 includes a head-base seated air-gap 162 into which the head-seated portion 150 is fitted, and also includes a first and second claw-abutment portions 164 and 166 acting as a pair of female engagement portions which are engaged with the first and second engagement claws 152 and 154 of the measurement head MH, respectively.

The first claw-abutment portion 164 is a fixed claw-abutment portion which is engaged with the corresponding first engagement claw 152, to inhibit the measurement head MH from being disengaged from the head base 130 in a direction perpendicular to the upper face thereof.

On the other hand, the second claw-abutment portion 166 is a movable claw-abutment portion which is displaceable between (a) an engagement position in which the second claw-abutment portion 166 is engaged with the corresponding second engagement claw 154, to inhibit the measurement head MH from being disengaged from the head base 130 in a direction perpendicular to the upper face thereof; and (b) a release position in which the second claw-abutment portion 166 is disengaged from the corresponding second engagement claw 154, to permit the measurement head MH to be disengaged from the head base 130 in a direction perpendicular to the upper face thereof.

An example of the second claw-abutment portion 166 includes a pivot member 170 pivotable about the pivot axis extending in the longitudinal direction of the head base 130 (a direction perpendicular to a plane of rotation in which the measurement head MH is rotated or tilted relative to the head base 130 for allowing engagement thereto and disengagement therefrom).

The pivot member 170 is pivotably mounted on the head base 130 via a joint 172 having an axis coaxial with the pivot axis of the pivot member 170. The pivot member 170 includes a movable engagement portion 174 which is mechanically engaged with the corresponding second engagement claw 154, to inhibit the second engagement claw 154 from being disengaged from the pivot member 170.

The pivot member 170 is inevitably biased by a spring 176 acting as an elastic member, in a direction allowing the movable engagement portion 174 to become engaged with the second engagement claw 154 from thereabove.

In the present embodiment, the pivot member 170 further includes an operating member 178 which is to be depressed by the user for releasing the second engagement claw 154 for disengagement from the movable engagement portion 174, and a leverage (lever) 180 which multiplies the elastic force of the spring 176 and transmit the multiplied force to the movable engagement portion 174.

Next, a user action required for attaching/detaching the measurement head MH with respect to the head base 130 will be described by referring to FIG. 3.

The user, for attaching the measurement head MH to the head base 130, depresses the operating member of the pivot member 170, against the elastic force of the spring 176, in a release direction allowing the movable engagement portion 174 to move from an engagement position to a release position.

With the operating member 178 being depressed, the user lowers the measurement head MH, together with a user action to rotate or tilt the measurement head MH generally in a vertical plane, so that the first engagement claw 152 can enter a recess defined by the first claw-abutment portion 164 into abutment thereon, while the head-seated portion 150 enters the head-base seated air-gap 162.

Thereafter, the user releases the operating member 178 from its depressed state, to thereby allow the pivotal movement of the pivot member 170 from the release position to the engagement position by virtue of the elastic restoring force of the spring 176, and then the movable engagement portion 174 moves toward the second engagement claw 154 from thereabove into engagement with and abutment on the second engagement claw 154.

As a result, the first engagement claw 152 is inhibited from moving upwardly for disengagement from the first claw-abutment portion 164, and additionally the second engagement claw 154 is inhibited from moving upwardly for disengagement from the second claw-abutment portion 166. Consequently, the measurement head MH is inhibited from being disengaged from the head base 130.

On the other hand, the user, for disengaging the measurement head MH from the head base 130, depresses the operating member 178 of the pivot member 170, against the elastic force of the spring 176, as with the case described above.

With the operating member 178 being depressed, the user raises the measurement head MH, together with a user action to rotate or tilt the measurement head MH generally in a vertical plane, so that the first engagement claw 152 can escape from the first claw-abutment portion 164, while the head-seated portion 150 is moving for escape from the head-base seated air-gap 162, whereby allowing the disengagement of the measurement head MH from the head base 130.

Thereafter, the user releases the operating member 178 from its depressed state, to thereby allow the return of the pivot member 170 from the release position to the engagement position by virtue of the elastic restoring force of the spring 176.

Next, the turntable unit RT will be described in more detail by referring to FIG. 4.

This turntable unit RT includes a turntable 184 on which the subject S is to be placed, and a support frame 186 which rotatably supports the turntable 184. The support frame 186 is in the form of a thin hollow box defining its upper and lower plate portions 188 and 189, and at an opening of the upper plate portion 188, an upper face of the turntable 184 is exposed. In the present embodiment, the lower plate portion 189 of the support frame 186 acts also as the table base 132.

The upper face of the turntable 184 is a support surface 190 on which the subject S to be photographed is placed. On the other hand, a rotary shaft 191 coaxially extends from a lower face of the turntable 184, and is rotatably supported by the support frame 186 via a bearing 192. The bearing 192 is held by a bearing holder 193 formed in the support frame 186.

A table-mounted motor 194 for rotating the turntable 184 is mounted on the support frame 186. A motor box 195 accommodating the table-mounted motor 194 is formed in the support frame 186.

This motor box 195 is formed on the upper face of the upper plate portion 188 of the support frame 186, so as to protrude upwardly the upper face. This motor box 195 defines its upper face located above the upper face of the turntable 184.

The configuration allows the motor box 195 to define its section (i.e., local portion) located above the upper face of the turntable 184, which, when the subject S has a portion lying outside a silhouette of the turntable 184 obtained by hypothetically projecting the turntable 184 coaxially, abut the portion of the subject S as a result of rotational motion of the subject S together with the turntable 184, to thereby alter the orientation of the subject S.

Accordingly, the motor box 195 acts not only as a portion for housing the table-mounted motor 194 but also as a position guide 196 guiding the position at which the subject S is located on the turntable 184.

For transmission of the rotational motion of the table-mounted motor 194 to the turntable 184, a motor gear 197 is coaxially fixed to a rotary shaft of the table-mounted motor 194, and a table gear 198 mating with this motor gear 197 is coaxially fixed to the turntable 184. The selection of a smaller diameter of the motor gear 197 than that of the table gear 198, allows the rotational motion of the table gear 198 to be transmitted to the turntable 184 with the rotation speed being reduced.

In the alternative, the table-mounted motor 194 may be placed within the support frame 186 so as not to protrude from the upper face of the upper plate portion 188 of the support frame 186.

In the present embodiment, however, the table-mounted motor 194 is placed over an area of the upper face of the upper plate portion 188 which area is outside an exposed surface of the turntable 184, and the placement would not suffer from any disadvantages, rather be more advantageous in configuring the support frame 186 so as to have a low profile.

Therefore, in the present embodiment, the placement of the table-mounted motor 194 so as to protrude from the upper face of the upper plate portion 188, provides the ability of more easily configuring the support frame 186 so as to have a low profile, in addition to the function of the position guide 196 described above.

Figure 5:
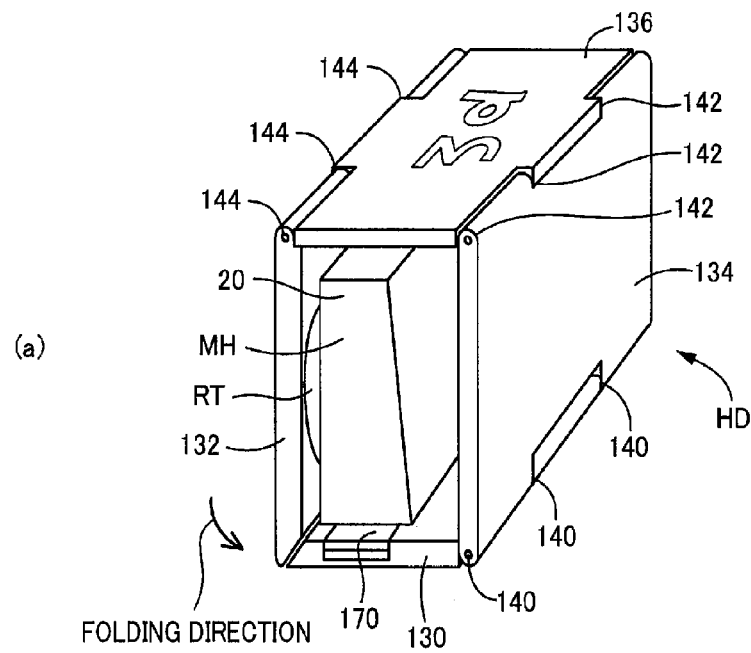
FIG. 5(*a*) is a perspective view illustrating the 3-D input device 10 depicted in FIG. 1 in a folded position, and FIG. 5(*b*) is a perspective view for explanation of how to retract the 3-D input device 10 into within an outer case OC.
Figure 5:
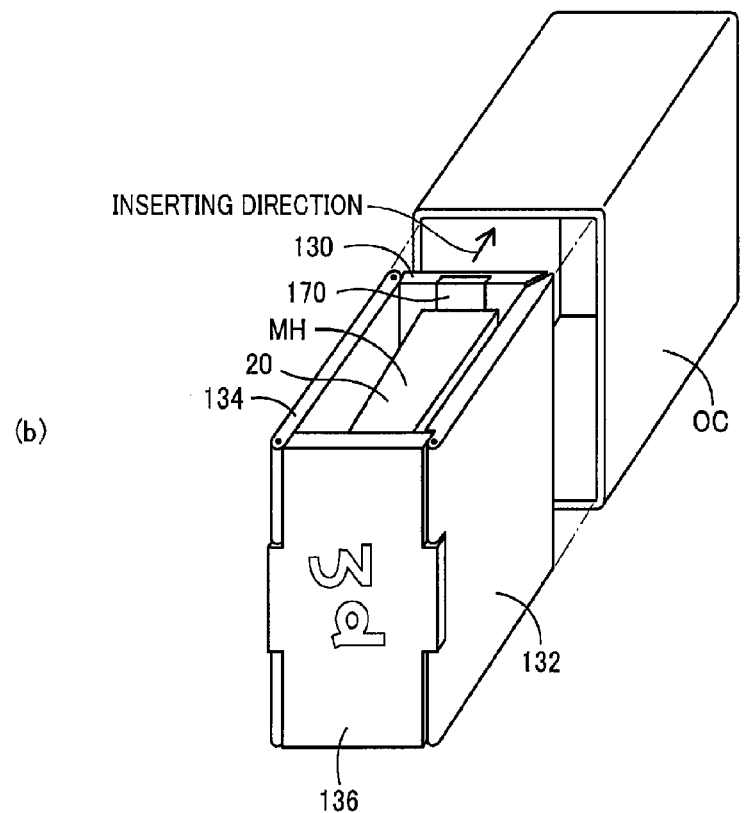

FIG. 5(*a*) is a perspective view illustrating the measurement head MH, the holder HD and the turntable unit RT, with the holder HD being folded so as to surround four faces of the measurement head MH comprised of the front and rear faces and the upper and lower faces, that is to say, with the holder HD being in a retracted position. The holder HD, when in the retracted position, takes an exterior shape generally in the form of a rectangular solid.

FIG. 5(*b*) is a perspective view illustrating how the holder HD and the turntable unit RT are inserted into and accommodated in the outer case OC with the holder HD being in the retracted position. In the present embodiment, the measurement head MH, the holder HD and the turntable unit RT are inserted into the outer case OC after the measurement head MH is tilted laterally 90 degrees.

This 3-D input device 10 operates in accordance with a user-selected one of the plurality of different operational-modes. These modes include the SLOW mode, the FAST mode and the OFF mode.

The SLOW mode is a slow-speed image-capture mode in which the 3-D input device 10 captures an image of the subject S at a slow speed and with high accuracy, that is to say, an image-capture-accuracy-preferred mode.

The FAST mode is a fast-speed image-capture mode in which the 3-D input device 10 captures an image of the subject S at a fast speed and with low accuracy, that is to say, an image-capture-time-preferred mode.

The OFF mode is selected for the user to deactivate the operation of the 3-D input device 10.

The image-capturing section 14 is configured to photograph the subject S, and to read out from at least one resultant photograph of the subject S, a selected one of a pixel-decimated image obtained by decimating a plurality of pixels composing a full image of the subject S, and a non-pixel-decimated image obtained without decimating the plurality of pixels. The image-capturing section 14 is further configured such that, upon completion of photographing of the subject S, the pixel-decimated image can be read out from at least one resultant photograph of the subject S within a time shorter than that required for reading out the non-pixel-decimated image.

In the applications of a photographing technique using a CCD (Charge Coupled Device), there are known an additive method and a selective method both of which are for use in reading out the pixel-decimated image from at least one resultant photograph of the subject S.

When the image decimation is performed in the additive method, a sum is calculated of detected illuminance values of target pixels belonging to each of pixel groups, which are obtained by grouping whole pixel composing a full image of the subject S, and, using the average of the calculated sum, a modification is made to the detected illuminance values of the target pixels belonging to each pixel group, for the target pixels to be assigned evenly distributed illuminance values over per each pixel group.

On the other hand, when the image decimation is performed in the selective method, one of target pixels belonging to each pixel group is selected as a representative pixel per each pixel group, and, using a detected illuminance value of the representative pixel, a modification is made to detected illuminance values of the target pixels belonging to each pixel group, for the target pixels to be assigned evenly distributed illuminance values over per each pixel group.

In the present embodiment, the image-capturing section 14 is designed to read out a pixel-decimated image from at least one resultant photograph of the subject S in a previously-selected one of the additive method and the selective method.

There are a pixel-decimated-image processing mode, in which the pixel-decimated image is read out from at least one resultant photograph of the subject S, and which is suitable for the slow-speed image-capture mode which allows the subject S to be photographed at a slow speed and with high accuracy, and a non-pixel-decimated-image processing mode, in which the non-pixel-decimated image is read out from at least one resultant photograph of the subject S, and which is suitable for the high-speed image-capture mode which allows the subject S to be photographed at a fast speed and with low accuracy.

In the present embodiment, the pixel-decimated-image processing mode is established upon a user selection of the FAST mode, while the non-pixel-decimated-image processing mode is established upon a user selection of the SLOW mode.

Figure 7:
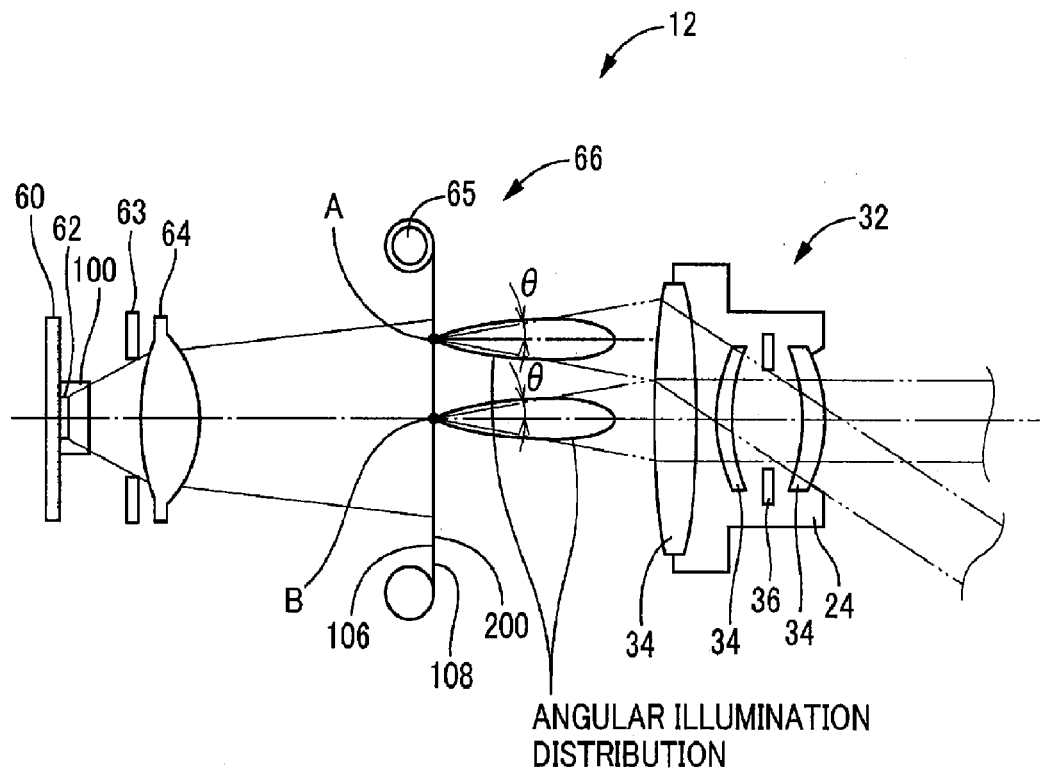
FIG. 7 is a plan view illustrating a projection unit 12 depicted in FIG. 1, in enlargement.

The projecting section 12 is a unit for projecting the patterned light onto the subject S. As illustrated in FIGS. 6 and 7, the projecting section 12 includes therein: a substrate 60; an LED (Light Emitting Diode) unit 62 (e.g., an LED unit having a single surface-emission-type LED element which emits light from a large emission surface); an illumination aperture stop 63; a light-source lens 64; a projection mechanism 66 having a mask film motor (e.g., in the form of a pulse motor, as a drive source) 65 for feeding a roll of mask film 200; and the projection optical system 32, all of which are disposed in series along a projection direction.

Figure 8:
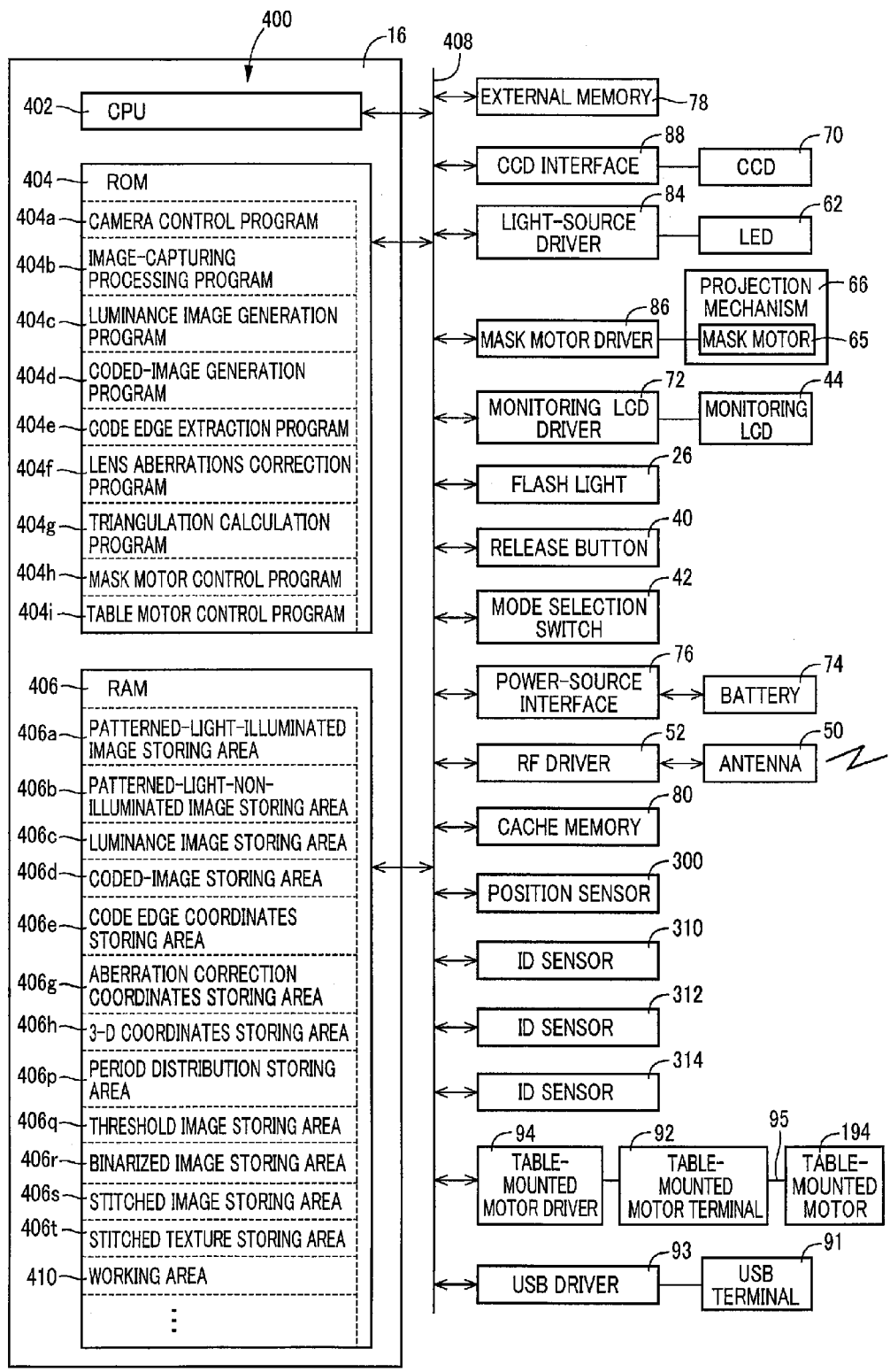
FIG. 8 is a block diagram conceptually illustrating an electrical configuration of the 3-D input device 10 depicted in FIG. 1.

FIG. 7 illustrates in greater detail the substrate 60, the LED unit 62, the illumination aperture stop 63, the light-source lens 64, the mask film 200, and the projection optical system 32, which are parts of the hardware configuration of the projecting section 12. FIG. 8 illustrates in greater detail the software and electrical configurations of the entire 3-D input device 10 including the projecting section 12. FIGS. 9-12 illustrate in greater detail the projection mechanism 66 which is a part of the hardware configuration of the projecting section 12.

The image-capturing section 14 is a unit for capturing an image of the subject S. As illustrated in FIG. 6, this image-capturing section 14 includes therein the image-capture optical system 30 and a CCD (Charge Coupled Device) 70 which are disposed in series in travel direction of incoming light representative of a real image of the subject S. The CCD 70 is configured to perform progressive scan using an interline transfer technology.

As illustrated in FIG. 6, the image-capture optical system 30 is constructed with a series of lenses. In operation, this image-capture optical system 30 adjusts the focal length and the aperture stop of the lenses automatically, using a well known auto-focus feature, resulting in the imaging of the externally incoming light on the CCD 70.

The CCD 70 is configured with a matrix array of photoelectric elements such as photodiode elements. In operation, this CCD 70 generates pixel-by-pixel signals indicative of an image focused onto the surface of this CCD 70 via the image-capture optical system 30, wherein the signals are indicative of colors and intensities of light forming the focused image. The generated signals, after conversion into digital data, are outputted to the processing section 16.

As illustrated in FIG. 8 in a block diagram, the processing section 16 is connected electrically to the flash light 26, the release button 40 and the mode selection switch 42, respectively. This processing section 16 is further connected electrically to the monitoring LCD 44 via a monitoring LCD driver 72, to the antenna 50 via the RF driver 52, and to a battery 74 via a power-source interface 76, respectively. The above-listed connected-components beginning with the flash light 26 are controlled by the processing section 16.

The processing section 16 is additionally connected electrically to an external memory 78 and a cache memory 80, respectively. This processing section 16 is still additionally connected electrically to the LED unit 62 via a light-source driver motor driver 86, and to the CCD 70 via a CCD interface 88, respectively. The above-listed connected-components beginning with the LED unit 62 are controlled by the processing section 16.

The external memory 78 is in the form of a removal flash-ROM which can store images captured in a stereoscopic-image mode, and 3-D information (including the above-described stitched texture). The external memory 78 may be prepared as a marketed device such as a SD card or a Compact Flash (registered trademark) card.

The cache memory 80 is a memory device enabling high-speed read and write of data. In an exemplary application, the cache memory 80 is used for transferring images captured in the digital-camera mode to the cache memory 80 at a high speed, and storing the transferred images in the external memory 78, after implementing desired image-processing. The cache memory 80 may be prepared as a conventional memory device such as a SDRAM or a DDRRAM.

The power-source interface 76, the light-source driver 84, the mask motor driver 86 and the CCD interface 88 are constructed as ICs (Integrated Circuits) which control the battery 74, the LED unit 62, the mask motor 65 of the projection mechanism 66, and the CCD 70.

As illustrated in FIG. 2(a), the measurement head MH is provided with an AC adapter terminal 90, a USB terminal 91 and a table-mounted motor terminal 92. As illustrated also in FIG. 6, the AC adapter terminal 90 is connected electrically to the battery 74, to thereby allow the 3-D input device 10 to use an external power source for supplying alternating current as a power source. As illustrated in FIG. 6, the USB terminal 91 is connected to the processing section 16 via a USB driver 93. As illustrated in FIG. 6, the table-mounted motor terminal 92 is connected to the processing section 16 via a table motor driver 94.

As illustrated in FIG. 1, there is an electric line in the form of a harness 95 extending out from the table-mounted motor 194 of the turntable unit RT. The harness 95 passes through the second intervening base 136, the first intervening base 134 and the head base 130 in the description order, and, as illustrated in FIG. 2(a), the harness 95 has an L-shaped plug 96 connected to the leading edge of the harness 95 for connection with the table-mounted motor terminal 92. The harness 95 acts as an electric line which allows a control signal and electric power to be supplied from the measurement head MH to the table-mounted motor 194. Accordingly, as illustrated in FIG. 8, the table-mounted motor 194 is brought into electrical connection with the processing section 16 via the table-mounted motor driver 94.

As illustrated in FIG. 1, a position of the harness 95 at which the harness 95 passes through the second intervening base 136 is defined by a harness clip 97, and a position of the harness 95 at which the harness 95 passes through the first intervening base 134 is defined by two harness clips 98 and 98.

As described above, the projecting section 12, as illustrated in FIG. 7, includes therein the substrate 60, the LED unit 62, the illumination aperture stop 63, the light-source lens 64, the projection mechanism 66 and the projection optical system 32, all of which are disposed in series in a projection direction of the patterned light.

The substrate 60, owing to the attachment to the LED unit 62, provides electrical wirings between the substrate 60 and the LED unit 62. The substrate 60 may be fabricated using, for example, an aluminum-made substrate to which an insulating synthetic resin is applied and thereafter a conductive pattern is formed by electroless plating, or a single- or multi-layered substrate having a core in the form of a glass-epoxy base material.

The LED unit 62 is a light source which emits umber-colored radiant light from a large area toward the projection mechanism 66, and which is accommodated in an LED casing 100.

As illustrated in FIG. 7, the illumination aperture stop 63 is provided for occluding an undesired portion of light emitted from the LED unit 62, to thereby direct only a desired portion of the light to the light-source lens 64. The light-source lens 64 is a lens which acts to converge radiant light emitted from the LED unit 62, and which is made up of optical plastics typified by acrylic plastics.

In the present embodiment, as illustrated in FIG. 7, the radiant light emitted from the LED unit 62 is efficiently converged or collected by the light-source lens 64, and light emitted from the LED unit 62, upon entry into the projection mechanism 66 generally at a right angle relative to a light-entrance surface 106 thereof, and finally, is emitted from a light-emitting surface 108 of the projection mechanism 66 in the form of radiant light, with enhanced directivity.

In this regard, the light-source lens 64 acts as a collimator lens. FIG. 7 is a graph showing the angular illumination distribution (therein, "θ" means a half spread-angle at half maximum), for explanation of the directivity of light beam emitted from the light-emitting surface 108 at two selected points A and B spaced apart from each other on the light-emitting surface 108.

The projection optical system 32 includes a plurality of projection lenses 34 for directing or projecting incoming light from the projection mechanism 66, toward the subject S to be imaged. The plurality of projection lenses 34 are arranged in a telecentric configuration formed by combining glass lens (es) and synthetic-resin lens(es).

The telecentric configuration enables principle rays passing through the projection optical system 32 to travel in parallel to its optical axis on the entrance side, and to define the position of an input pupil at infinity.

As illustrated above, the projection optical system 32 has a telecentric characteristic featured by an entrance numerical-aperture (NA) on the order of 0.1. An available optical path in the projection optical system 32, accordingly, is limited so as to allow light, only in the presence of an incidence angle of +5 degrees from normal, to pass through an internal aperture stop 36 within the projection optical system 32.

Therefore, in the present embodiment, the telecentric configuration of the projection optical system 32 allows easy improvement of image quality, in cooperation with an additional configuration which allows light passing through the projection mechanism 66, only in the presence of an incident angle of ±5 degrees from normal, to be projected onto the projection optical system 32.

Then, the projection mechanism 66 as a hardware constituent of the projecting section 12 will be described in more detail by referring to FIGS. 9-12.

Figure 9:
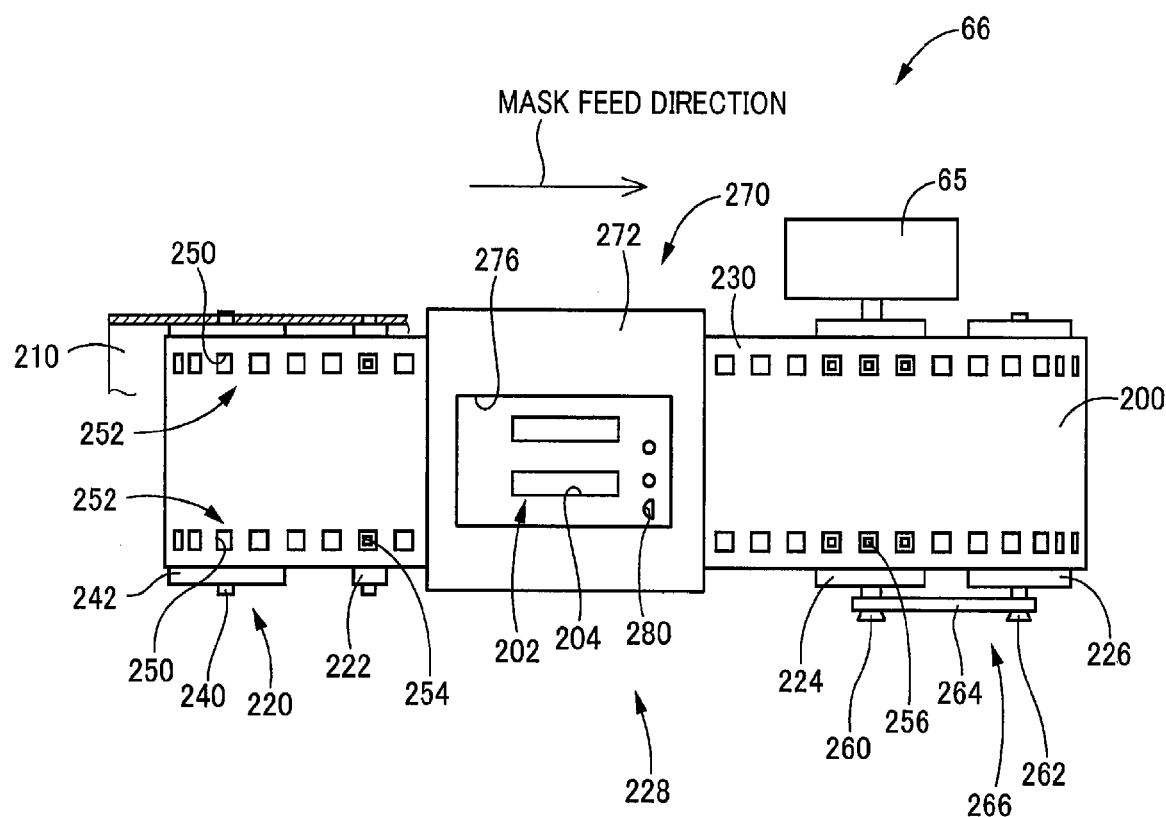
FIG. 9 is a front view illustrating a projection mechanism 66 depicted in FIG. 6.
Figure 10:
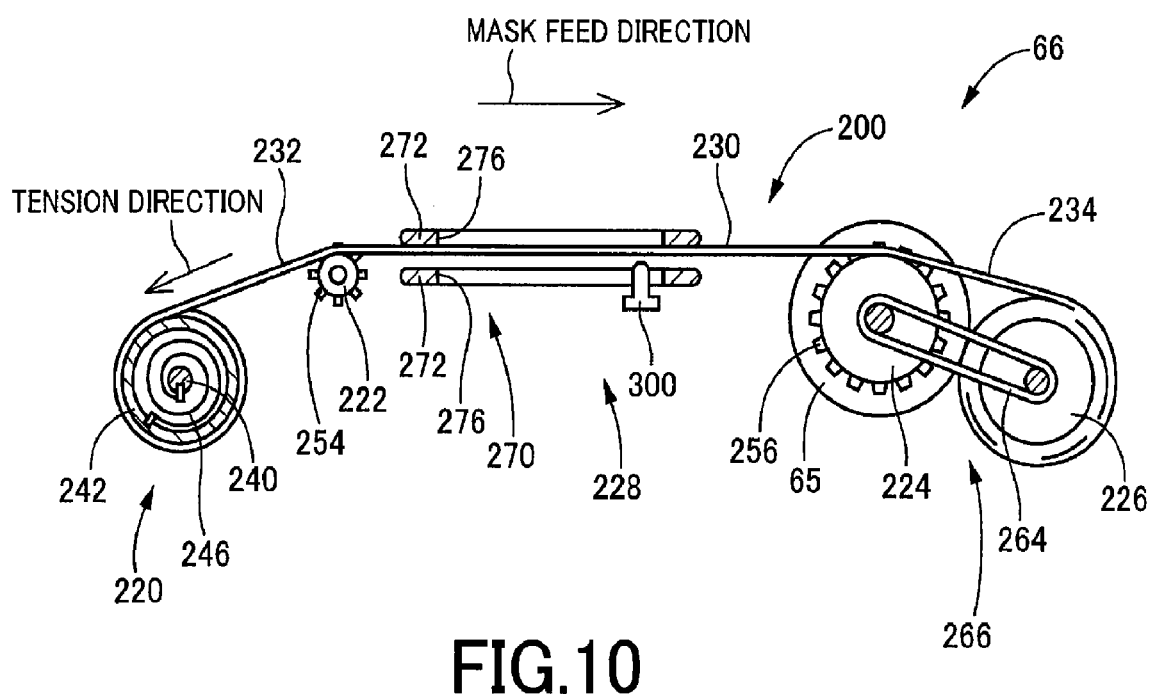
FIG. 10 is a side view illustrating the projection mechanism 66 depicted in FIG. 9, partly in section.

This projection mechanism 66 is provided for transforming the incoming light emitted from the LED unit 62 acting as the light source, into a selected one of a plurality of various light patterns, to thereby sequentially project the thus-transformed light patterns onto the subject S. FIG. 9 is a front view illustrating this projection mechanism 66, and FIG. 10 is a side view illustrating this projection mechanism 66 partly in section.

As illustrated in FIG. 9, this projection mechanism 66 is provided with the mask film 200 which is sheet-shaped, extends in its own longitudinal direction, and is fed in the longitudinal direction by the mask motor 65.

Figure 11:
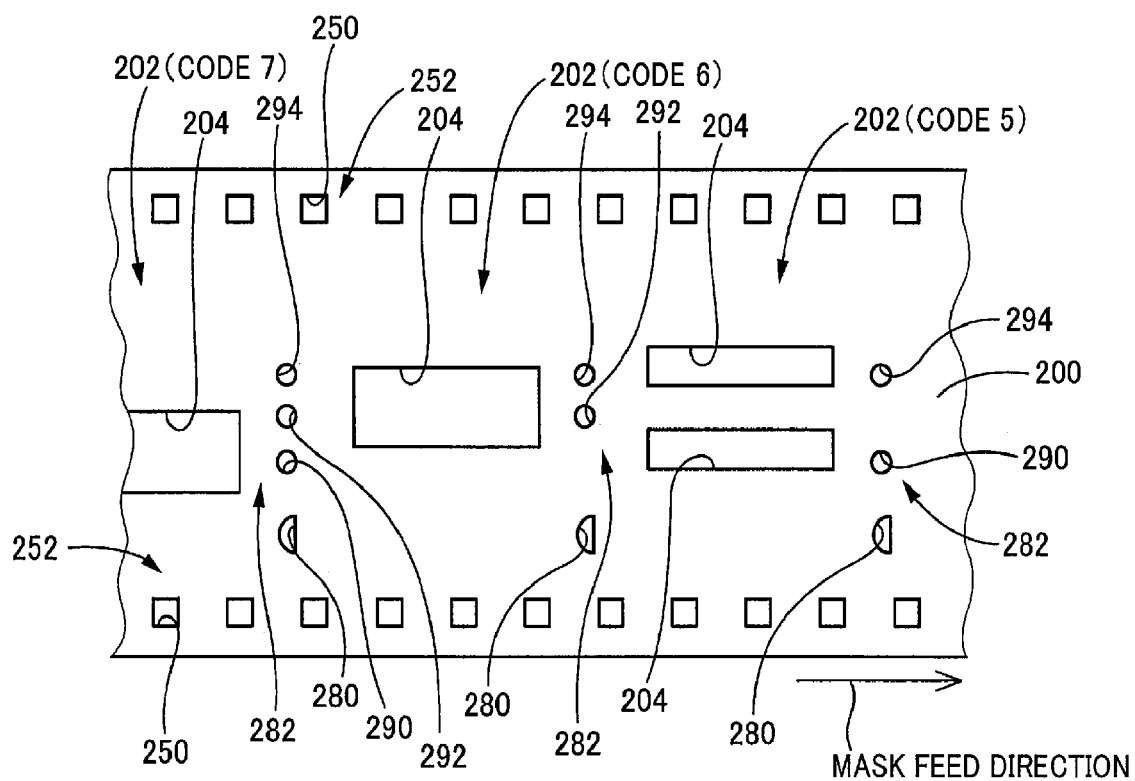
FIG. 11 is a front view partly illustrating a mask 200 depicted in FIG. 9, in enlargement.

FIG. 11 is a front view illustrating in enlargement a fractional lengthwise portion of the mask film 200. The mask film 200 are assigned a plurality of successive frames 202 in a linear array along the longitudinal direction of the mask film 200, which frames 202 correspond to the aforementioned plurality of various light patterns, respectively. As illustrated in FIG. 9, a successively-selected one of these frames 202 is located at an illuminated region by the aforementioned incoming light.

In the present embodiment, for photographing the subject S, eight light patterns are successively projected onto the subject S. FIG. 11 representatively illustrates one of the frames 202 for forming a light pattern whose pattern number PN is "5" (labeled "code 5" in FIG. 11), one of the frames 202 for forming a light pattern whose pattern number PN is "6" (labeled "code 6" in FIG. 11), and one of the frames 202 for forming a light pattern whose pattern number PN is "7" (labeled "code 7" in FIG. 11).

The mask film 200 is provided, per each frame 202, with at least one through hole (air opening) 204 formed in the mask 200 so as to penetrate the mask film 200 thicknesswise direction, in the shape corresponding to that of a light pattern unique to each frame 202.

As illustrated in FIG. 11, for every frame 202, each through hole 204 is in the shape of a linear slit. For ones of the frames 202 which each have two or more of the through holes 204, these through holes 204 are arranged to be striped per each frame 202.

Additionally, in the present embodiment, each through hole 204 is oriented, in every frame 202, so as to extend in parallel to the longitudinal direction of the mask film 200.

The mask film 200 is flexible in a plane parallel to both the longitudinal and thickness directions of the mask film 200. This mask film 200 is made up of a thin metal-sheet. An example of the metal making up the mask film 200 is opaque elastic material, and an example of the material is stainless steel. The mask film 200 has a thickness of 0.1 mm, for example.

In the present embodiment, the mask film 200 is fabricated by forming the plurality of through holes 204 in a stainless steel-sheet with the thickness of 0.1 mm with a micron order of accuracy, through wet etching of the stainless steel-sheet.

This mask film 200 is featured by such elastic flexibility that allows the mask film 200 which has been taken up by suitable rollers for storage as described below, to return to its original flat-plane shape when the mask film 200 is unwound from the rollers.

As illustrated in FIG. 9, the projection mechanism 66 has a housing 210 which allows the mask film 200 to be fed and to be held in a retractable manner. This housing 210 supports a supply roller 220 acting as a supply tool, a guide roller 222 acting as a guide tool, a feed roller 224 acting as a feed tool and a take-up roller 226 acting as a take-up tool, all of which have respective parallel axes. All the axes of the supply roller 220, the guide roller 222, the feed roller 224 and the take-up roller 226 extend in parallel to the width direction of the mask film 200.

As illustrated in FIG. 10, the mask film 200 is coupled at both ends, longitudinally spaced-apart to the supply roller 220 and the take-up roller 226, respectively. Further, the mask film 200 is located, between the supply roller 220 and the take-up roller 226, and supported by the guide roller 222 near the supply roller 220 and the feed roller 224 near the take-up roller 226.

When the 3-D input device 10 is not in use, almost all of the mask film 200 is wound around the supply roller 220, not the take-up roller 226, and, in this state, the mask film 200 is accommodated within the 3-D input device 10. That is to say, an unused portion of the mask film 200 is wound around and received in the supply roller 220, and the supply roller 220 is a roller for receiving the unused portion of the mask film 200 in flexed state.

The unused portion of the mask film 200, upon initiation of one cycle of photographing the subject S, is fed toward the take-up roller 226 after being unwound from the supply roller 220 as a result of the normal (forward) rotation of the mask motor 65. The unused portion of the mask film 200, after being used for photographing the subject S, is taken up by and received in the take-up roller 226 as a used portion. That is to say, the take-up roller 226 is a roller for receiving the used portion of the mask film 200 in flexed state.

At the time that one cycle of photographing the subject S is completed, almost all of the mask film 200 is wound around the take-up roller 226 not the supply roller 220, and, in this state, the mask film 200 is accommodated within the 3-D input device 10.

Thereafter, in preparation for the next cycle of photographing, almost all of the mask film 200 is wound around the supply roller 220 not the take-up roller 226, as a result of the reverse rotation of the mask motor 65, whereby the mask film 200 is accommodated within the 3-D input device 10 with the mask film 200 being wound around the supply roller 220.

As illustrated in FIG. 10, there is defined an illuminated position 228 which is located between the guide roller 222 and the feed roller 224, and at which the incoming light from the LED unit 62 illuminates the mask film 200. A fractional lengthwise portion of the mask film 200 which is supported at both ends of the portion by the guide roller 222 and the feed roller 224, respectively, constitutes a rectilinear portion 230 which passes through the thus-defined illuminated position 228 in a direction perpendicular to the incoming light.

As illustrated in FIG. 10, in the present embodiment, the mask film 200 includes a portion 232 which is supported at both ends of the portion 232 by the supply roller 220 and the guide roller 222, respectively, (i.e., a portion located on the left-hand side of the rectilinear portion 230 in FIG. 10), and a portion 234 which is supported at both ends of the portion 234 by the feed roller 224 and the take-up roller 226, respectively, (i.e., a portion located on the right-hand side of the rectilinear portion 230 in FIG. 10), with these portions 232 and 234 being inclined with respect to the rectilinear portion 230 in the same direction.

When the inclination angles of the portions 232 and 234 are selected to be smaller, it is more desirable to reduce an unintended increase in the curvature of the rectilinear portion 230 which is induced from elastic flexes of the portions 232 and 234 with respect to the rectilinear portion 230.

On the other hand, when the inclination angles of these portions 232 and 234 are selected to be larger, it is the more desirable to downsize this projection mechanism 66 in the longitudinal direction of the mask film 200.

As illustrated in FIG. 10, the mask film 200 film is coupled at both ends, longitudinally spaced-apart to the supply roller 220 and the take-up roller 226, respectively.

The supply roller 220 is configured to include the shaft 240 fixed to the housing 210, and a roller portion 242 coaxially surrounding the shaft 240. The roller portion 242 is supported so as to be coaxially with and rotatable relative to the shaft 240.

This roller portion 242, to which the mask film 200 is fixed at one of both ends, allows the mask film 200 to be wound around the outer circumferential surface of the roller portion 242, as a result of the rotational motion of the roller portion 242. One of both directions of rotation of the roller portion 242 in which the mask film 200 is wound onto the roller portion 242, is a return direction of rotation, while the other a feed direction of rotation in which the mask film 200 is unwound from the roller portion 242.

The roller portion 242 is engaged with a spring 246 acting as a biasing member, whereby the roller portion 242 is inevitably biased in the return direction of rotation. The spring 246 is used such that, as illustrated in FIG. 10, for example, the spring 246 is engaged with the roller portion 242 acting as a movable member and the shaft 240 acting as a stationary member located within a radial clearance left between the roller portion 242 and the shaft 240.

As illustrated in FIG. 10, for example, the spring 246 is formed as a leaf spring 176 which is wound around the outer circumferential surface of the shaft 240. The elastic force of the spring 246 allows the mask film 200 to be tensioned in its longitudinal direction.

As illustrated in FIGS. 9 and 11, the mask film 200 is configured to have perforation areas 252 and 252 formed at both lateral edges of the mask film 200, respectively, each of which is comprised of a plurality of feed holes 250 in a linear array along the length of the mask film 200.

The guide roller 222 and the feed roller 224 have a plurality of teeth 254 and a plurality of teeth 256, respectively, with each tooth 254, 256 penetrating through each feed hole 250 for engagement therewith. In the present embodiment, as illustrated in FIG. 10, for both the guide roller 222 and the feed roller 224, the plurality of teeth 254 and 256 are arrayed at equal intervals on the outer circumferential surfaces of the guide roller 222 and the feed roller 224, respectively.

The guide roller 222 is a free roller, while the feed roller 224 is a driven roller driven by the mask motor 65. As illustrated in FIG. 9, in the present embodiment, the mask motor 65 is coaxially coupled to the feed roller 224 which is driven for rotation by the mask motor 65.

One of both directions of rotation of the feed roller 224 in which the mask film 200 is unwound from the supply roller 220, is a feed direction of rotation, while the other in which a the mask film 200 is wound onto the supply roller 220 is a return direction of rotation.

As illustrated in FIG. 10, the mask motor 65 has the function of rotating the feed roller 224 and the function of rotating the take-up roller 226 in synchronization with the feed roller 224. To this end, the mask motor 65 is configured to perform a selected one of a normal rotation in which the mask film 200 is taken up by the take-up roller 226, with the mask film 200 being fed, and a reverse rotation in which the mask film 200 is unwound from the take-up roller 226, with the mask film 200 being supplied to the supply roller 220.

As illustrated in FIG. 9, in the present embodiment, a drive pulley 260 is formed as a rotating body which is rotated coaxially and integrally with the feed roller 224 and the mask motor 65, and a driven pulley 262 is formed as a rotating body which is rotated coaxially and integrally with the take-up roller 262, around both of which a belt 264 acting as a power transmissive medium is wound. The thus-configured transmission mechanism 266 transmits the rotational force of the mask motor 65 to the take-up roller 226.

As illustrated in FIGS. 9 and 10, the projection mechanism 66 is provided with a mask guide 270 disposed at the illuminated position 228. The mask guide 270 is provided for guiding the rectilinear portion 230 of the mask film 200 for feeding.

In the present embodiment, the mask guide 270 is structured to allow the rectilinear portion 230 of the mask film 200 to be sandwiched between two portions of the mask guide 270 located at opposite faces of the rectilinear portion 230 to each other in thicknesswise direction, and more specifically, the mask guide 270 includes a pair of guide plates 272 and 272 oppositely facing with each other with the rectilinear portion 230 of the mask film 200 being interposed between the guide plates 272 and 272. This mask guide 270 holds the mask film 200 so as to allow the sliding motion of the mask film 200 in longitudinal direction, with unintended deformation of the mask film 200 in lateral direction being minimized.

Each guide plate 272 is configured to have an window 276 which is formed through each guide plate 272 in thicknesswise direction. This window 276 is, as with the through holes 204, formed in the mask film 200 in the form of an airopening. Only a portion of the incoming light emitted from the LED unit 62 which passes through the window 276 is projected onto the mask film 200.

As illustrated in FIG. 11, reference holes 280 and ID hole regions 282 are formed in the mask film 200 such that, per each frame 202 of the mask film 200, the corresponding one of the reference holds 280 and the corresponding one of the ID hole regions 282 are in a linear array along the widthwise direction of the mask film 200. The reference holes 280 and the ID hole regions 282 are each formed in the mask film 200 in the form of a through hole (i.e., air opening).

The reference holes 280 are provided for optically detecting an event that one of the frames 202 is located just at the illuminated position 228. On the other hand, the ID hole regions 282 are provided for optically identifying the ID of the one frame 202 located at the illuminated portion 228, namely, the pattern number "PN."

In the present embodiment, each ID hole region 282 is for distinguishing the corresponding one of the eight frames 202, that is to say, the corresponding one of the eight light patterns, using information indicated by three-bit data. To this end, per each frame 202, the ID holes 290 whose maximum number is three are formed in the corresponding ID hole region 282.

Figure 12:
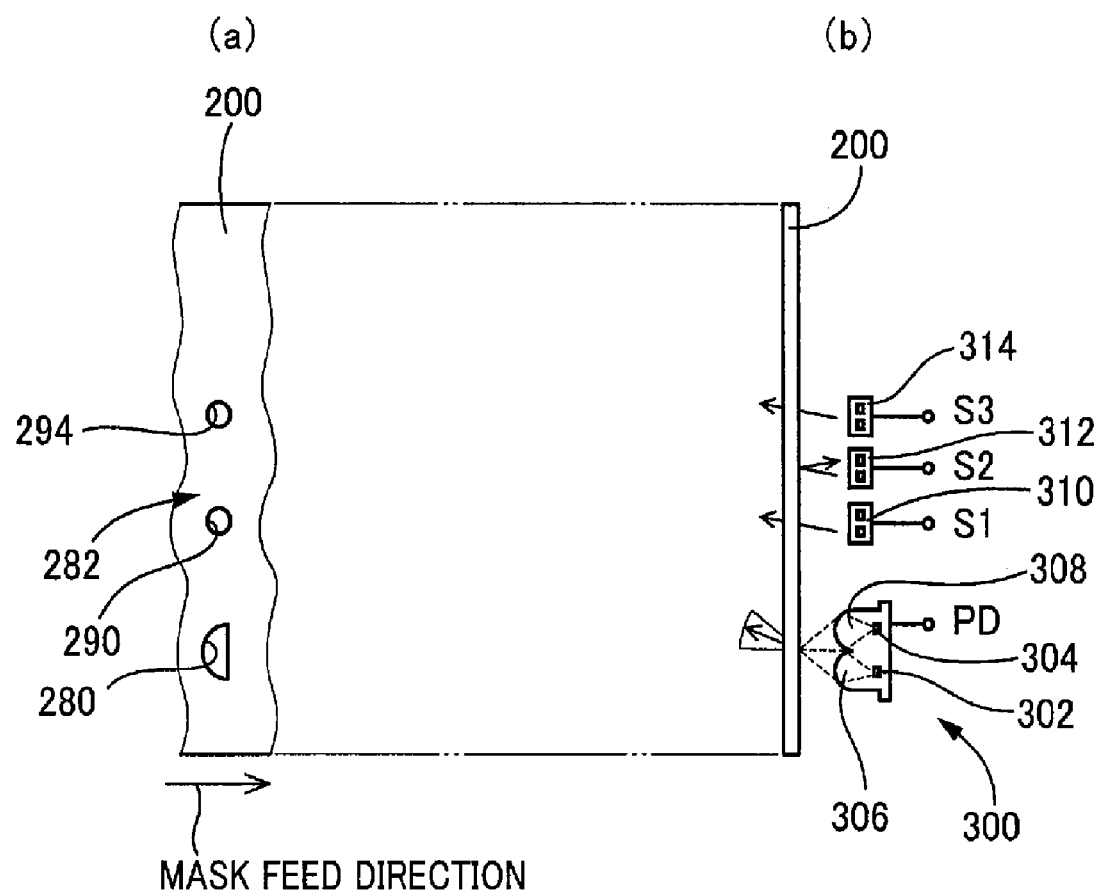
FIG. 12(*a*) is a front view partly illustrating the mask 200 depicted in FIG. 9, and FIG. 12(*b*) is a side view illustrating a position sensor 300 and first through third ID sensors 310-314, all of which are depicted in FIG. 8, together with the mask 200.

As illustrated in FIG. 12, the projection mechanism 66 incorporates a position sensor 300 for optically detecting a successively-selected one of the reference holes 280 which is located so as to oppositely face the position sensor 300 located at a pre-selected position with respect to the widthwise direction of the mask film 200. In the present embodiment, for the position sensor 300 to detect the reference holes 280 with increased position accuracy, the position sensor 300 emits a focused beam toward the mask film 200, and receives a focused beam reflected from the mask film 200.

To this end, the position sensor 300 includes an LED (Light Emitting Diode) 302 acting as a light-emitting element, a photo diode (hereinafter, referred to as "PD") 304 acting as a light-receiving element, an LED lens 306 acting as a light-collecting element for the LED 302, and a PD lens 308 acting as a light-collecting element for the PD 304. This position sensor 300, as illustrated in FIG. 8, is electrically connected to the processing section 16.

The PD 304 outputs a signal PD which varies in level depending on whether or not the PD 304 has received the reflected light from the mask film 200. More specifically, as illustrated in a timing chart in FIG. 13, the signal PD becomes high in response to reflection of the light beam, upon emission from the position sensor 300, from the mask film 200 into the position sensor 300 because of the absence of the reference holes 280 facing the position sensor 300, while the signal PD becomes low in response to passage of the light beam, upon emission from the position sensor 300, through the corresponding one of the reference holes 280 without entering the position sensor 300, because of the presence of one of the reference holes 280 facing the position sensor 300.

The LED lens 306 has the ability of collecting light from the LED 302 and emitting the collected light to the mask film 200. The PD lens 308 has the ability of collecting reflected light from the mask film 200 and emitting the collected reflected light toward the PD 304. The LED lens 306 and the PD lens 308 allow the positions of the individual reference holes 280 and therefore the positions of the individual frames 202, to be detected with high accuracy.

As illustrated in FIG. 12, the projection mechanism 66 additionally includes first to third ID sensors 310, 312 and 314 for optically detecting the ID holes 290, 292 and 294, respectively. The first to third ID sensors 310, 312 and 314 are disposed at positions coincident with those of the three ID holes 290, 292 and 294, respectively, with respect to the widthwise direction of the mask film 200. Each ID sensor 310, 312 and 314 includes a light-emitting element which emits light toward a selected one of the ID hole regions 282 and a light-receiving element which receives the reflected light from the selected ID hole region 282.

The three light-receiving elements included in the first to third ID sensors 310, 312 and 314 are adapted to output signals as signals S1 to S3, respectively, each indicative of the presence/absence of the reflected light from a selected one of the ID hole regions 282. Each signal S1, S2, S3 varies in level as with the signal PD described above. As illustrated in FIG. 8, each ID sensor 310, 312 and 314 is electrically connected to the processing section 16, as with the position sensor 300.

Figure 13:
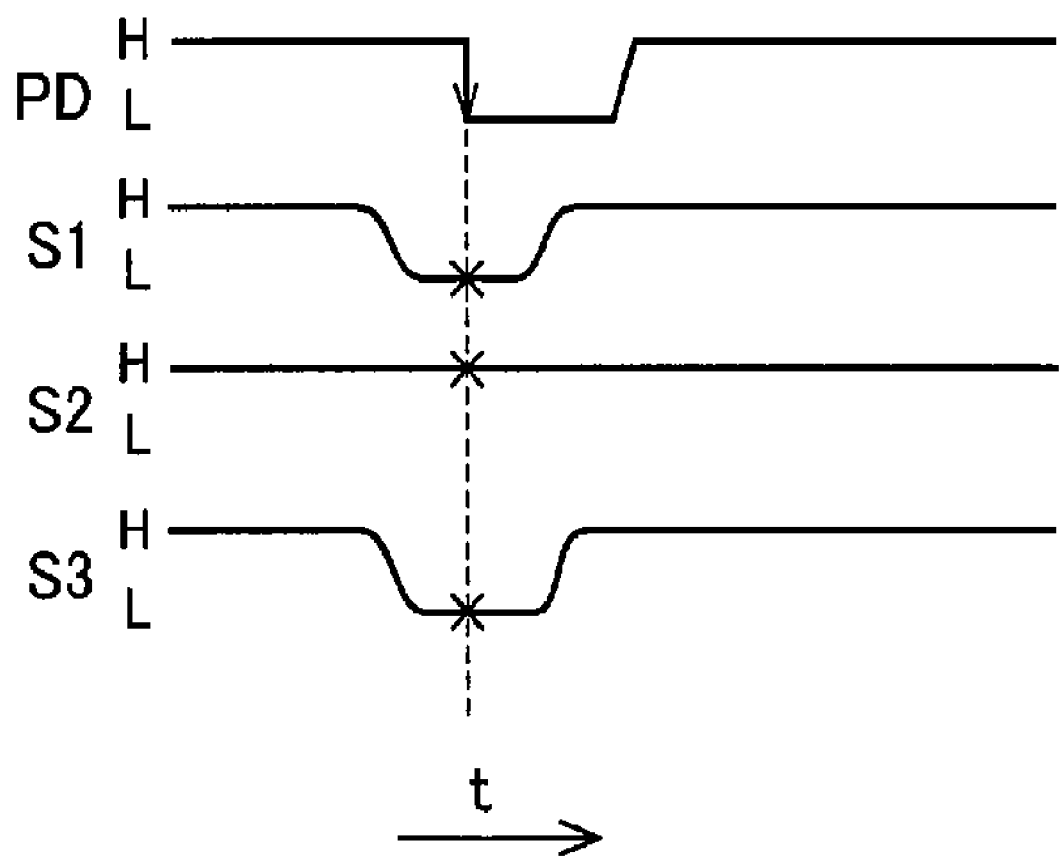
FIG. 13 is a timing chart for explanation of a signal PD of the position sensor 300 depicted in FIG. 12 and signals S1-S3 of the first through third ID sensors 310-314 depicted in FIG. 12.

FIG. 13 is a timing chart showing how the signal PD and the signals S1 to S3 vary in synchronization with one another, by way of example. In the processing section 16, as will be described in more detail later, an event that the signal PD changes from high to low level as a result of any one of the reference holes 280 being brought to face the position sensor 300 during the feeding of the mask film 200 because of the drive of the mask motor 65, triggers the signals S1 to S3 to be sampled by the first to third ID sensors 310, 312 and 314, respectively.

In an example of the mask film 200 illustrated in FIG. 12, the signals S1 and S3 change from high to low level as a result of the first and third ID sensors 310 and 314 being brought to face the ID holes 290, 294, respectively, while the signal S2 held high in level because the second ID sensor 312 does not face the ID hole 292. The ID of one of the frames 202 which has been detected by the position sensor 300, namely, the unique pattern number "PN" is identified using the combination of the levels of the sampled signals S1 to S3.

Referring next to FIG. 8, the electric configuration of the 3-D input device 10 is illustrated in a block diagram.

The processing section 16 is configured to include as a major component a computer 400 which is constructed to incorporate therein a CPU (Central Processing Unit) 402, a ROM (Read Only Memory) 404, a RAM (Random Access Memory) 406 and a bus 408.

The CPU 402 executes programs stored in the ROM 404 while using the RAM 406, thereby performing various sets of processing such as the detection of the status of the release button 40, the retrieval of image data from the CCD 70, the transfer and storage of the retrieved image-data, the detection of the status of the mode selection switch 42, etc.

The ROM 404 has stored therein a camera control program 404a, an image-capturing processing program 404b, a luminance image generation program 404c, a coded-image generation program 404d, a code edge extraction program 404e, a lens aberrations correction program 404f, a triangulation calculation program 404g, a mask motor control program 404h and a table-mounted motor control program 404i.

Figure 14:
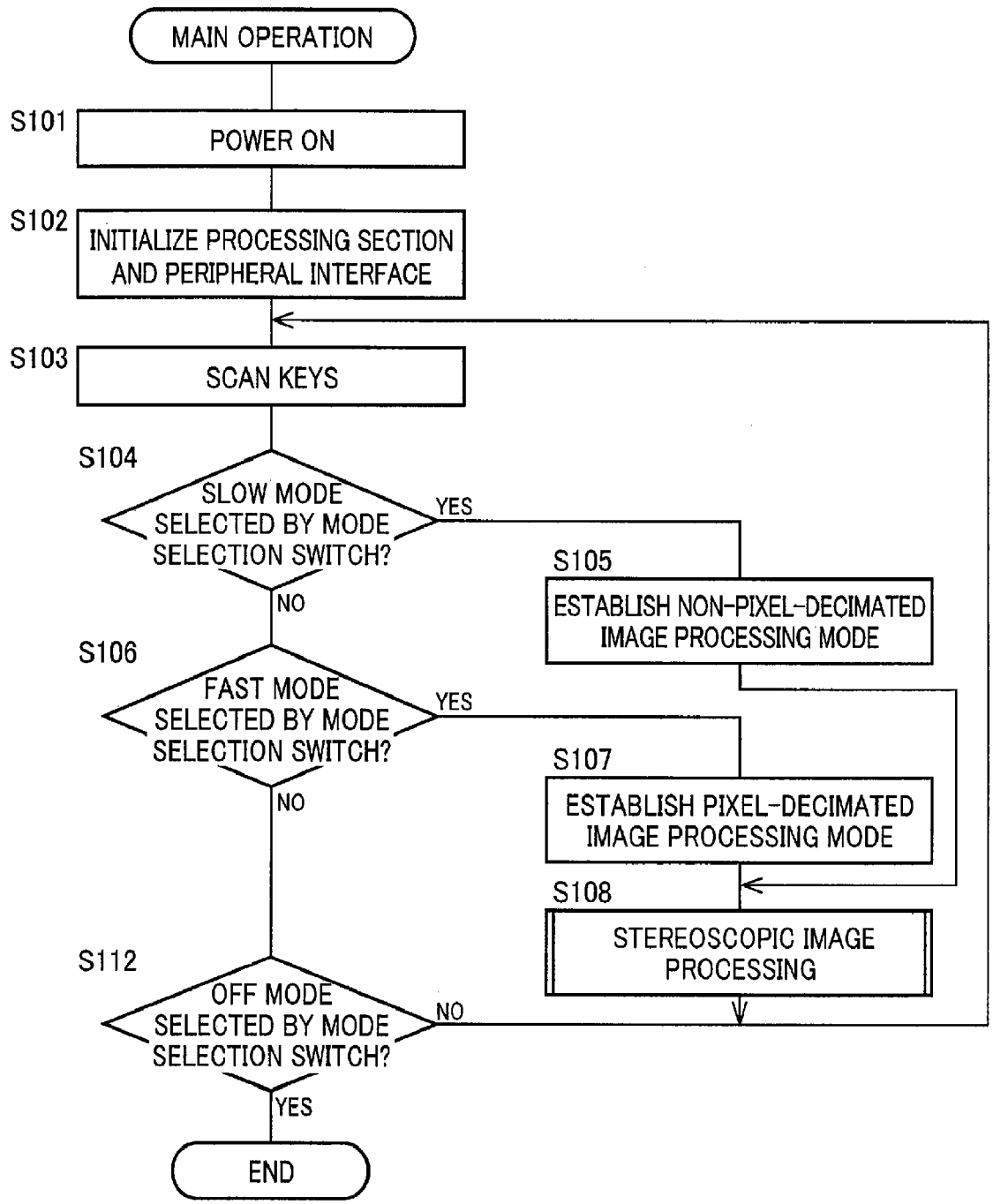
FIG. 14 is a flow chart conceptually illustrating a main operation implemented in a camera control program depicted in FIG. 8.

The camera control program 404a is executed to perform the total control of the 3-D input device 10, wherein the total control includes a main operation conceptually illustrated in a flow chart in FIG. 14.

The image-capturing processing program 404b is executed to photograph the subject S, with illumination by a light pattern (i.e., projection pattern), for detection of the 3-D shape of the subject S, thereby acquiring a corresponding patterned-light-illuminated image, and also photograph the same subject S, without illumination by a light pattern, thereby acquiring a corresponding patterned-light-non-illuminated image.

The luminance image generation program 404c is executed to generate a plurality of luminance images corresponding to a plurality of patterned-light-illuminated images, respectively, based on RGB values of individual pixels acquired for the same subject S by execution of the image-capturing processing program 404b.

In the present embodiment, a plurality of different light-patterns are successively projected onto the same subject S, and the subject S is imaged or digitally photographed each time each light pattern is projected onto the subject S, thereby acquiring the RGB values of individual pixels for each of the thus-obtained patterned-light-illuminated images, eventually resulting in the generation of a plurality of luminance images having the same total-number as that of the light patterns.

The coded-image generation program 404d is executed to generate from binarized images, a coded image having space codes allocated to respective pixels of the coded image. The binarized images are generated as a result of the thresholding of individual luminance-images which are generated as a result of the execution of the luminance image generation program 404c.

Described schematically, upon initiation of this coded-image generation program 404d, a representative one of the plurality of luminance images is selected which was obtained when the subject S was illuminated by one of the plurality of light patterns that has the smallest pitch distance between adjacent pattered lines (i.e., stripes) among those of the plurality of light patterns.

Further, variable distances between adjacent twos of the patterned lines in the representative luminance-image are calculated as spacings or periods (i.e., cycle times), and the distribution of the calculated periods over the entire representative luminance-image is calculated as a period distribution.

Upon initiation of this coded-image generation program 404d, additionally, a local variable-size window is provided in common to the luminance images associated with different light-patterns, so as to have a size variable along the profile of the calculated period-distribution of the representative luminance-image, thereby filtering the entire representative luminance-image using the thus-provided variable-size window.

The filtering is performed for calculating and determining local thresholds over the entire representative luminance-image, thereby generating a threshold image indicative of the distribution of the thus-determined thresholds. From the relation between the thus-generated threshold image and each of the different luminance-images, binarized images are generated on a light-pattern-by-light-pattern basis.

A technique of filtering the entire representative luminance-image using the thus-provided variable-size window for calculating local thresholds over the entire luminance-image, is disclosed in more detail in Japanese Patent Application No. 2004-285736 that was filed by the same applicant as that of the present application, the disclosure of which is herein incorporated by reference in its entirety.

The code edge extraction program 404e is executed to calculate code edge coordinates (coordinates of edges separating uniform coded-areas) with sub-pixel accuracy, by the use of both a coded image generated by the execution of the coded-image generation program 404d and the luminance images generated by the execution of the luminance image generation program 404c.

The lens aberrations correction program 404f is executed to process the code edge coordinates generated with sub-pixel accuracy by the execution of the code edge extraction program 404e, for correction for aberrations or distortion due to the image-capture optical system 30.

The triangulation calculation program 404g is executed to calculate from the code edge coordinates which have been aberrations-corrected by the execution of the lens aberrations correction program 404f, 3-D coordinates defined in a real space which correspond to the aberrations-corrected code edge coordinates.

The mask motor control program 404h is executed to control the mask motor 65 for successively projecting a plurality of different light-patterns onto the subject S. The mask motor control program 404h is conceptually illustrated in a flow chart in FIG. 18.

The table-mounted motor control program 404i is executed to control the table motor 194 for allowing indexing rotation of the turntable 184 together with the subject S. This table-mounted motor control program 404i is conceptually illustrated along with other processing, in a flow chart in FIG. 16.

In the present embodiment, sequential projection of a series of the aforementioned light patterns onto the subject S and sequential image-capture operations of the subject S are performed in combination each time the subject S is angularly indexed at equal intervals.

More specifically, the subject S is angularly and intermittently indexed 90 degrees, and, at each indexing position, the sequential projection of a series of light patterns and the sequential image-capture operations are performed for the subject S.

As a result, the overall area of the exterior surface of the subject S is divided into four sub-areas, and stereoscopic images (i.e., 3-D shape information) are acquired for the four sub-areas, respectively. The thus-acquired stereoscopic-images, after are processed removal of overlapped portions therebetween, combined together, whereby a single full image corresponding to the subject S is generated as a stitched image.

Additionally, in the present embodiment, as a result of mapping of the surface color information previously measured for the same subject S onto the generated stitched image, a stitched texture is generated. Then, a series of 3-D input operations for the subject S is terminated.

As illustrated in FIG. 8, the RAM 406 has memory areas assigned to the following:

a patterned-light-illuminated image storing area 406a;
a patterned-light-non-illuminated image storing area 406b;
a luminance image storing area 406c;
a coded-image storing area 406d;
a code edge coordinates storing area 406e;
an aberration correction coordinates storing area 406g;
a 3-D coordinates storing area 406h;
a period distribution storing area 406p;
a threshold image storing area 406q;
a binarized image storing area 406r;
a stitched image storing area 406s;
a stitched texture storing area 406t; and
a working area 410.

The patterned-light-illuminated image storing area 406a is used for storage of data indicative of a patterned-light-illuminated image captured as a result of the execution of the image-capturing processing program 404b. The patterned-light-non-illuminated image storing area 406b is used for storage of data indicative of a patterned-light-non-illuminated image captured as a result of the execution of the image-capturing processing program 404b.

The luminance image storing area 406c is used for storage of data indicative of luminance images resulting from the execution of the luminance image generation program 404c. The coded-image storing area 406d is used for storage of data indicative of a coded image resulting from the execution of the coded-image generation program 404d. The code edge coordinates storing area 406e is for use in storing data indicative of code edge coordinates extracted with sub-pixel accuracy by the execution of the code edge extraction program 404e.

The aberration correction coordinates storing area 406g is used for storage of data indicative of the code edge coordinates processed for the aberrations correction by the execution of the lens aberrations correction program 404f. The 3-D coordinates storing area 406h is used for storage of data indicative of 3-D coordinates in the real space calculated by the execution of the triangulation calculation program 404g.

The period distribution storing area 406p, the threshold image storing area 406q and the binarized image storing area 406r are used for storage of data indicative of the period distribution, data indicative of the threshold image, and data indicative of the binarized images, respectively, all acquired by the execution of the coded-image generation program 404d.

The stitched image storing area 406s is used for storage of the aforementioned stitched image. The stitched texture storing area 406t is used for storage of the aforementioned stitched texture. The working area 410 is used for storage of data which is temporarily used for the operation of the CPU 402.

Referring next to FIG. 14, the camera control program 404a will be described below. As a result of the execution of this program 404a by the computer 400, the aforementioned main operation is performed.

The main operation starts with step S101 to power on a power source including the battery 74, which is followed by step S102 to initialize the processing section 16, a peripheral interface, etc.

Subsequently, at step S103, a key scan is performed for monitoring the status of the mode selection switch 42, and then, at step S104, a determination is made as to whether or not the SLOW mode has been selected by the user through the mode selection switch 42.

If so, then the determination of step S104 becomes "YES" and operations progress to step S105 to establish the aforementioned non-pixel-decimated-image processing mode. Upon completion of this step S105, operations progress to step S108 described later in more detail, and subsequently, returns to step S103.

If, however, the SLOW mode has not been selected by the user through the mode selection switch 42, then the determination of step S104 becomes "NO," and operations progress to step S106 to make a determination as to whether or not the FAST mode has been selected by the user through the mode selection switch 42. If so, then the determination of step S106 becomes "YES," and operations progress to step S107 to establish the aforementioned pixel-decimated-image processing mode.

Upon completion of step S107, operations progress to step S108 described later in more detail, and subsequently, returns to step S103.

If, however, the FAST mode has not been selected by the user through the mode selection switch 42, then the determination of step S106 becomes "NO," and operations progress to step S112 to make a determination as to whether or not the OFF mode has been selected by the user through the mode selection switch 42.

If so, then the determination of step S112 becomes "YES" with immediate termination of this main operation, and otherwise the determination of step S112 becomes "NO" with return to step S103.

Figure 15:
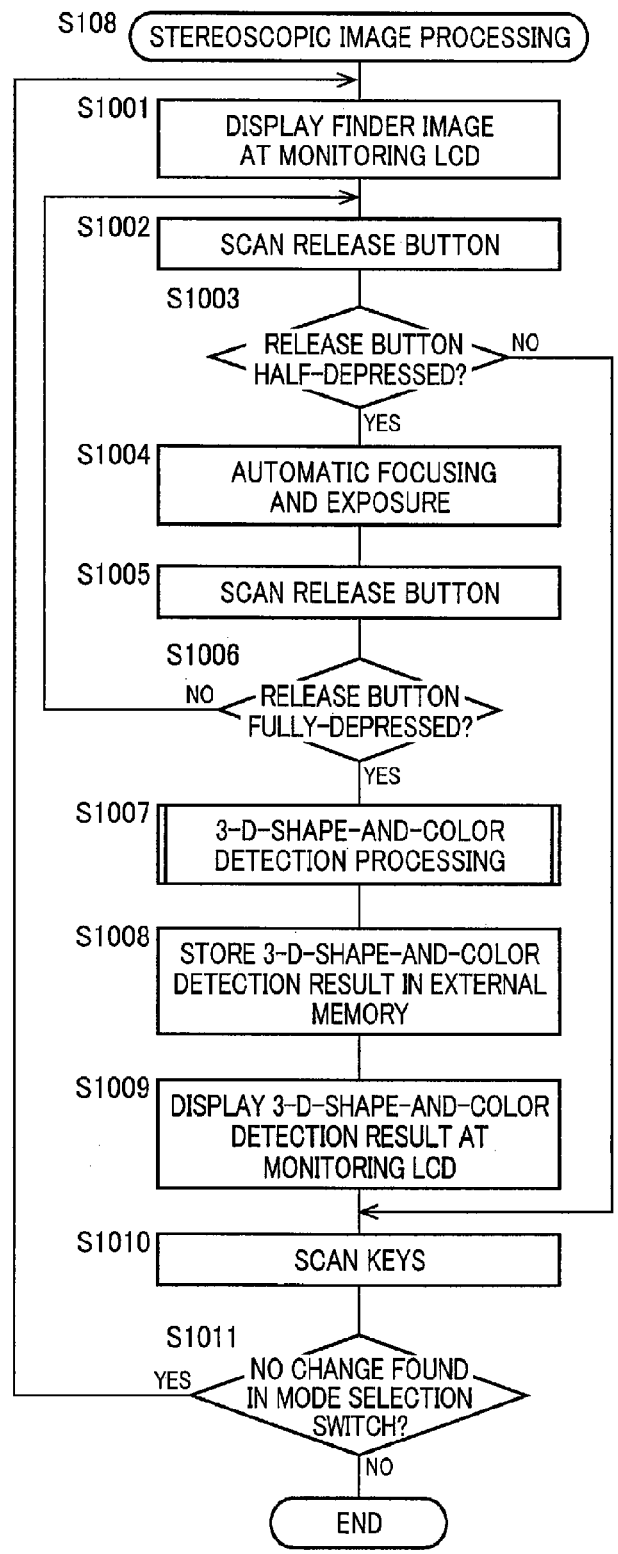
FIG. 15 is a flow chart conceptually illustrating stereoscopic image processing implemented in a step S108 depicted in FIG. 14.

Referring next to FIG. 15, step S108 depicted in FIG. 14 is conceptually illustrated in a flow chart as a stereoscopic-image processing routine. As a result of the execution of this routine, stereoscopic-image processing is performed to detect the 3-D shape of the subject S as the stereoscopic image, and to display the thus-detected stereoscopic image.

This stereoscopic-image processing is further performed to detect the surface color of the same subject S. A combination of the detected stereoscopic image and the detected surface color with their positions being in alignment with each other refers to a 3-D-shape-and-color detection result.

This stereoscopic-image processing starts with step S1001 to display a finder image on the monitor LCD 44 exactly as an image which the user can view through the image-capture optical system 30. This enables the user to verify a captured image (i.e., an image capture field) prior to a substantial image-capture stage, provided that the user views an image displayed on the monitoring LCD 44.

Next, at step S1002, the status of the release button 40 is scanned or monitored, and then, at step S1003, based on the result from the scan, a determination is made as to whether or not the release button has been half-depressed.

If so, then the determination of step S1003 becomes "YES," and operations progress to step S1004 to invoke the auto-focus function (AF) and the automated exposure function (AE), thereby adjusting the lens focus and aperture and the shutter speed. If, at step S1003, it is determined that the release button 40 has not been brought into the half-depressed state, then the determination of step S1003 becomes "NO," and operations progress to step S1010.

Upon completion of step S1004, at step S1005, the status of the release button 40 is scanned again, and then, at step S1006, based on the result from the scan, a determination is made as to whether or not the release button 40 has been fully-depressed. If not, the determination of step S1006 becomes "NO," and operations return to step S1002.

If, however, the release button 40 has changed from the half-depressed state into the fully-depressed state, then the determination of step S1006 becomes "YES," and operations progress to step S1007 to perform 3-D-shape-and-color detection processing described later, thereby detecting the 3-D-shape-and-color of the subject S.

Described schematically, a 3-D-shape-and-color detection result is generated as a result of the execution of the 3-D-shape-and-color detection processing. In this regard, the term "3-D-shape-and-color detection result" is used herein to mean a set of vertex coordinates obtained by converting a plurality of space-code edge images extracted from a space-coded image as described later on, into 3-D coordinates, wherein shape-and-color information and polygon information are in association with each other per each vertex.

The shape-and-color information is indicative of a combination of real space coordinates and RGB values. The polygon information is indicative of a combination of ones of a total number of vertexes which are to be coupled to one another for constructing a solid representative of the subject S in a three-dimensional manner.

Thereafter, at step S1008, the 3-D-shape-and-color detection result is stored in the external memory 78, and then, at step S1009, the 3-D shape detection result is displayed on the monitoring LCD 44 as a 3-D computer-graphics image.

Next, at step S1010, the key scan is performed in a similar manner to step S103 in FIG. 14. Subsequently, at step S1011, a determination is made as to whether or not no change has been found in the status of the mode selection switch 42. If so, then the determination of step S1011 becomes "YES" and operations return to step S1001, and otherwise this stereoscopic-image processing terminates.

The 3-D-shape-and-color detection processing is performed at step S1007 shown in FIG. 15 to detect the 3-D shape of the subject S using a space-encoding technique.

Figure 16:
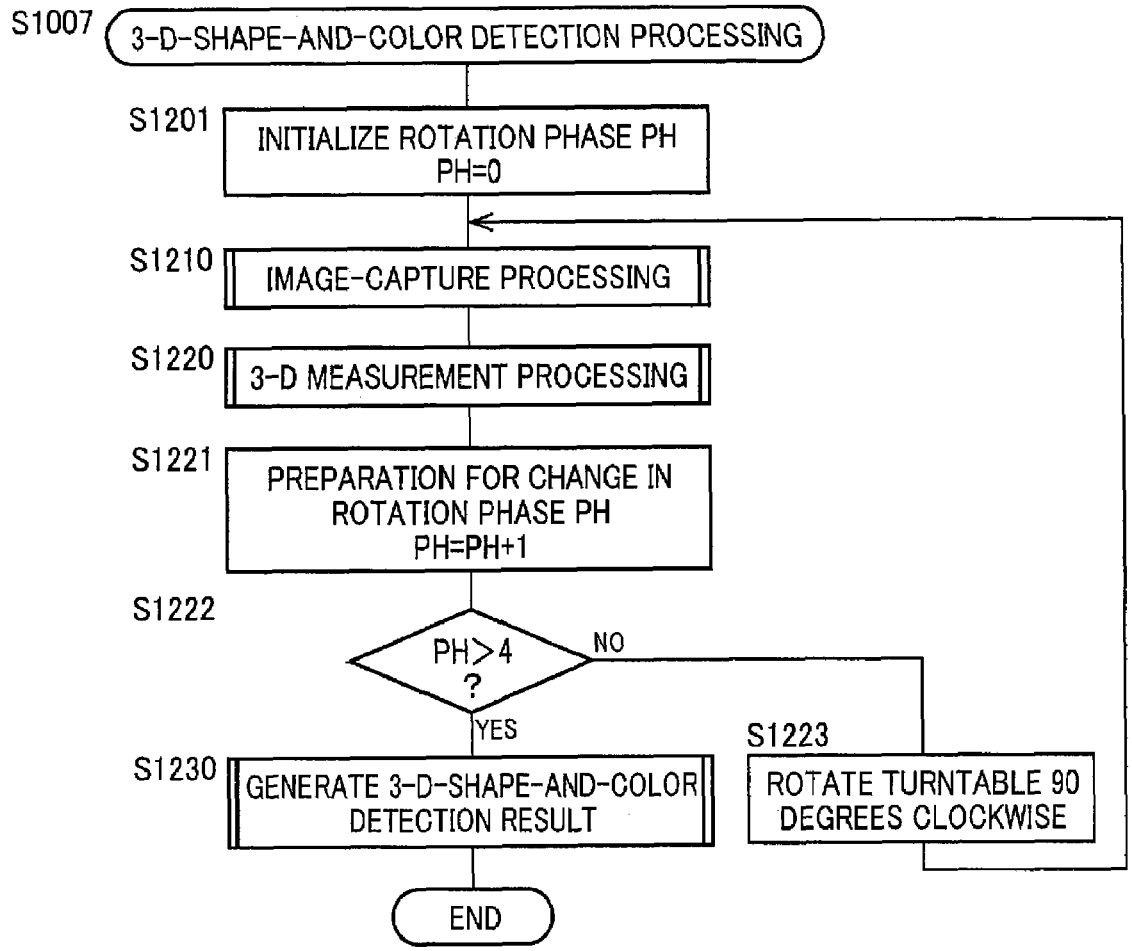
FIG. 16 is a flow chart conceptually illustrating 3-D-shape-and-color detection processing implemented in a step S1007 depicted in FIG. 15, in the name of a 3-D-shape-and-color detection processing routine.

FIG. 16 is a flow chart conceptually illustrating step S1007 depicted in FIG. 15, in the name of a 3-D-shape-and-color detection processing routine. The 3-D-shape-and-color detection processing routine incorporates therein a table-mounted motor control program 404i which is designed to incorporate steps S1201 and S1221-S1223 depicted in FIG. 16.

The 3-D-shape-and-color detection processing routine starts with step S1201 to make a zero initialization of a rotation phase PH of the turntable 184. In the present embodiment, the turntable 184 stops four times per each rotation, and therefore, four discrete rotation phases PH are assigned to the turntable 184.

More specifically, as the turntable 184 rotates, the value of the rotation phase PH of the turntable 184 varies discretely from "0" indicative of the initial rotation phase PH, "1" indicative of the next rotation phase PH, "2" indicative of the rotation phase PH followed by the rotation phase PH "1," to "3" indicative of the final rotation phase PH.

Next, at step S1210, an image-capture process is implemented for the current rotation phase PH as a result of the execution of the image-capturing processing program 404b. In the image-capture process, the projecting section 12 successively projects a plurality of striped patterns of light onto the subject S.

Further, different patterned-light-illuminated images are captured by digitally photographing the subject S with the different light patterns being projected onto the subject S, respectively, and one patterned-light-non-illuminated image is captured by digitally photographing the same subject S with no light pattern being projected onto the subject S. This step S1210 will be described later in more detail by referring to FIG. 17.

Upon termination of the image-capture process, at step S1220, 3-D measurement processing is performed for the current rotation phase PH. Upon initiation of this 3-D measurement processing, the patterned-light-illuminated images and the one patterned-light-non-illuminated image each captured by the preceding image-capture process are utilized to actually measure the 3-D shape of the subject S. This step S1220 will be described later in more detail by referring to FIG. 21.

Upon termination of the 3-D measurement processing, at step S1221, the rotation phase PH is incremented one in preparation for a next image-capture operation. Subsequently, at step S1222, a determination is made as to whether or not the current value of the rotation phase PH is greater than "4," that is to say, all the sequential image-capture operations have been already completed for the subject S.

If the current value of the rotation phase PH is not greater than "4," then the determination of step S1222 becomes "NO," and operations progress to step S1223 to transmit a drive signal required for rotating the turntable 184 90 degrees in a clockwise direction, to the table-mounted motor 194.

As a result, the turntable 184 is rotated 90 degrees in a clockwise direction, thereby turning the subject S to a position in which one of the sub-areas of the subject S that has not been previously photographed faces the measurement head MH. Thereafter, steps S1210 and S1220 are executed, whereby the aforementioned sequential image-capture operations and the 3-D measurement processing are performed for the subsequent rotation phase PH.

If, as a result of the execution of the loop of steps S1210 to S1223 a required number of times, the determination of step S1222 becomes "YES," then operations progress to step S1230 to generate the 3-D-shape-and-color detection result by combining the 3-D shape and the surface-color both of which have been measured for the subject S. This step S1230 will be described in more detail later by referring to FIG. 23.

Upon generation of the 3-D-shape-and-color detection result, the current cycle of the 3-D-shape-and-color detection processing is terminated.

Figure 17:
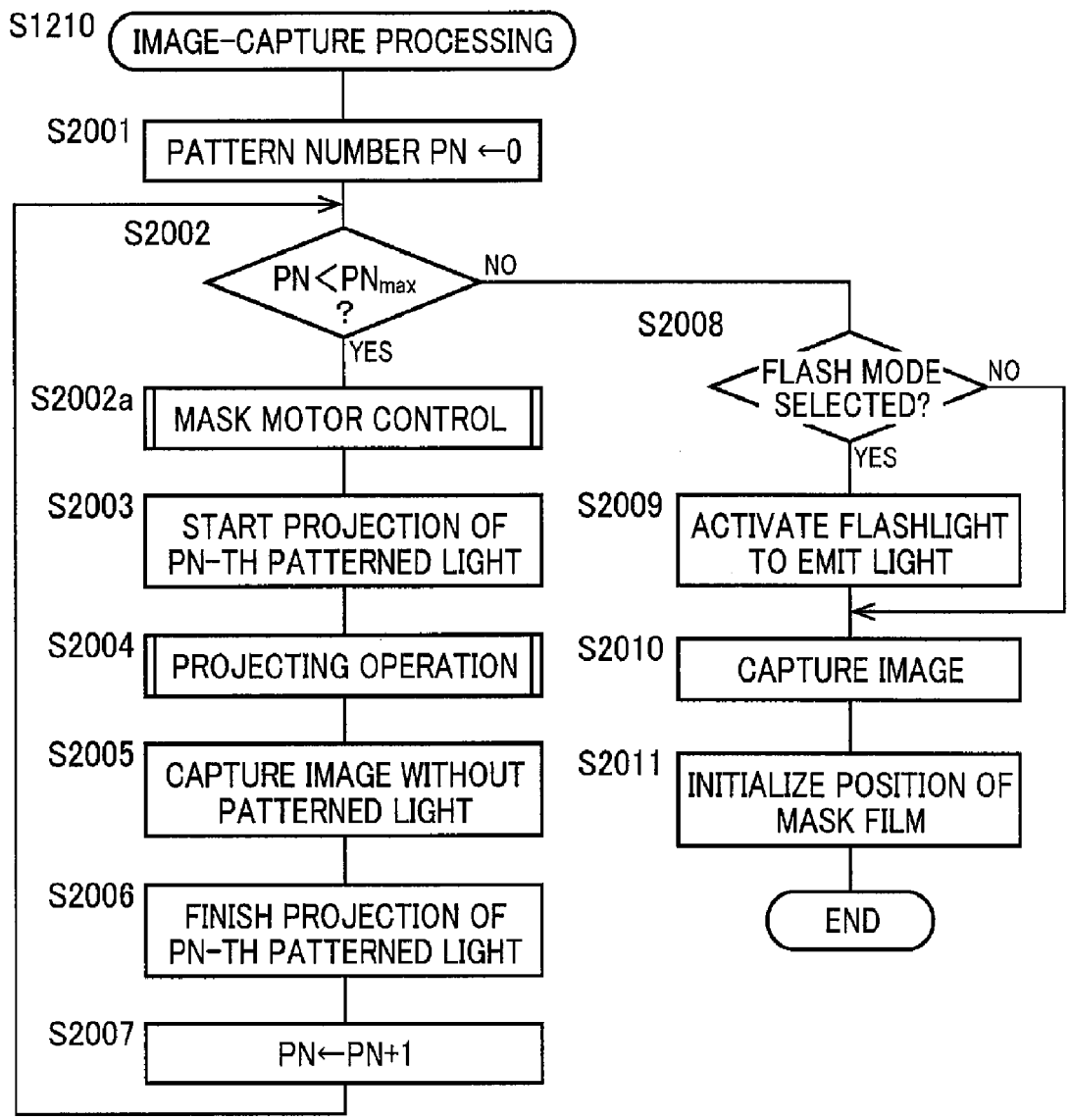
FIG. 17 is a flow chart conceptually illustrating a step S1210 depicted in FIG. 16, in the name of an image-capture processing program 404b.

Referring next to FIG. 17, step S1210 in FIG. 16 is illustrated in greater detail. FIG. 17 conceptually illustrates in a flow chart step S1210 as the image-capturing processing program 404b.

The image-capturing processing program 404b starts with step S2001 to make a zero initialization of a pattern number PN indicative of one of successive mask patterns which is to be used for forming a corresponding one of the successive light patterns. The mask patterns are slit patterns formed in individual frames 202.

Subsequently, at step S2002, a determination is made as to whether or not a current value of the pattern number PN is smaller than a maximum value PNmax. The maximum value PNmax is pre-determined so as to reflect the total number of the mask patterns to be used. For example, when eight light patterns are to be used in total, the maximum value PNmax is set to eight.

If the current value of the pattern number PN is smaller than the maximum value PNmax, then the determination of step S2002 becomes "YES," and operations progress to step S2002a to execute the mask motor control program 404h.

Figure 18:
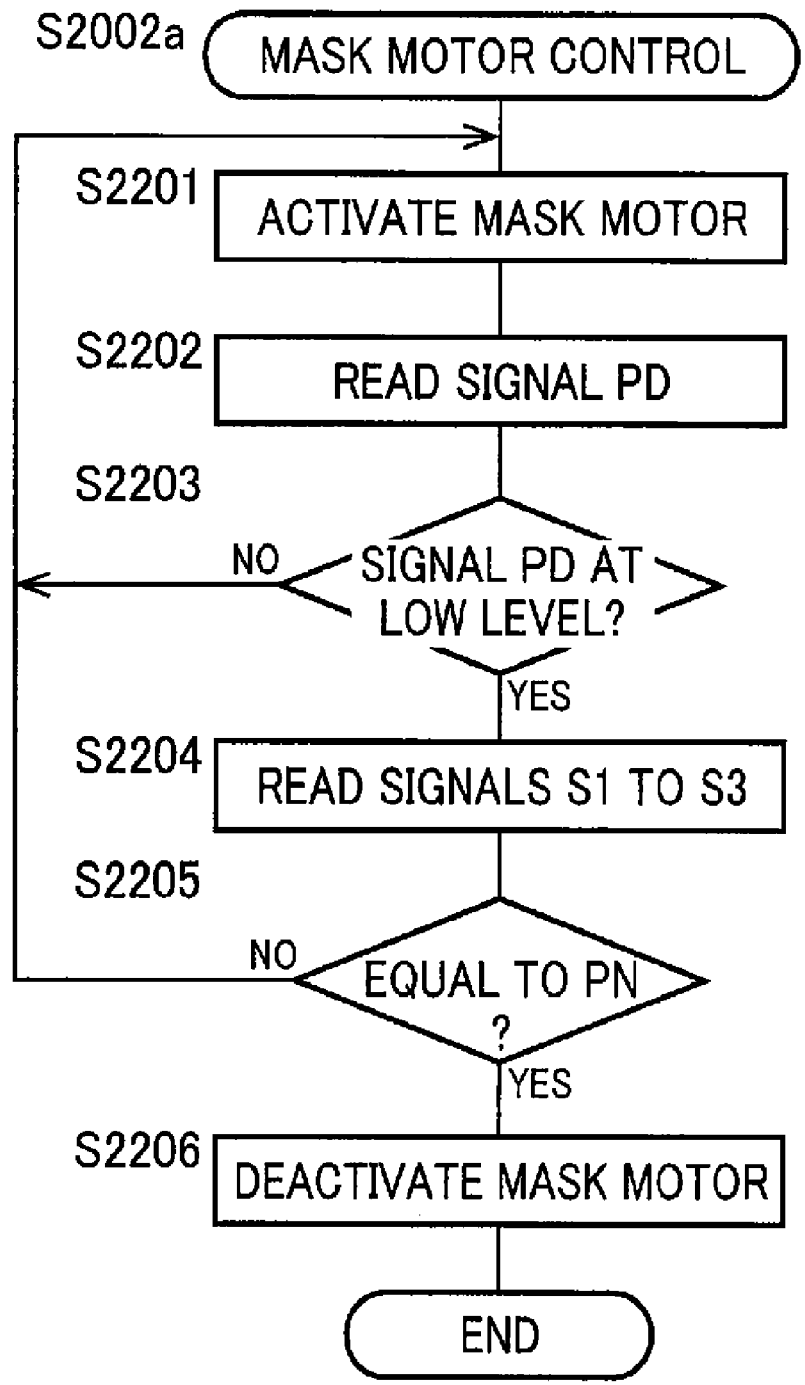
FIG. 18 is a flow chart conceptually illustrating a step S2002a depicted in FIG. 17, in the name of a mask-motor control program 404h.

As illustrated in FIG. 18, the mask motor control program 404h starts with step S2201 to supply a signal to the mask motor driver 86 for driving the mask motor 65 for rotation at a constant speed. As a result, the mask film 200 is fed in a direction allowing the mask film 200 to advance from the supply roller 220 toward the illuminated position 228.

Subsequently, at step S2202, the signal PD is read out from the position sensor 300. Thereafter, at step S2203, a determination is made as to whether or not the read signal PD is low in level. That is to say, a determination is made as to whether or not the position sensor 300 has detected any one of the reference holes 280 (in this instance, a leading one of the reference holes 280).

If the current signal PD is high in level, then the determination of step S2203 becomes "NO," and operations return to step S2201 to repeat operations for driving the mask motor 65 and reading the signal PD. If the signal PD changes from high to low level as a result of the some repetitive implementations of steps S2201 to S2203, then the determination of step S2203 becomes "YES."

Thereafter, at step S2204, the signals S1 through S3 are read from the first through third ID sensors 310, 312 and 314, respectively.

Subsequently, at step S2205, a determination is made as to whether or not the combination of the levels of the read signals S1, S2 and S3 (i.e., information indicated by three-bit data) is indicative of the current value of the pattern number PN. In other words, a determination is made as to whether or not one of the frames 202 in the mask film 200 which is currently located at the illuminated position 228, that is to say, the current frame 202 has been assigned a pattern number PN equal to the current value of pattern number PN.

If the pattern number PN of the current frame 202 does not coincide with the current value of the pattern number PN, then the determination of step S2205 becomes "NO," eventually returning to step S2201. On the other hand, if the pattern number PN of the current frame 202 coincides with the current value of the pattern number PN, then the determination of step S2205 becomes "YES."

In the present embodiment, the pattern number PN is incremented one in the same order as that in which the plurality of frames 202 are arrayed in the mask film 200. That is to say, the mask film 200 is fed sequentially, and therefore, the determination of step S2205 becomes "YES," unless the 3-D input device 10 malfunctions.

If the determination of step S2205 becomes "YES," then operations progress to step S2206 to deactivate the mask motor 65, whereby the current frame 202 is stopped at the illuminated position 228. As a result, the locating of the current frame 202 is completed.

Then, one cycle of execution of this mask motor control program 404h terminates.

It is added that, in the present embodiment, the mask motor 65 is controlled so as to allow the plurality of frames 202 to be sequentially located at the illuminated position 228 due to the intermittent feed of the mask film 200 which is achieved by the intermittent drive of the mask motor 65.

On the other hand, the present invention may be alternatively practiced such that the mask motor 65 is controlled so as to allow the plurality of frames 202 to be sequentially located at the illuminated position 228 due to the continuous feed of the mask film 200 which is achieved by the continuous drive of the mask motor 65.

As described above, in the present embodiment, each through hole 202 is oriented to have a longitudinal direction parallel to the feed direction of the mask film 200. Accordingly, the present embodiment makes it easier to secure an adequate length of time, even when the mask film 200 is in motion for which same light pattern is continuously generated using an arbitrary one of the frames 202 and is continuously projected onto the subject S, during passage of the same frame 202 through the illuminated position 228.

Therefore, despite that the mask film 200 is fed with no stop, the present embodiment makes it easier to project the same light pattern onto the subject S to form an apparent still picture. This is advantageous for allowing the plurality of frames 202 to be sequentially located precisely at the illuminated position 228 as a result of the continuous feed of the mask film 200.

In the present embodiment, upon completion of one cycle of implementation of the mask motor control program 404h, operations progress to step S2003 in FIG. 17 to initiate the projection of a PN-th mask pattern which is one of the mask patterns to be used, which has been assigned a pattern number equal to the current value of the pattern number "PN."

Subsequently, at step S2004, the projecting operation is performed for projecting the PN-th mask pattern onto the subject S.

Figure 19:
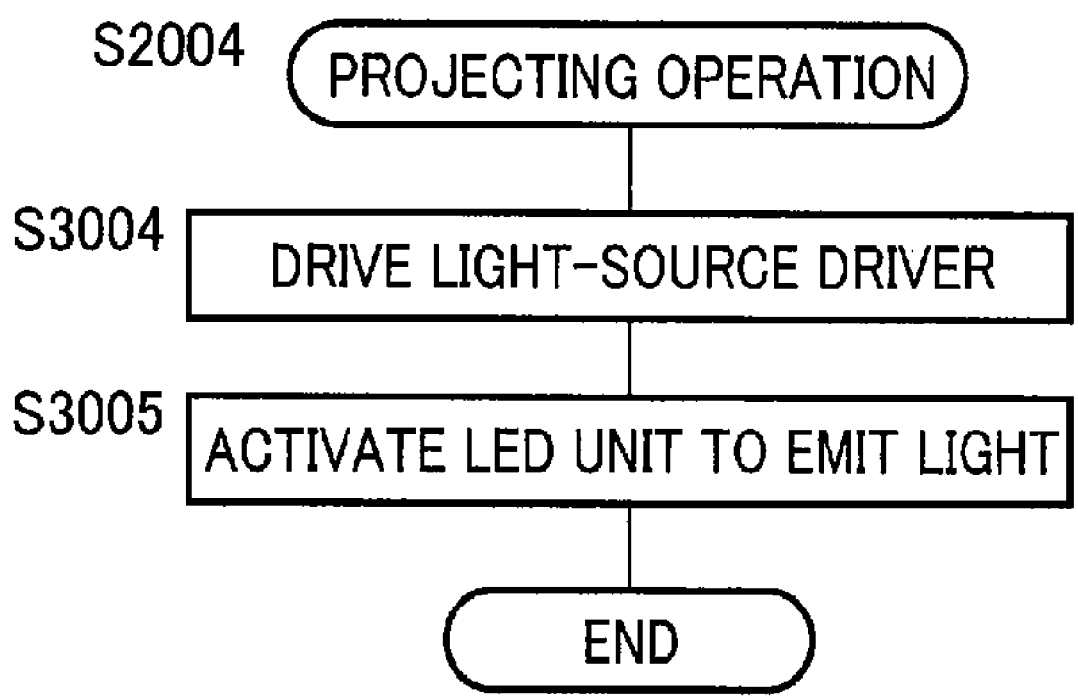
FIG. 19 is a flow chart conceptually illustrating a projecting operation implemented in a step S2004 depicted in FIG. 17, in the name of a projecting operation subroutine.

FIG. 19 conceptually illustrates in a flow chart the detail of step S2004 as a projecting operation subroutine. As a result of the execution of this projecting operation subroutine, the projecting operation is performed to project the patterned light of the PN-th mask pattern, emitted from the projecting section 12 onto the subject S, in cooperation with the projection mechanism 66.

The projecting operation starts with step S3004 to drive the light-source driver 84, and step S3005 follows to cause the LED unit 62 to emit light in response to an electrical signal from the light-source driver 84. Then, this projecting operation terminates.

Light emitted from the LED unit 62 reaches the projection mechanism 66 through the light-source lens 64.

In the projection mechanism 66, the spatial modulation is applied in conformity with the aperture pattern of the current frame 202 of the mask film 200, thereby converting light (original light) coming into the projection mechanism 66 into the patterned light. The patterned light is outputted from the projection mechanism 66 and then reaches the subject S by way of the projection optical system 32, to form a projection image on the subject S by light projection.

Once the PN-th light pattern which is formed by the PN-th mask pattern is projected onto the subject S in the manner described above, and then, at step S2005 in FIG. 17, the image-capturing section 14 is activated to photograph the subject S with the PN-th light pattern being projected onto the subject S.

This photographing operation results in the capture of a PN-th patterned-light-illuminated image which represents the subject S onto which the PN-th light pattern has been projected. The captured patterned-light-illuminated image is stored in the patterned-light-illuminated image storing area 406a in association with the corresponding value of the pattern number PN.

Upon termination of this photographing operation, at step S2006, the projection of the PN-th light pattern terminates, and then, at step S2007, the pattern number PN is incremented one in preparation for the projection of the next light pattern. Then, operations return to step S2002.

If the current value of the pattern number PN, as a result of the repetition of steps S2002 to S2007 a number of times equal to the total number of the light patterns, becomes not smaller than the maximum value PNmax, then the determination of step S2002 becomes "NO," and this image-capture process terminates.

As will be evident from the above, one cycle of implementation of the image-capture process allows the acquisition of patterned-light-illuminated images whose number is equal to the maximum value PNmax.

Subsequently, at step S2008, a determination is made as to whether or not a flash mode has been selected.

If so, then the determination of step S2008 becomes "YES," and operations progress to step S2009 to activate the flash light 26 to emit light, and otherwise the determination of step S2008 becomes "NO," and step S2009 is skipped. In any event, step S2010 follows to photograph the subject S.

The photographing operation is performed for the purpose of measuring the surface color of the subject S without projecting onto the subject S any light pattern coming from the projecting section 12. As a result, a single patterned-light-non-illuminated image is acquired for the subject S. The acquired patterned-light-non-illuminated image is stored in the patterned-light-non-illuminated image storing area 406b.

Thereafter, at step S2011, the mask motor 65 is driven for initializing the position of the mask film 200 in the lengthwise direction so as to allow a leading portion of the mask film 200 in the lengthwise direction to be located at the illuminated position 228.

Then, one cycle of execution of this image-capturing processing program 404b terminates.

Figure 20:
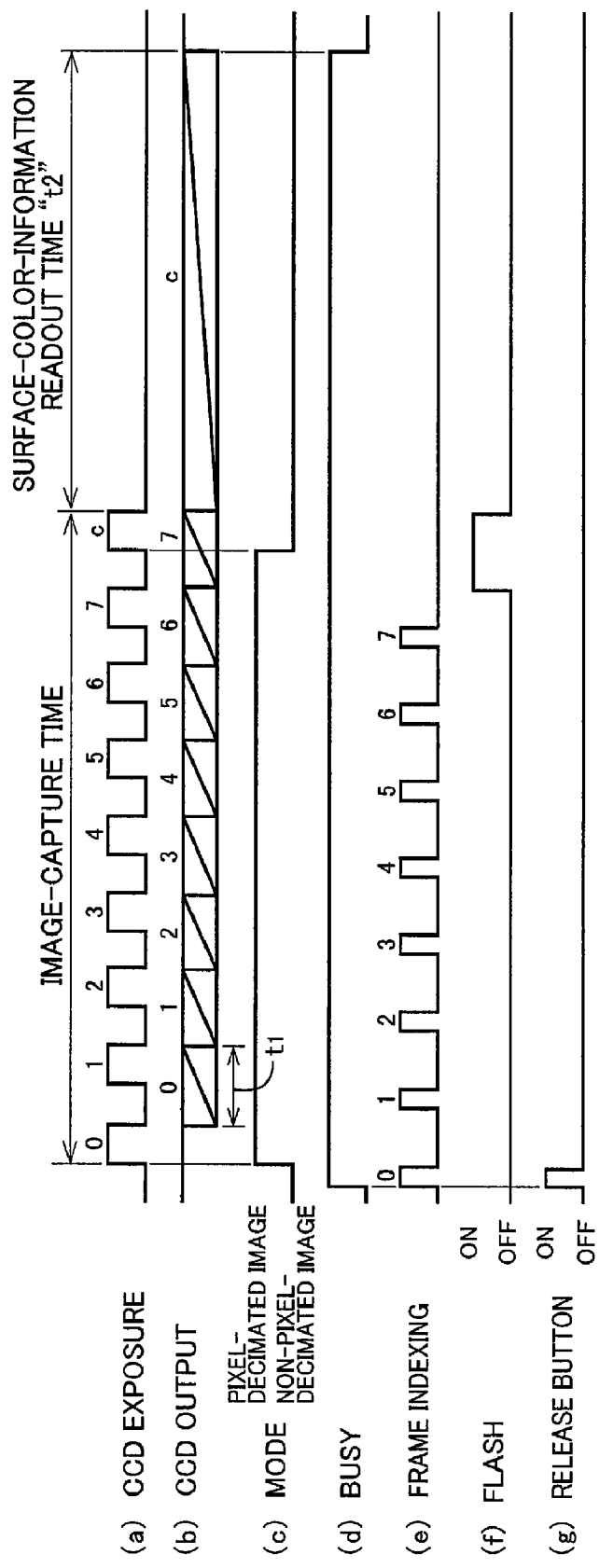
FIG. 20 is a timing chart for explanation of an exemplified version of operation of the 3-D input device 10 depicted in FIG. 1.

FIG. 20 is a timing chart for explanation of an exemplary operation of the 3-D input device 10 which is performed as a result of one cycle of execution of the image-capturing processing program 404b. This exemplary operation is executed by the 3-D input device 10 in response to a user action to fully depress the release button 40, with the FAST mode being selected by the user.

FIG. 20(a) illustrates how the CCD 70 undergoes a predetermined number of consecutive exposure cycles with the incoming light from the subject S. FIG. 20(b) is a timing chart showing timings in which, for each exposure cycle, light is converted into an electrical signal using the CCD 70 per each pixel of a full image formed by incoming light from the subject S and then the electrical signal is outputted from the CCD 70.

FIG. 20(c) is a timing chart showing timing in which the image processing mode of the image-capturing section 14 is switched between the aforementioned pixel-decimated image processing mode and non-pixel-decimated image processing mode, over time.

FIG. 20(d) is a timing chart showing timing in which the status of the image-capturing section 14 is switched between a wait state, and an active state for enabling an image-capture process (exposure cycle) and a signal-readout cycle, over time. FIG. 20(e) is a timing chart showing timing in which the mask film 200 is indexed to locate each frame 202 in position for forming the corresponding light pattern on the mask film 200. FIG. 20(f) is a timing chart showing timing in which the flash light 26 is switched between an OFF-state and an ON-state, over time. FIG. 20(g) is a timing chart showing timing in which the release button 40 is switched between a non-operating state (OFF-state) and an operating state (ON-state), over time.

In the present embodiment, the CCD 70 undergoes exposure to the incoming light from the subject S, and then a signal that reflects the exposure is read out from the CCD 70. One signal-readout cycle corresponds to one exposure cycle, and the exposure cycle and the signal-readout cycle cooperate to constitute one of image-capture sub-processes.

In the present embodiment, the acquisition of the 3-D shape information and the surface-color information is consecutively performed for the same subject S in the description order.

As described above, for acquiring the 3-D shape information of the subject S, the eight light patterns (pattern numbers PN=0 to 7) are successively projected onto the subject S, and, each time each light pattern is projected onto the subject S, the exposure cycle of the CCD 70 and the signal-readout cycle in which a signal is read out from the CCD 70 are executed.

That is to say, for acquiring the 3-D shape information of the subject S, eight image-capture sub-processes in total are sequentially performed for the subject S. In FIG. 20, the pattern number "PN" corresponding to each image-capture sub-process for acquiring the 3-D shape information is labeled a corresponding one of numerals "0" to "7."

For acquiring the surface-color information of the subject S, the CCD 70 undergoes one exposure cycle with the incoming light from the subject S, and the signal-readout cycle follows. That is to say, for acquiring the surface-color information of the subject S, one image-capture sub-process is performed for the subject S. In FIG. 20, the image-capture sub-process for acquiring the surface-color information of the subject S is labeled symbol "c."

In the image-capture sub-process for acquiring the 3-D shape information, the patterned light acting as illumination light is essentially projected onto the subject S, while, in the image-capture sub-process for acquiring the surface-color information, the illumination light is optionally projected onto the subject S.

More specifically, in the image-capture sub-process for acquiring the surface-color information, the flash light 26 is automatically activated to emit light, in case of shortage of light from the subject S, whereby the illumination light is projected onto the subject S.

Therefore, in the present embodiment, nine image-capture sub-processes in total, eight of them for acquiring the 3-D shape information, and one of them for acquiring the surface-color information, are successively performed. In the present embodiment, the nine image-capture sub-processes corporate together to define one image-capture process.

In the nine image-capture sub-processes, nine exposure cycles are successively executed for the same subject S at the same rate as a video rate, for example, and in the same cyclical period. A total duration during which a series of the nine exposure cycles is executed is so long that an undesirable relative displacement between the subject S and the 3-D input device 10 adversely affects images to be captured by the CCD 70. The total duration is indicative of an image-capture time for the 3-D input device 10 (as shown in FIG. 20, hereinafter, referred to as "total image-capture time.") It is meant that the shorter the image-capture time, the higher the ability of the 3-D input device 10 to capture the image of subjects in motion.

In the exemplary operation illustrated in FIG. 20, the signal-readout cycles in the eight image-capture sub-processes for acquiring the 3-D shape information are each executed in the form of the pixel-decimated image processing. Therefore, in each image-capture sub-process for acquiring the 3-D shape information, an electrical signal is outputted from the CCD 70, subsequent to the corresponding exposure cycle of the CCD 70, and after elapse of a signal-readout time "t1" required.

The signal-readout time "t1" is referred to also as a single-frame readout-time indicative of a 3-D-shape-information readout-time which is required for a single frame is worth of the 3-D shape information to be read out from the CCD 70, after the completion of the corresponding exposure cycle of the CCD 70, per each projection cycle of each patterned light.

On the other hand, in the example illustrated in FIG. 20, the signal-readout cycle in one image-capture sub-process for acquiring the surface-color information is executed in the form of the non-pixel-decimated image processing. Therefore, in one image-capture sub-process for acquiring the surface-color information, an electrical signal is outputted from the CCD 70, subsequent to the corresponding exposure cycle of the CCD 70, and after elapse of a signal-readout time "t2" required.

The signal-readout time "t2" is referred to also as a single-frame readout-time indicative of a surface-color-information readout-time which is required for a single frame's worth of the surface-color information to be read out from the CCD 70, after the completion of the corresponding exposure cycle of the CCD 70.

The signal-readout time "t1" required for the pixel-decimated image processing is shorter than the signal-readout time "t2" required for the non-pixel-decimated image processing. In an example, the duration of the signal-readout time "t1" is about 0.33 ms, while the duration of the signal-readout time "t2" is about 0.5 s.

As illustrated in FIGS. 20(a) and 20(b), in each one of the image-capture sub-processes, the corresponding signal-readout cycle is initiated upon completion of the corresponding exposure cycle, while the subsequent exposure cycle performed in the subsequent image-capture sub-process is initiated before completion of the signal-readout cycle performed in the previous image-capture sub-process.

That is to say, the signal-readout cycle in an arbitrary one of the image-capture sub-processes and the exposure cycle in the subsequent image-capture sub-process are executed so as to partially overlap with each other over time. It is noted that the signal-readout cycle in an arbitrary one of the image-capture sub-processes is terminated before the exposure cycle in the subsequent image-capture sub-process is terminated.

Therefore, in the present embodiment, as illustrated in FIG. 20(b), eight signal-readout cycles for acquiring the 3-D shape information are successively performed without interruption.

The time required to complete each signal-readout cycle, when executed with the pixel-decimated image processing, is only about 33 ms, with the result that the time required to complete the eight signal-readout cycles is as short as about 0.26 s.

A total image-capture time illustrated in FIG. 20 has a portion referred to as "partial image-capture time." The total image-capture time is a duration from the first one to the last one of successive exposure cycles for acquiring both the 3-D shape information and the surface-color information of the subject S, while the partial image-capture time is required to capture images of the subject S (by a plurality of successive exposure cycles) for acquiring the 3-D shape information of the subject S. The partial image-capture time has a duration of about 0.26 s at the maximum, because the partial image-capture time is dominantly occupied by the total of eight signal-readout times as described above and because the time required to complete the eight signal-readout cycles is about 0.26 s.

In contrast, the time required to complete each signal-readout cycle, when executed with the non-pixel-decimated image processing, is as long as about 0.5 s. For this reason, the length of time required to execute the eight signal-readout cycles is as long as about 4 s, with the result that the partial image-capture time which corresponds to the eight signal-readout cycles is required to be about 4 s.

As described above, when signal-readout from the CCD 70 is executed with the pixel-decimated image processing, the total image-capture time is reduced, resulting in the capability of measuring the 3-D shape of the subject S with high accuracy, irrespective of unexpected movement of the subject S or unexpected shake of the 3-D input device 10 during handheld shooting.

Additionally, as illustrated in FIG. 20, in the present embodiment, the second through eighth exposure cycles for acquiring the 3-D shape information and the following exposure cycle for acquiring the surface-color information are each initiated without waiting for completion of a signal-readout cycle corresponding to the exposure cycle which is immediately previous to the current exposure cycle. The signal-readout cycle corresponding to the previous exposure cycle is executed in parallel to the subsequent exposure cycle, allowing the nine signal-readout cycles to be successively executed without interruption.

As a result, the total image-capture time as indicated in FIG. 20, that is to say, the time for successively executing the image-capture sub-processes (i.e., a plurality of exposure cycles) for acquiring the 3-D shape information and the image-capture sub-process (i.e., one exposure cycle) for acquiring the surface-color information is reduced.

More specifically, because the time required to complete each signal-readout cycle, when executed with the pixel-decimated image processing, is only about 33 ms, the time required to complete the nine signal-readout cycles is about 0.3 s, with the result that the total image-capture time corresponding to the nine signal-readout cycles is also about 0.3 s at the maximum.

If, in a comparative case, one image-capture sub-process for acquiring the surface-color information, namely, an image-capture process for measuring the surface-color of the subject S (the signal-readout cycle is executed with the non-pixel image processing), is followed by the eight image-capture sub-processes for acquiring the 3-D shape information, namely, an image-capture process for measuring the 3-D shape of the subject S (the signal-readout cycles are each executed with the pixel-decimated image processing). A leading one of successive exposure cycles for acquiring the 3-D shape information has to be delayed until the signal-readout cycle occurring in the image-capture process for measuring the surface-color of the subject S, which is previous to the leading exposure cycle, is almost completed. The delay time, which is almost equal in length to the signal-readout time "t2," is about 0.5 s.

In this comparative case, there exists a slightly long time interval between the exposure cycle for acquiring the surface-color information and the leading one of exposure cycles for acquiring the 3-D information, resulting in prolonged length of the total image-capture time shown in FIG. 20. On the other hand, the prolonged length of the total image-capture time does not create any problem in the absence of an unwanted relative displacement between the measurement head MH and the subject S, or in the presence of such a relative displacement with an adequately small amount.

In contrast, where an unwanted relative displacement between the measurement head MH and the subject S is large, a prolonged length of the total image-capture time would disable the surface-color information and the 3-D shape information correctly matching with each other pixel-by-pixel. That is to say, the accuracy of texture mapping is degraded.

On the other hand, in the present embodiment, as illustrated in FIG. 20, the eight image-capture sub-processes for acquiring the 3-D shape information is previous to one image-capture sub-process for acquiring the surface-color information.

As a result, the eight exposure cycles for acquiring the 3-D shape information and the subsequent exposure cycle for acquiring the surface-color information can be successively executed with equal periods. Accordingly, in the present embodiment, the total image-capture time can be shortened to the extent of about 0.3 s.

Therefore, the present embodiment allows the exposure cycles for acquiring the 3-D shape information and the exposure cycle for acquiring the surface-color information to be successively executed at adequately short time intervals. As a result, high accuracy of texture mapping is achieved, irrespective of the presence/absence or the amount of an unwanted relative displacement between the measurement head MH and the subject S.

Therefore, where signals are read out from the CCD 70 for acquiring the 3-D shape information by executing the pixel-decimated image processing mode (i.e., where the user has selected the FAST mode), the present embodiment provides the 3-D input device 10 better adapted for capturing images of moving subjects with high accuracy of texture mapping, while securing high texture resolution, namely, high accuracy with which the surface-color information is measured.

Additionally, in the present embodiment, the user can change the image processing mode for acquiring the 3-D shape information between the pixel-decimated image processing mode, namely, the FAST mode, and the non-pixel-decimated image processing mode, namely, the SLOW mode, where appropriate.

In environments in which there is a risk of a degradation of the accuracy of texture mapping, a user action to select the FAST mode would prevent the accuracy of texture mapping from being degraded, even in such environments mentioned above. On the other hand, in environments in which there is no risk of a degradation of the accuracy of texture mapping, a user action to select the SLOW mode would achieve not only high accuracy of texture mapping but also high accuracy with which the 3-D shape information is measured.

As described above, the present embodiment allows the user to optionally change the settings of the 3-D input device 10 in accordance with an environment in which the 3-D input device 10 is used and the user's needs of the measuring accuracy of the 3-D shape information and the accuracy of texture mapping, resulting in improvement in the ease-to-use of the 3-D input device 10.

Figure 21:
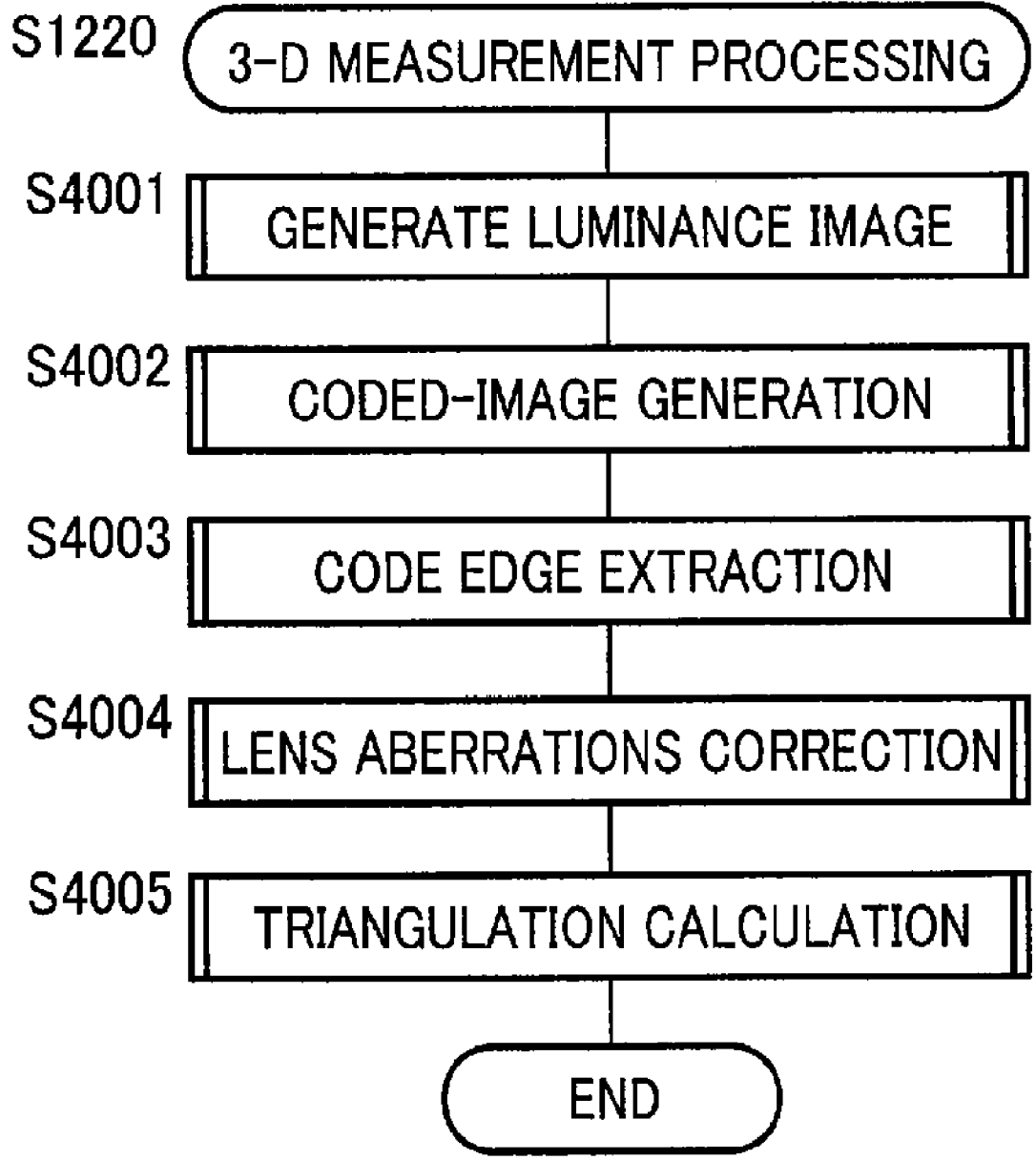
FIG. 21 is a flow chart conceptually illustrating a step S1220 depicted in FIG. 16, in the name of a 3-D measurement processing subroutine.

Then, by referring to FIG. 21, step S1220 depicted in FIG. 16 is described in greater detail. FIG. 21 conceptually illustrates in a flow chart, step S1220 as a 3-D measurement processing subroutine.

This 3-D measurement processing subroutine starts with step S4001 to generate luminance images by the execution of the luminance image generation program 404*c*.

At step S4001, a luminance value, which is defined as a Y value in a YCbCr color space, is calculated from the R, G and B values of individual pixels, based on the following exemplary formula:

$$Y = 0.2989 \times R + 0.5866 \times G + 0.1145 \times B.$$

The calculation of the Y value per pixel enables the generation of a plurality of luminance images each corresponding to the patterned-light-illuminated images. The generated plurality of luminance images are stored in the luminance image storing area 406c in association with the corresponding respective pattern numbers PN.

The formula employed to calculate the luminance images or values is not limited to the above formula, and may be alternative formulas, where appropriate.

Next, at step S4002, the coded-image generation program 404d is executed. Upon initiation of this program 404d, the generated luminance images are combined using the aforementioned space-encoding technique, thereby generating a coded image having pixels to which space codes are assigned pixel-by-pixel.

The coded image is generated through a binarizing operation in which a comparison is made between the luminance images for the patterned-light-illuminated image which have been stored in the luminance image storing area 406c, and a threshold image having pixels to which light-intensity thresholds or luminance thresholds are assigned pixel-by-pixel. The generated coded image is stored in the coded-image storing area 406d.

Figure 22:
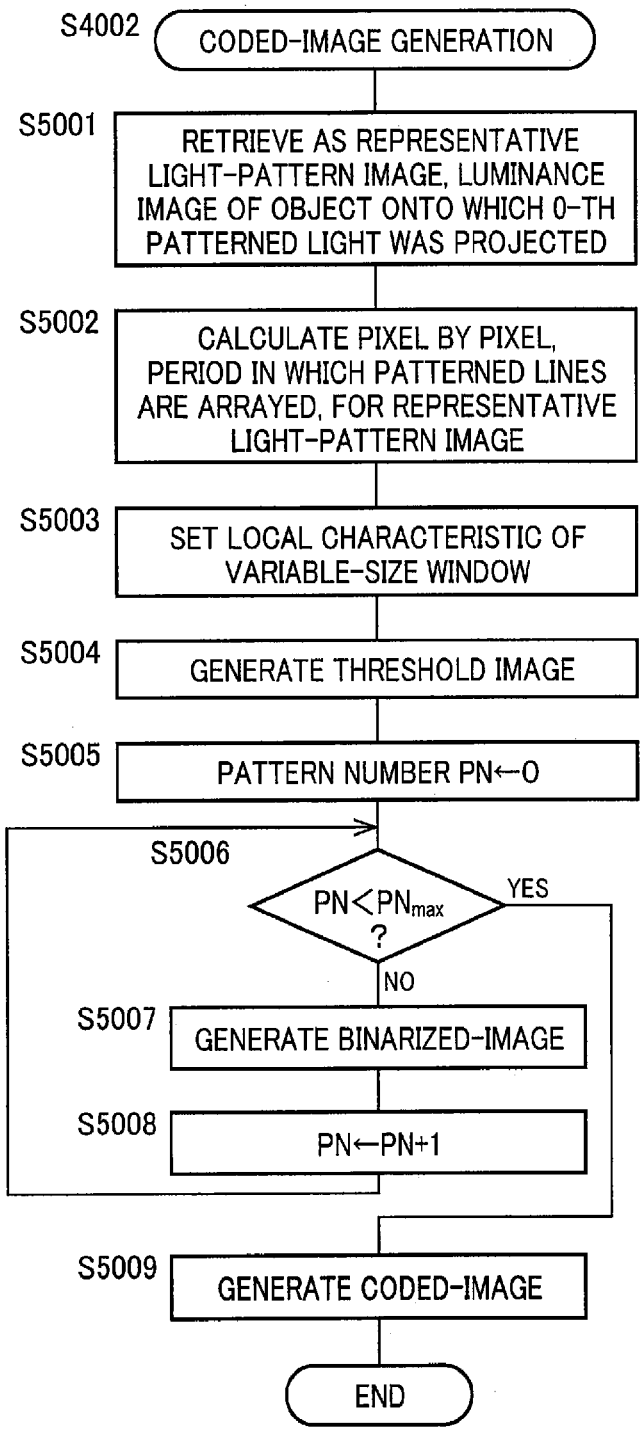
FIG. 22 is a flow chart conceptually illustrating a coded-image generation program 404d executed in a step S4002 depicted in FIG. 21.

Referring next to FIG. 22, the detail of this coded-image generation program 404d is conceptually illustrated in a flow chart.

The technique employed in the coded-image generation program 404d is disclosed in more detail in Japanese Patent Application 2004-285736 that was filed by the same applicant as that of the present application, the disclosure of which is herein incorporated by reference in its entirety.

The coded-image generation program 404d will be described step-by-step below, the underlying principle of which will be described beforehand.

In the present embodiment, a plurality of luminance images are generated for the same subject S (i.e., a three-dimensional object) under the effect of a plurality of projected different light patterns, respectively. The different light patterns are each structured so as to have bright portions (i.e., bright patterned lines each having a width) and dark portions (i.e., dark patterned lines each having a width) which alternate in a uniform patterned-lines repetition-period or at equal intervals.

The different light patterns, each of which is referred to as a light pattern having a pattern number PN, are different from each other in terms of a repetition period of the patterned lines in each light pattern. One of the light patterns which has the shortest patterned-lines repetition-period among them is a light pattern having a pattern number PN of "0," while one of the light patterns which has the longest patterned-lines repetition-period among them is a light pattern having a pattern number PN of "PNmax−1."

Each and every luminance image, because of its acquisition with the projection of a corresponding light pattern, is formed as a light-pattern image in which bright patterned lines as bright portions and dark patterned lines as dark portions alternate in a linear array. The distances or spacings between adjacent patterned lines, because of their dependency upon the relative geometry (the relations on position and orientation) between the 3-D input device 10 and the subject S, are not always uniform throughout each luminance image.

In addition, different luminance images acquired with the effect of the respective projected different-light-patterns are identified by the pattern numbers PN of the corresponding respective light patterns.

In the present embodiment, one of the different luminance images is selected as a representative light-pattern image. The typical example of such a representative light-pattern image is a luminance image corresponding to one of the different light patterns which has the shortest patterned-lines repetition-period among them, that is to say, a luminance image having a pattern number PN of "0."

In the luminance image acquired by digitally photographing the subject S onto which a light pattern has been projected, a luminance value changes periodically and spatially as a function of a pixel position along a linear array of pixels. There exists an envelope curve tangent to a graph indicating the periodical change of the luminance value, at lower peak points (i.e., minimum luminance points) of the graph.

This envelope curve indicates spatial change in the luminance value of a luminance image acquired by digitally photographing the same subject S without illumination, that is to say, spatial change in the luminance value of the background light of the subject S.

For a pixel-by-pixel luminance-value of a luminance image featured by such an envelope curve to be accurately binarized through thresholding, a threshold used therein is preferably caused to vary as a function of a pixel position. That is to say, the threshold is preferably caused to adaptively vary to follow an actual change in the luminance value in a luminance image through tracking.

Based on the above findings, in the present embodiment, a filtering-window is locally applied to a target luminance-image for local filtering or windowing of the target luminance-image for local-threshold calculation, and the filtering or windowing process allows local thresholds to be properly set for successive local sub-areas of the target luminance-image.

More specifically, once a window is applied to a particular one of the sub-areas of a target luminance-image, selection is made of ones of a plurality of patterned lines collectively making up the target luminance-image, which ones are found through the window, and selection is made of ones of all pixels collectively forming the selected patterned lines, which ones are present within the window. The luminance values of the selected pixels are extracted from the target luminance-image for determining a local threshold in association with the particular local position on the target luminance-image.

The window used in the present embodiment is in the form of a rectangular window. When using this rectangular window, patterned lines are selected which are found through the rectangular window, pixels are selected which are present within the rectangular window, and the luminance values of the selected pixels are extracted from the target luminance-image. Common weighting-factor(s) is applied to the extracted pixels for threshold calculation. The weighting factor(s) defines a window function of the rectangular window.

Additionally, when using this rectangular window, which has a line-direction-size measured in a line direction in which each of arrayed patterned-lines of a target luminance-image elongates, and a array-direction-size measured in an array direction in which the patterned lines are arrayed, the number of pixels present within the rectangular window can vary as a function of the line-direction-size of the rectangular window.

In addition, the number of laterally-arrayed patterned lines and the number of pixels both present within the rectangular window can vary as a function of the array-direction-size of the rectangular window.

As a result, when using the rectangular window, a local threshold calculated from a target luminance-image by locally applying the rectangular window thereto can vary as a function of the array-direction-size of the rectangular window. Therefore, adaptive change in the value of local threshold, if required, can be adequately achieved by adaptive change in the array-direction-size of rectangular window.

In the present embodiment, the size of the window formed as a rectangular window is preferably set so as to be equal to any one of the integer multiples of the spacing or period of the patterned lines (e.g., the period in which bright patterned lines repeat) within the window.

In other words, the window size is preferably set to allow bright patterned lines and dark patterned lines to be present in the window in equal numbers. The thus-setting of the window-size, as a result of the calculation of the average of luminance values of patterned lines within the window, allows the accurate determination of proper thresholds.

A possibility, however, exists that the repetition period of patterned lines can vary with location, even on the same luminance image. For this reason, a fixed-size window can cause the number of patterned lines within the window, to vary with location, resulting in degraded thresholds in accuracy.

In the present embodiment, one of a plurality of luminance images is selected as a representative light-pattern image, which was obtained with the effect of projection of a light pattern of lines arrayed in the shortest repetition period among those of all light patterns. That is to say, the representative light-pattern image is a luminance image assigned a pattern number PN of "0."

Further, in the present embodiment, a window which is locally applied to the representative light-pattern image, is in the form of the variable-size window VW. Owing to this, the variable-size window VW is caused to adaptively change in size in response to the repetition period of actual patterned lines in the representative light-pattern image.

In the present embodiment, even though the repetition period of patterned lines in the representative light-pattern image changes as a function of the position in the array direction of the representative light-pattern image, the size of the variable-size window VW changes so as to follow the change in the repetition period, with the result that the total number of bright and dark patterned-lines within the variable-size window VW remains constant, irrespective of changes in the repetition period of patterned lines.

In the present embodiment, a threshold TH is determined each time the variable-size window VW is locally applied to the representative light-pattern image on a local-position-by-local-position basis. The local-position-by-local-position threshold TH is accurately obtained based on the variable-size window VW optimized in size on a local-position-by-local-position basis.

In addition, the variable-size window VW, which allows the total number of bright and dark patterned-lines within the variable-size window VW to remain constant, is minimized in size when those patterned-lines appear on a luminance image having a pattern number PN of "0." For this reason, the selection of the luminance image having a pattern number PN of "0" as the representative light-pattern image allows the variable-size window VW to be minimized in size, and eventually allows a reduction in computational load for filtering after using the variable-size window VW.

In the present embodiment, the variable-size window VW is in the form of a rectangular-window having a variable size. More specifically, this variable-size window VW is configured so as to be variable in size in the array direction of the representative light-pattern image, and so as to be fixed in the line direction of the representative light-pattern image.

In the present embodiment, the size of the variable-size window VW, that is to say, the extent of the variable-size window VW measured in the array direction of the representative light-pattern image, is adaptively set so as to reflect the spacings between the real patterned lines of the representative light-pattern image. This adaptive setting of the size of the variable-size window VW requires prior knowledge of the distribution of the spacings between the real patterned lines of the representative light-pattern image.

For these reasons, in the present embodiment, prior to the adaptive setting of the size of the variable-size window VW, a fixed-size window is locally applied to the representative light-pattern image. A plurality of adjacent pixels captured at a time by application of the fixed-size window are selected as a plurality of target pixels, and based on the luminance values of the selected target pixels, the patterned-lines spacing distribution of the representative light-pattern image is determined.

In the present embodiment, additionally, Fast Fourier Transform (FFT) is performed on the luminance values of a plurality of target pixels in the representative light-pattern image, thereby measuring intensities (e.g., a power spectrum) of frequency components of a series of luminance values found in the representative light-pattern image, resulting from variations in the luminance value in the array direction of the representative light-pattern image.

In this regard, the frequency of each of the "frequency components" is defined to mean a repetition number in which uniform luminance values repeat in a linear array of the target-pixels captured at a time by the fixed-size window at a given time, wherein the target pixels are sequenced in the array direction of the representative light-pattern image.

In the present embodiment, each one of the plurality of adjacent pixels which is successively and laterally arrayed in the representative light-pattern image is sequentially selected as a target pixel, and, based on a luminance value distribution of the representative light-pattern image, the patterned-lines spacing distribution is acquired per each of the thus-selected target pixels.

This coded-image generation program 404d, although has been described above in terms of its basic idea, will be described below step-by-step by referring to FIG. 22.

This coded-image generation program 404d starts with step S5001 to retrieve from the luminance image storing area 406c, the luminance image of the subject S which was captured with the light pattern whose pattern number PN is "0" being projected onto the subject S, as the representative light-pattern image.

Next, at step S5002, a pixel-by-pixel calculation is made of a patterned-lines repetition-period in association with each of adjacent pixels consecutively sequenced within the representative light-pattern image in the array direction thereof, based on the retrieved luminance image, by an approach of the aforementioned FFT conversion. A plurality of ultimate calculations of patterned-lines-repetition-periods are stored in the period distribution storing area 406p, in association with the respective pixels (i.e., respective pixel-positions in the array direction).

Subsequently, at step S5003, the characteristic of the aforementioned variable-size window VW is locally configured in succession in the array direction, based on the plurality of ultimate calculations of patterned-lines-repetition-periods. In other words, a plurality of sets of characteristic data of the variable-size window VW are generated locally and sequentially for the representative light-pattern image.

In the present embodiment, the variable-size window VW is configured such that its line-direction-size is kept unchanged irrespective of the position of a moving local-region on the representative light-pattern image to which the variable-size window VW is locally applied, while the array-direction-size is variable to be kept equal to an integer multiple of a variable value of a successively-selected one of the patterned-lines repetition-periods calculated in association with the respective positions arrayed in the array direction of the representative light-pattern image.

Thereafter, at step S5004, the variable-size window VW is locally applied to the representative light-pattern image in a two-dimensional sliding manner (i.e., sliding in both the line direction and the array direction) in association with a sequentially-selected one of a plurality of pixels arrayed two-dimensionally on the representative light-pattern image.

In the two-dimensional sliding manner, the variable-size window VW first moves sequentially in the line direction, through a successively-selected one of pixel positions arrayed in the array direction, while making a pixel-by-pixel calculation of the luminance-value average of pixels present within the variable-size window VW at each point of time, as a local threshold.

The variable-size window VW, upon termination of one movement in the line direction, shifts to the next pixel position in the array direction for a next movement in the line direction for calculation of successive local thresholds.

At step S5004, by its further implementation, a threshold image is generated by allocating the thus-calculated local thresholds to the corresponding respective pixels of the representative light-pattern image. The generated threshold image is stored in the threshold image storing area 406*q*.

Subsequently, at step S5005, the pattern number PN is initialized to "0," and then, at step S5006, a determination is made as to whether or not a current value of the pattern number PN is smaller than the maximum value PNmax. In this instance, the current value of the pattern number PN is "0," and therefore, the determination of step S5006 becomes "YES" and operations progress to step S5007.

At step S5007, a pixel-by-pixel comparison is made between the luminance values of the luminance image whose assigned pattern number PN is equal to the current value of the pattern number PN, and the local thresholds of the generated threshold image. A binarized image is formed pixel-by-pixel so as to reflect the result of the pixel-by-pixel comparison.

More specifically, for a pixel position at which the current luminance image has its luminance value greater than the corresponding local threshold, data indicative of a binary "1" is assigned to the corresponding binarized image at its corresponding pixel position and is stored in the binarized image storing area 406*r* in association with the corresponding pixel position of the corresponding binarized image.

On the other hand, for a pixel position at which the current luminance image has its luminance value not greater than the corresponding local threshold, data indicative of a binary "0" is assigned to the corresponding binarized image at its corresponding pixel position and is stored in the binarized image storing area 406*r* in association with the corresponding pixel position of the corresponding binarized image.

Thereafter, at step S5008, the pattern number PN is incremented one and then operations return to step S5006 to make a determination as to whether or not a current value of the pattern number PN is smaller than the maximum value PNmax. If so, then the determination of step S5006 becomes "YES," and operations progress to step S5007.

If the current value of pattern number PN, as a result of the repetition of steps S5006-S5008 a number of times equal to the total number of the light patterns, becomes not smaller than the maximum value PNmax, then the determination of step S5006 becomes "NO," and operations progress step S5009.

At step S5009, pixel-by-pixel pixel extraction is performed of pixel values (either a binary "1" or "0") from a set of binarized images whose number is equal to the maximum value PNmax, in the sequence from a binarized image corresponding to a luminance image whose pattern number PN is "0" to a binarized image corresponding to a luminance image whose pattern number PN is "PNmax−1," resulting in the generation of a space code made up of bits arrayed from a least significant bit LSM to a most significant bit MSB.

The number of bits collectively making up a pixel-by-pixel space-code is equal to the maximum value PNmax. The pixel-by-pixel generation of space codes results in the generation of a space coded image corresponding to the subject S. The generated space codes are stored in the coded-image storing area 406*d*, in association with the corresponding respective pixel positions. In an example where the maximum value PNmax is equal to eight, the resulting space codes have values ranging from 0 to 255.

Then, one cycle of execution of this coded-image generation program 404*d* terminates.

Upon termination of the coded-image generation program 404*d*, at step S4003 depicted in FIG. 21, code-edge-coordinates detection processing is performed by the execution of the code edge extraction program 404*e*.

In the present embodiment, encoding is carried out using the aforementioned space-encoding technique on a per-pixel basis, resulting in the occurrence of a difference on a sub-pixel order between an edge or border line separating adjacent bright and dark portions in an actual light-pattern, and an edge or border line separating adjacent different space-codes in the generated coded-image. In the coded image, the edge or border line separates a region assigned a space code and another region assigned another space code.

In view of the above, the code-edge-coordinates detection processing is performed for the purpose of detecting code edge coordinates of space codes with sub-pixel accuracy.

In an example, where 255 lines of discrete reference lines each of which intersects with the line direction of each patterned light are defined in a CCD coordinate system, if the maximum value PNmax is equal to eight (256 space codes, therefore 255 edges or border lines exist), about 65 thousand code edge coordinate values are detected at the maximum, as a result of the implementation of step S4003 (i.e., the implementation of the code edge extraction program 404*e* depicted in FIG. 21).

The detected code edge coordinates are stored in the code edge coordinates storing area 406*e*. The code edge coordinates are defined in a CCD coordinate system ccdx-ccdy which is a two-dimensional coordinate system fixed with respect to the image plane of the CCD 70.

Following step S4003, at step S4004, lens aberrations correction processing is performed by the execution of the lens aberrations correction program 404*f*.

A light beam, after passing through the image-capture optical system 30, is focused at an actual position deviated from an ideal position due to aberrations or distortion in the image-capture optical system 30, if any. If the image-capture optical system 30 is of optically ideal lens, the light beam is focused at the ideal position.

In view of this, the lens aberrations correction processing is performed for correcting the actual position such that it becomes closer to the ideal position.

Owing to this lens aberrations correction processing, the code edge coordinates detected at step S4003 are corrected so as to eliminate errors due to such as distortion in the image-capture optical system 30. The thus-corrected code-edge-coordinates are stored in the aberration correction coordinates storing area 406g.

None of the above-described code-edge-coordinates detection processing and lens aberrations correction processing is essential in understanding the present invention, and both of them are disclosed in more detail in Japanese Patent Application No. 2004-105426 that was filed by the same applicant as that of the present application, the disclosure of which is herein incorporated by reference in its entirety.

Following step S4004, at step S4005, real-space conversion processing is performed through triangulation by the execution of the triangulation calculation program 404g.

Once this real-space conversion processing starts, the aforementioned aberrations-corrected code edge coordinates in the CCD coordinate system ccdx-ccdy is converted through triangulation into 3-D coordinates defined in a real space coordinate system X-Y-Z fixed with respect to a real space.

As a result, 3-D coordinate values representative of the 3-D-shape-and-color detection result are acquired. The acquired 3-D coordinate values are stored in the 3-D coordinates storing area 406h, in association with the rotation phases PH of the corresponding respective sub-areas of the subject S.

At step S4005, because the 3-D shape of the subject S is measured in a spatially discreting manner as a set of a plurality of 3-D vertexes, the two-dimensional coded images are referenced in a spatially discreting manner with respect to a plurality of discrete reference lines which intersect with the line direction of each patterned light.

As a result, an acquisition is made as to not only a plurality of the 3-D vertexes each corresponding to a plurality of discrete points on an outer boundary of the coded image, but also a plurality of the 3-D vertexes each corresponding to a plurality of discrete points within the coded image (i.e., coordinate points on boundaries between the spatial codes detected at step S4003).

Figure 23:
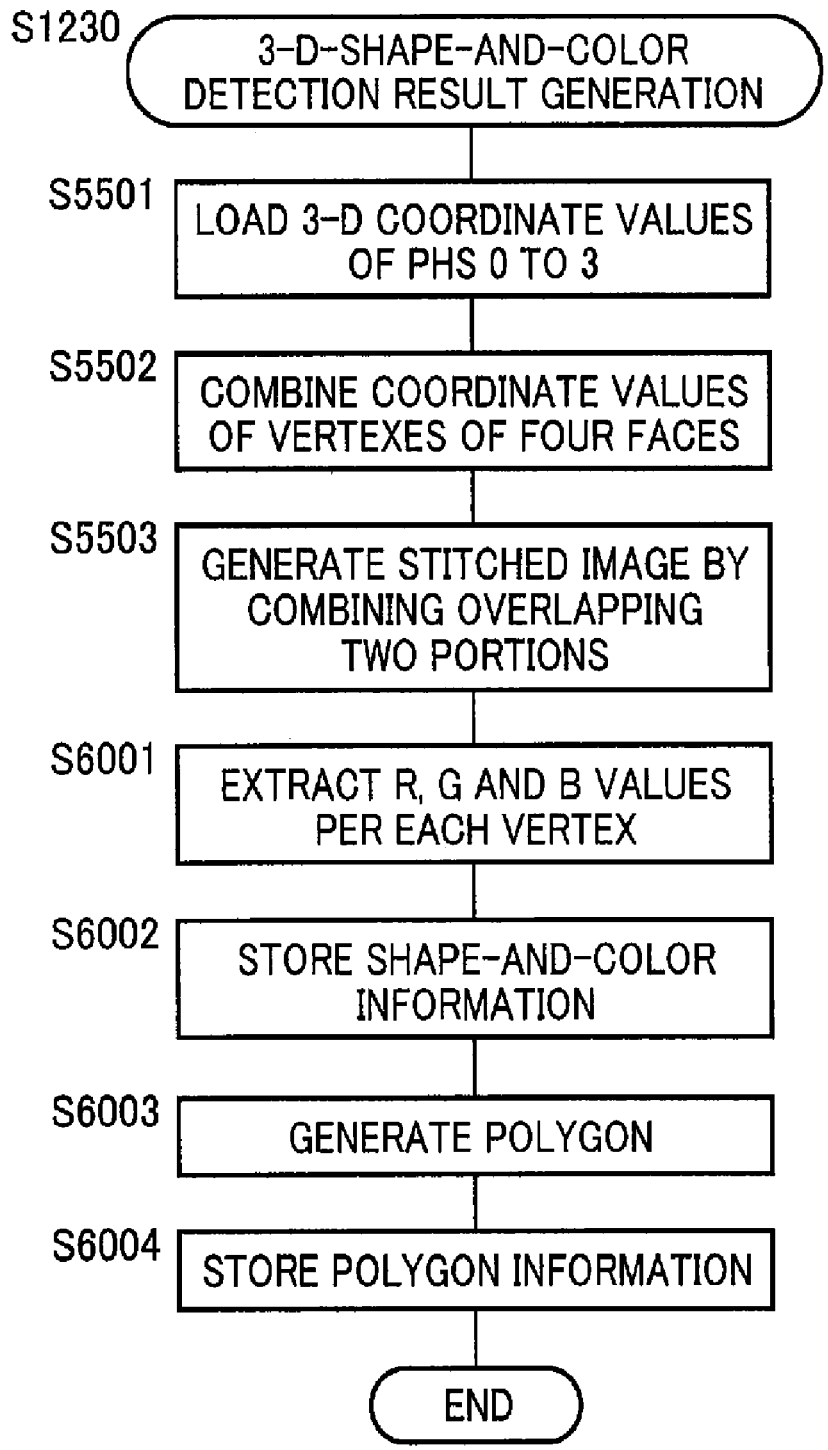
FIG. 23 is a flow chart conceptually illustrating a step S1230 depicted in FIG. 16, in the name of a 3-D-shape-and-color-detection-result generation subroutine.

Then, by referring to FIG. 23, step S1230 depicted in FIG. 16 will be described in more detail. FIG. 23 is a flow chart conceptually illustrating step S1230 in the name of a 3-D-shape-and-color-detection-result generation subroutine.

The 3-D-shape-and-color-detection-result generation subroutine starts with step S5501 to load a plurality of 3-D coordinate values from the 3-D coordinates storing area 406h in association with each one of the rotation phases PH=0 to 3.

In the present embodiment, the entire outer face of the subject S is divided into four partial faces (i.e., a front face, a right-side face, a left-side face, and a back face), and a stereoscopic image is generated per each partial face. At step S5501, for all of the four faces, a plurality of 3-D coordinates belonging to each of the four partial faces are loaded from the 3-D coordinates storing area 406h.

Subsequently, at step S5502, a rotational transform is performed for the loaded 3-D coordinate values (i.e., coordinate values of vertexes) in a manner conforming with the kind of the rotation phase PH of the partial face to which each 3-D coordinate value belongs, whereby the 3-D coordinate values belonging to the four partial faces are combined with one another by allowing for the rotation phase PH of each partial face.

As a result, the four partial faces, which are three-dimensionally represented by the plurality of 3-D coordinate values, are combined together, to thereby reconstruct a composite image indicative of the entire outer face of the subject S. At this stage, however, the composite image includes spatially-overlapping portions which are created due to the employment of a so-called fragmented or multiple photography using the measurement head MH.

Subsequently, at step S5503, sets of paired spatially-overlapped portions are extracted from the generated composite image. Each set of paired overlapping portions overlap with each other over lengthwise-arrayed adjacent segments of the composite image. Further, each set of paired overlapping portions are combined together by an approach such as the averaging of a plurality of 3-D coordinate values belonging to each set of paired overlapping portions.

As a result, the spatial overlaps are removed from the composite image, whereby a stitched image is generated. Data indicative of the stitched image is stored in the stitched image storing area 406s.

Thereafter, at step S6001, the RG B values (i.e., an R luminance value, a G luminance value, and a B luminance value) are extracted from an image (hereinafter, referred to as "surface-color image") indicative of the aforementioned surface-color information, the RGB values corresponding to each coordinate value in a real coordinate space of a set of 3-D vertexes which have undergone coordinate-transformation into the 3-D coordinate system defined in the real space as described above.

The real space coordinate system, and a plane coordinate system which defines the surface-color image are geometrically related with each other by the triangulation calculation mentioned above.

In other words, when there exists a function used for mapping, by calculation, the coded image, that is to say, the plane coordinate system defining a shape image which is a two-dimensional image for measuring the 3-D shape of the subject S, onto the 3-D coordinate system in the real space, the use of the inverse function of the aforementioned function enables the 3-D coordinate system in the real space to be mapped, by calculation, onto the plane coordinate system which defines the surface-color image.

Therefore, step S6001 enables the surface-color values, namely, the RGB values corresponding to the 3-D vertexes, from the two-dimensional surface-color image, per each vertex.

Next, at step S6002, per each vertex, the corresponding real space coordinate values and the corresponding RGB values are combined into the shape-and-color information. Further, the generated shape-and-color information is locally stored in the working area 410 in direct or indirect association with the corresponding vertex.

Subsequently, at step S6003, in order to approximately represent the shape of the surface of the subject S by dividing the shape of the surface of the subject S into a plurality of triangles each of which is an example of a polygon, adjacent ones of the plurality of vertexes which have been previously acquired for the subject S are grouped in threes. Per each group, the corresponding three vertexes are connected together into one polygon.

Thereafter, at step S6004, per each polygon, the combination of the three vertexes to be connected together for forming each polygon is locally stored in the working area 410 as polygon information in direct or indirect association with each polygon. Additionally, the polygon information is stored in the stitched texture storing area 406t as information indicative of the stitched texture.

Then, one cycle of execution of the 3-D-shape-and-color-detection-result generation subroutine terminates, resulting in the termination of one cycle of execution of the 3-D-shape-and-color detection processing routine illustrated in FIG. 16.

In the present embodiment, once the holder HD has been transformed from the retracted position into the unfolded position in which the head base 130 and the table base 132 are coplanar with each other, the relative position of the turntable 184 to the measurement head MH is determined automatically and stably. In an example, the relative position of the turntable 184 is defined by the distance from the measurement head MH, and the angle with respect to the optical axis of the measurement head MH.

In the present embodiment, none of the distances and the angles between four plate-like members constituting the holder HD does not depend on any change in the shape of the holder HD.

Accordingly, the present embodiment allows the turntable 184 which is automatically located upon being unfolded from the retracted position, to be positioned at a repeatable and stable position relative to the measurement head HD.

For this reason, the present embodiment allows the subject S to be automatically positioned at a desired position relative to the measurement head MH, in response to a mere user-action to place the subject S onto the turntable 184 which can be transformed into a repeatable and stable unfolded-position in a manner described above.

As a result, the present embodiment allows the subject S, upon a user placement of the subject S onto the turntable 184, to be located relative to the measurement head MH with a reduced maximum-range of possible position-variation, resulting in a reduced size of a photographing field (i.e., image capture area) within which the measurement head MH is required to photograph the subject S and which is predetermined by allowing for a maximum range of possible position-variation.

Accordingly, the present embodiment makes it easier to reduce the burden on the measurement head MH for photographing and measuring the subject S, than the above-described exemplified version of conventional techniques in which the user can locate the subject S with higher flexibility in selecting the ultimate location of the subject S.

In the present embodiment, there exist some other reasons why the burden on the measurement head MH for photographing and measuring the subject S can be reduced.

More specifically, one of these reasons is that the present embodiment enables the coordinates of the center line of rotation of the turntable 184 to be estimated with enhanced efficiency, during the measurement of the 3-D shape of the subject S from the directions of the four faces (i.e., the rotation phases PH=0 to 3) of the subject S, using the turntable 184.

Still more specifically, in the present embodiment, there are known and stabilized spatial coordinate values relative to the measurement head MH, of the center line of rotation of the turntable 184 on which the subject S is to be placed.

Accordingly, for each 3-D coordinate value (calculated at step S4005 depicted in FIG. 21) indicative of the 3-D-shape measurement result for each one of four phases, a spatial rotational calculation operation is performed around the center line of rotation of the turntable 184, to thereby perform a stitching operation (i.e., a combining operation) for a polygon surface and a texture which represent the shape and the colors of the subject S, respectively, eventually resulting in the generation of the 3-D-shape-and-color detection result for the entire circumference of the subject S, as an ultimate output (step S1230 depicted in FIG. 16).

As a result, the shape and the colors of the entire circumference of the subject S are so accurately combined together as not to cause any noticeable mismatch or misregistration.

In the 3-D input device 10, upon transformation of the holder HD from the retracted position into the unfolded position, the turntable 184 is automatically located, and, per each user action to unfold the turntable 184, the turntable 184 is located at a stable and repeatable position relative to the measurement head MH.

Therefore, the 3-D input device 10 also allows the center line of rotation of the turntable 184 to be located at a stable and repeatable position relative to the measurement head MH, each time the turntable 184 is automatically located.

Accordingly, the 3-D input device 10 enables the detection or estimation of the center line of rotation of the turntable 184 to be completely or partly omitted, while maintaining the capability of measuring the 3-D shape of the subject S.

Further, in the present embodiment, even when there is a need for estimating the geometry of the center line of rotation of the turntable 184, what is required is to estimate the geometry within a spatial region, after determining the size of the spatial region by allowing for only possible position-variation of the center line of rotation of the turntable 184 occurring due to clearance (i.e., play) which is present at each joint (i.e., hinge) 140, 142, 144 of the holder HD when in the unfolded position. As a result, the spatial region is not required to have a larger size.

In any case, the present embodiment makes it easier to reduce the burden on the above-described center-line-of-rotation estimation processing which is performed for accurately combining a plurality of shapes and colors of the subject S which have been measured separately on a face-by-face basis.

In this regard, an example of the "center-line-of-rotation estimation processing" may be a technique of estimating the coordinate values of the center line of rotation so that there may be substantially minimized misregistration between a plurality of shape-and-colors (i.e., a plurality of successive image segments) which have been measured discretely along the entire circumference of the subject S.

Another reason why the burden to be imposed on the measurement head MH for photographing and measuring the subject S can be reduced is that, the present embodiment allows the turntable 184 to be automatically located at a desired position (geometrically defined by the distance from the measurement head MH and the angle relative to the measurement head MH) in a stable and repeatable fashion, each time the user unfolds the holder HD, with the advantage that the subject S is guaranteed to be centered of a camera field of view, the advantage that the focus adjustment can be simplified, etc.

These advantages allow relaxation of the burden to be imposed on the measurement head MH for photographing and measuring the subject S.

Further, the present embodiment allows the turntable 184 to be automatically located at a desired position (geometrically defined by the distance from the measurement head MH and the angle relative to the measurement head MH) in a stable and repeatable fashion, each time the user unfolds the holder HD, with the advantage that the subject S, when placed on the turntable 184 so as to fully occupy the image capture area of the measurement head MH, can be photographed such that the subject S appears so as to fully occupy an image plane within the camera field of view.

As a result, accuracy of 3-D input or reading of the subjects can be improved with ease, which also provides the capability of reducing the burden to be imposed on the measurement head MH for photographing and measuring the subject S.

Further, in the present embodiment, the holder HD, which is physically transformable with geometrical self-repeatability, provides a physical link between the turntable unit RT and the measurement head MH.

Therefore, the present embodiment can simplify a user action required to retract the turntable unit RT into the measurement head MH by transforming the holder HD, and enables the user to compact the turntable unit RT in the measurement head MH, without undue care.

As will be evident from the above description, in the present embodiment, the 3-D input device 10 constitutes an example of the "3-D shape measurement apparatus" set forth in the above mode (1), the head base 130 constitutes an example of the "first section" set forth in the above mode (5), the table base 132 constitutes an example of the "second section" set forth in the same mode, and the first and second intervening bases 134 and 136 together constitute an example of the "intervening section" set forth in the same mode.

Further, in the present embodiment, the table-mounted motor 194 electrically powered, which constitutes an example of the "driving device" set forth in the above mode (10) and an example of the "position guide" set forth in the above mode (9), is replaceable with a conversion mechanism for converting a force applied by the user into a rotational force of the turntable 184.

An example of such a conversion mechanism is configured to include a rotating body which is rotated by a user action and a transmission mechanism (e.g., the aforementioned gear mechanism, or a belt transmission mechanism) which transmits a force applied by the user to the rotating body, to the turntable 184.

In this example, a mechanism (e.g., a detent mechanism) is preferably employed for notifying the user, per each indexing position of the turntable 184, that the turntable 184 is located at any one of indexing positions, in a visual, auditorial or tactile manner.

Next, a second embodiment of the present invention will be described.

Because the present embodiment is different from the first embodiment only with respect to elements connecting together a head base and a table base, and is common to the first embodiment with respect to other elements, the common elements will be omitted in detailed description by reference using the identical reference numerals or names, while only the different elements will be described in greater detail below.

Figure 24:
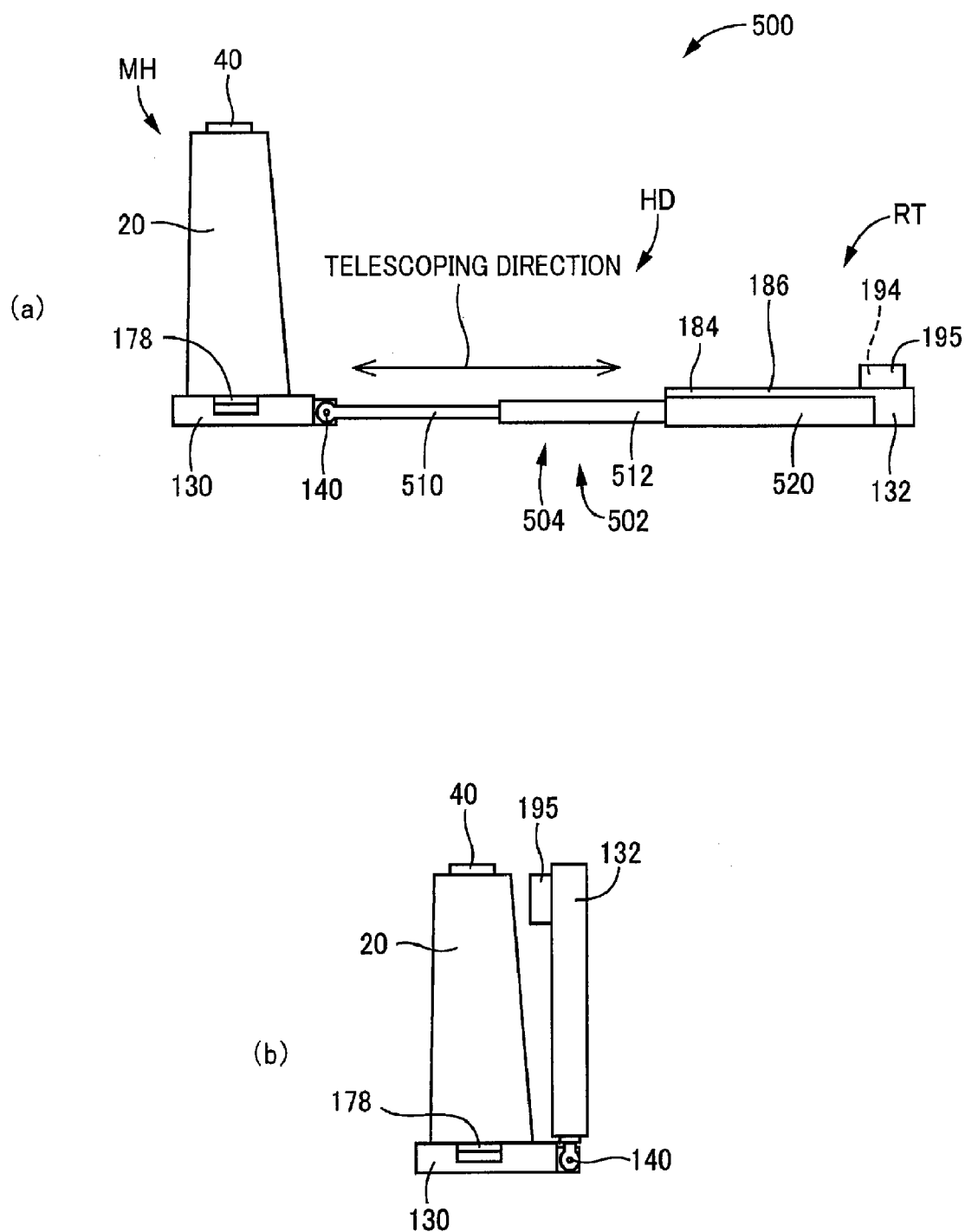
FIGS. 24(a) and 24(b) are side views both illustrating a 3-D input device 500 constructed according to a second illustrative embodiment of the invention, in an unfolded position and a folded position, respectively.
Figure 25:
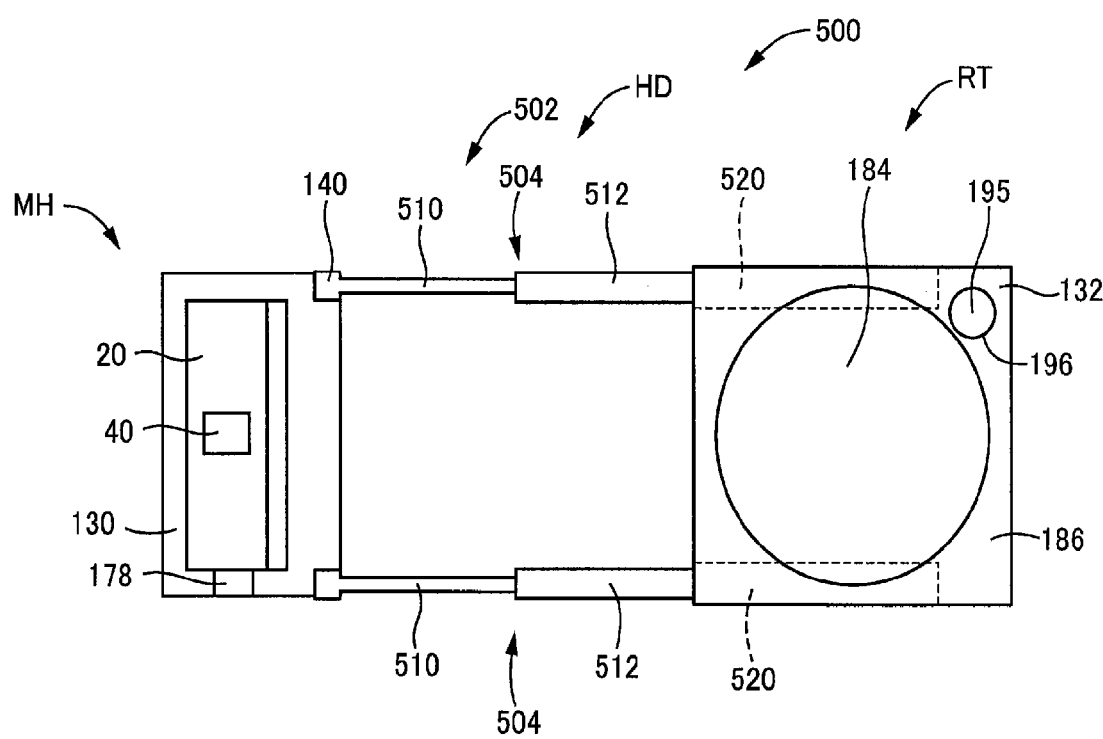
FIG. 25 is a plan view illustrating the 3-D input device 500 depicted in FIG. 24, in an unfolded position.

FIG. 24(a) is a side view illustrating a 3-D input device 500 constructed according to a second illustrative embodiment of the present invention, in an unfolded position, and FIG. 24(b) is a side view illustrating the 3-D input device 500 in a folded position. FIG. 25 is a plan view illustrating the 3-D input device 500 in the unfolded position.

The first illustrative embodiment is of a type in which the holder HD of the 3-D input device 10 is transformed by being folded. On the other hand, in the present embodiment, a holder HD of the 3-D input device 500 is configured to include a foldable portion and a telescopic portion.

As illustrated in FIG. 24(a), the holder HD of the 3-D input device 500 includes the head base 130 and the table base 132 as with the first illustrative embodiment, and additionally includes, as illustrated in FIG. 25, a telescopic coupling mechanism 502 for coupling together the head base 130 and the table base 132.

The coupling mechanism 502 includes a pair of rod assemblies 504 and 504 spaced apart from each other in the widthwise direction of the measurement head MH. Between the head base 130 and the table base 132, the pair of rod assemblies 504 and 504 co-extend in parallel to each other with a widthwise distance being left therebetween generally equal to the width dimension of the head base 130 and the table base 132.

As illustrated in FIGS. 24(a) and 25, each one of the rod assemblies 504 and 504 is constructed by telescopically fitting a first relay rod 510 on a male side into a second relay rod 512 on a female side.

The first relay rod 510 is foldably coupled at its free end to the head base 130 via the joint 140. The second relay rod 512 is telescopically fitted into a cylinder 520 acting as a rod receiver mounted on the table base 132, to thereby allow the second relay rod 512 to be retracted into the table base 132 by a rectilinear motion of the second relay rod 512.

When there is a need for photographing the subject S with the measurement head MH, the user, as illustrated in FIG. 24(a), unfolds the holder HD from the retracted position, so that the first relay rod 510 can extend out from the second relay rod 512 to a maximum extent, and so that the second relay rod 512 can extend out from the table base 132 to a maximum extent.

In the unfolded position, the turntable 184 is located at a desired position relative to the measurement head MH. The user, therefore, places the subject S on the turntable 184 and initiates photographing the subject S using the measurement head MH.

On the other hand, when there is a need for retracting the holder HD, the user fully retracts the first relay rod 510 into the second relay rod 512, and also fully retracts the second relay rod 512 into the table base 132.

As illustrated in FIG. 24(b), in the retracted position, the first relay rod 510 is entirely retracted into the second relay rod 512, and the second relay rod 512 is also entirely retracted into the table base 132.

Thereafter, the user folds the table base 132 using the joint 140 as a hinge, whereby a front face of the measurement head MH and an upper face of the turntable unit RT become close and opposed to each other.

The front face of the measurement head MH is backwardly inclined with respect to a vertical plane, which allows the turntable unit RT to be retracted into the measurement head MH such that the turntable unit RT stands up-right, without causing the motor box 195 of the turntable unit RT to interfere with the front face of the measurement head MH. By virtue of this configuration, the 3-D input device 500 can be compacted in the measurement head MH.

It is added that, in the present embodiment, the coupling mechanism 502, although principally constructed by the first and second relay rods 510 and 512 each of which s generally in the shape of a rod, may be principally constructed by a first and second relay plates each of which is generally in the shape of a plate.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for use in measuring a three-dimensional shape of a subject, comprising:

a turntable unit configured to include a turntable, and a support frame adapted to rotatably support the turntable;

a measurement head configured to photograph the subject on the turntable and to measure the three-dimensional shape of the subject based on at least one resultant photograph of the subject; and a transformable holder being attached to the measurement head and holding the turntable unit, wherein the holder is configured to be selectively placed in an unfolded position in which the turntable unit is unfolded with respect to the measurement head, and a folded position in which the turntable unit is folded with respect to the measurement head, as a result of transformation of the holder, and further configured to allow, when in the unfolded position, the subject to be located on the turntable unit and to be photographed by the measurement head.

2. The apparatus according to claim 1, wherein the holder is configured to hold the turntable unit so as to allow, upon transformation of the holder from the folded position into the unfolded position, the turntable unit to be located at a stable and repeatable position relative to the measurement head.

3. The apparatus according to claim 1, wherein the holder, when in the folded position, takes an exterior shape generally in the form of a rectangular solid, in combination with a shape of the measurement head.

4. The apparatus according to claim 1, wherein the holder is detachably attached to the measurement head.

5. The apparatus according to claim 1, wherein the holder is configured to include a first section attached to the measurement head, a second section for use in holding the turntable unit, and an intervening section intervening between the first and second sections for interconnection.

6. The apparatus according to claim 5, wherein the intervening section is flexibly joined to at least one of the first and second sections, to thereby allow the holder to be folded for transformation from the unfolded position into the folded position.

7. The apparatus according to claim 6, wherein the holder is entirely shaped generally as a plate, and the intervening section is configured to include at least two plate-like members which are flexibly joined together.

8. The apparatus according to claim 5, wherein the intervening section is configured to be telescopic in a direction allowing a distance between the measurement head and the turntable unit, when in the unfolded position, to alter.

9. The apparatus according to claim 1, wherein the turntable unit is configured to include a position guide which is mounted on the support frame, the position guide being operable when the subject is placed on the turntable with the subject having a portion lying outside an image capture area within which the measurement head can photograph, so as to abut the portion of the subject as a result of rotational movement of the subject together with the turntable, to thereby guide a position of the subject that can be taken on the turntable.

10. The apparatus according to claim 9, wherein the turntable unit is configured to include a driving device for use in driving the turntable, the driving device being mounted on the support frame, and being configured to include a portion which also functions as the position guide.

* * * * *